(12) United States Patent
Hellsing et al.

(10) Patent No.: US 11,434,960 B2
(45) Date of Patent: Sep. 6, 2022

(54) METHOD AND SYSTEM FOR GEAR ENGAGEMENT

(71) Applicant: Ningbo Geely Automobile Research & Development Co., Ltd., Ningbo (CN)

(72) Inventors: Johan Hellsing, Hisings Kärra (SE); Muddassar Zahid Piracha, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/227,335

(22) Filed: Apr. 11, 2021

(65) Prior Publication Data
US 2021/0239164 A1 Aug. 5, 2021

Related U.S. Application Data

(63) Continuation of application No. PCT/CN2019/113690, filed on Oct. 28, 2019.

(30) Foreign Application Priority Data

Oct. 30, 2018 (EP) .................................... 18203538

(51) Int. Cl.
*F16H 61/04* (2006.01)
*F16D 23/06* (2006.01)

(52) U.S. Cl.
CPC ...... *F16D 23/06* (2013.01); *F16D 2023/0618* (2013.01); *F16D 2023/0631* (2013.01); *F16D 2023/0656* (2013.01); *F16H 2061/0474* (2013.01)

(58) Field of Classification Search
CPC ............ F16H 61/04; F16H 2061/0474; F16D 2023/0631; F16D 2023/0656
See application file for complete search history.

(56) References Cited

U.S. PATENT DOCUMENTS

| 8,983,744 B2* | 3/2015 | Komura .................. F16H 61/68 |
| | | 701/67 |
| 9,360,109 B2* | 6/2016 | Weingartz ........... F16H 61/2807 |
| 10,428,903 B2 | 10/2019 | Tsukada |

(Continued)

FOREIGN PATENT DOCUMENTS

| CN | 101832387 A | 9/2010 |
| CN | 102648365 A | 8/2012 |
| CN | 102806837 A | 12/2012 |

(Continued)

OTHER PUBLICATIONS

International Search Report from corresponding International Application No. PCT/CN2019/113690, dated Feb. 1, 2020, 2 pages.

(Continued)

*Primary Examiner* — Huan Le
(74) *Attorney, Agent, or Firm* — Tucker Ellis LLP

(57) ABSTRACT

A method for motion control of a shift sleeve in a stepped gear transmission during a synchronization and gear engagement sequence for avoiding gear teeth interference, wherein the stepped gear transmission includes an axially displaceable shift sleeve arranged on and rotationally secured to a shaft, and a constant mesh gear wheel arranged on and rotatable relative to said shaft.

17 Claims, 24 Drawing Sheets

(56) References Cited

U.S. PATENT DOCUMENTS

2012/0312652 A1 12/2012 Kim
2017/0284538 A1 10/2017 Matsui

FOREIGN PATENT DOCUMENTS

| CN | 203939970 U | 11/2014 |
|---|---|---|
| CN | 107795676 A | 3/2018 |
| WO | 2007132106 A1 | 11/2007 |

OTHER PUBLICATIONS

H. Chen and G. Tian, "Modeling and analysis of engaging process of automated mechanical transmissions," Multibody System Dynamics, vol. 37, pp. 345-369, 2016.

M. Z. Piracha, A. Grauers and J. Hellsing, "Improving gear shift quality in a PHEV DCT with integrated PMSM," in CTI Symposium Automotive Transmissions, HEV and EV Drives, Berlin, 2017.

P. D. Walker and N. Zhang, "Engagement and control of synchronizer mechanisms in dual clutch transmissions," Journal of Mechanical Systems and Signal Processing, vol. 26, p. 320-332, 2012.

C.-Y. Tseng and C.-H. Yu, "Advanced shifting control of synchronizer mechanisms for clutchless automatic manual transmission in an electric vehicle," Mechanism and Machine Theory, vol. 84, pp. 37-56, 2015.

K. M. H. Math and M. Lund, "Drag Torque and Synchronization Modelling in a Dual Clutch Transmission," Chalmers University of Technology, Gothenburg, Sweden, 2018.

C. Duan, "Analytical study of a dog clutch in automatic transmission application," Internation Journal of Passengar Cars, Mechanical Systems, vol. 7, No. 3, pp. 1155-1162, 2014.

Z. Lu, H. Chen, L. Wang and G. Tian, "The Engaging Process Model of Sleeve and Teeth Ring with a Precise, Continuous and Nonlinear Damping Impact Model in Mechanical Transmissions," in SAE Technical Paper, 2017.

A. Penta, R. Gaidhani, S. K. Sathiaseelan and P. Warule, "Improvement in Shift Quality in a Multi Speed Gearbox of an Electric Vehicle through Synchronizer Location Optimization," in SAE Technical Paper, 2017.

H. Hoshino, "Analysis on Synchronization Mechanism of Transmission," in 1999 Transmission and Driveline Systems Symposium, 1999.

* cited by examiner

METHOD AND SYSTEM FOR GEAR ENGAGEMENT

RELATED APPLICATION DATA

This application is a continuation of International Patent Application No. PCT/CN2019/113690, filed Oct. 28, 2019, which claims the benefit of European Patent Application No. 18203538.6, filed Oct. 30, 2018, the disclosures of which are incorporated herein by reference in their entireties.

TECHNICAL FIELD

The disclosure relates to a method for motion control of a shift sleeve in a stepped gear transmission during a synchronization and gear engagement sequence. The disclosure also relates to a corresponding system. The method and system according to the disclosure can typically be implemented in a stepped gear transmission of the vehicle, such as a car.

Although the disclosure will be described in relation to a car, the disclosure is not restricted to this particular vehicle, but may as well be installed in other type of vehicles such as minivans, recreational vehicles, off-road vehicles, trucks, buses or the like.

BACKGROUND

For gear shifting in for example hybrid vehicles dual clutch transmissions (DCT) and automated manual transmissions (AMT) are often used. DCT and AMT are stepped gear transmission that for example may use conventional mechanical synchronization systems, operated for example by automated electrically, hydraulically or pneumatically operated shifting actuators. Alternatively, or in combination with mechanical synchronisers, one or more electrical motors may be used for performing the desired speed synchronisation.

The high-level gear shifting process can for example be divided into following phases:
1. Torque ramp down
2. Sleeve to Neutral
3. Speed Synchronization
4. Sleeve to Gear Engagement
5. Torque Ramp up.

The quality of gear shift as perceived by driver depends on various factors, such as for example the gear shift time taken from torque ramp down to torque ramp up and noise caused by the gear shifting process. Moreover, the overall reliability and life span of the transmission is also an important quality factor for the driver.

Despite the activities in the field, there is still a demand for a further improved gear shifting control method that contributes to quicker gear shifts, reduced gear shift noise and improved transmission reliability.

SUMMARY

This section provides a general summary of the disclosure, and is not a comprehensive disclosure of its full scope or all of its features.

Throughout the last decades, reducing emissions has been the main focus of the automotive industry. Also, the introduction of stricter legislation during the recent years has made the hybridization even more popular. The introduction of electric motors (EM) for traction in the vehicles have significantly reduced the usage of internal combustion engines (ICE). ICE is one of the main source of noise in the vehicle. When the usage of ICE is decreased other noise sources in the vehicle, which were not deemed important in the past become more emphasized. One specific noise source is noise generation during gear shifting, in particular noise caused by mechanical interference and impact between shift sleeve teeth and gear wheel teeth. Moreover, such teeth interference and impacts are also responsible for delaying the completion of shift and contributing to wear of the dog teeth, hence reducing the lifespan of the transmission.

An object of the present disclosure is consequently to provide a gearshift synchronisation and engagement control method that enables reduced amount of mechanical interference and impact between shift sleeve teeth and gear wheel teeth during gear shift.

This and other objects are at least partly achieved by a control method and system as defined in the accompanying independent claims.

In particular, according to a first aspect of the present disclosure, the objective is at least partly achieved by a method for motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft.

The method comprising:
receiving a gear shift command,
determining a first phase plane trajectory defining a relationship between a rotational speed difference between the shift sleeve and the gear wheel and a relative displacement between the sleeve teeth and gear teeth, wherein the relative displacement according to the first phase plane trajectory equals the target relative displacement when said rotational speed difference becomes zero at the end of the synchronisation phase,
determining a second phase plane trajectory defining the relationship between the rotational speed difference between the shift sleeve and the gear wheel and the relative displacement between the sleeve teeth and gear teeth, wherein the relative displacement according to the second phase plane trajectory equals the target relative displacement when said rotational speed difference becomes zero at the end of the synchronisation phase, applying a synchronisation torque, and
controlling said synchronisation torque for keeping the real relative displacement between the sleeve teeth and gear teeth within the boundaries of the first and second phase plane trajectories for any rotational speed difference, such that the real relative displacement between the sleeve teeth and gear teeth reaches said target relative displacement simultaneously with said rotational speed difference becomes zero at the end of the synchronisation phase.

Moreover, according to a second aspect of the present disclosure, the objective is also at least partly achieved by a method for motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft.

The method comprising:

receiving a gear shift command, determining a target relative displacement between the sleeve teeth and gear teeth for a state when a gear wheel rotational speed reaches a shift sleeve rotational speed at the end of a synchronisation phase, which target relative displacement is determined for avoiding impact between sleeve teeth and gear teeth during a following gear engagement phase, determining a starting relative displacement between the sleeve teeth and gear teeth that causes the shift sleeve and gear wheel to reach said target relative displacement simultaneously with said rotational speed difference becomes zero at the end of the synchronisation phase when applying a synchronisation torque from the start to the end of a synchronisation phase, and starting to apply said synchronisation torque when the real relative displacement reaches said starting relative displacement.

Moreover, according to a third aspect of the present disclosure, the objective is also at least partly achieved by control system for motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft.

The control system being configured for performing the following steps:

receiving a gear shift command, determining a target relative displacement between the sleeve teeth and gear teeth for a state when a gear wheel rotational speed reaches a shift sleeve rotational speed at an end of the synchronisation phase, which target relative displacement is determined for avoiding impact between sleeve teeth and gear teeth during a following gear engagement phase, determining a first phase plane trajectory defining a relationship between a rotational speed difference between the shift sleeve and the gear wheel and a relative displacement between the sleeve teeth and gear teeth, wherein the relative displacement according to the first phase plane trajectory equals the target relative displacement when said rotational speed difference becomes zero at the end of the synchronisation phase, determining a second phase plane trajectory defining the relationship between the rotational speed difference between the shift sleeve and the gear wheel and the relative displacement between the sleeve teeth and gear teeth, wherein the relative displacement according to the second phase plane trajectory equals the target relative displacement when said rotational speed difference becomes zero at the end of the synchronisation phase, applying a synchronisation torque, controlling said synchronisation torque for keeping the real relative displacement between the sleeve teeth and gear teeth within the boundaries of the first and second phase plane trajectories for any rotational speed difference, such that the real relative displacement between the sleeve teeth and gear teeth reaches said target relative displacement simultaneously with said rotational speed difference becomes zero at the end of the synchronisation phase.

In this way, due to the fact that synchronisation and gear engagement process is performed basically without, or at least with reduced amount of mechanical interference and impact between shift sleeve teeth and gear wheel teeth during gear shift, the gear shift process generates less noise, goes more swiftly and generates less teeth wear. Moreover, the method and system does not require any significant increase of processing power and may this be implemented in conventional electronic transmission controllers, and generally also using existing and conventional shift actuators, such as for example an electro-mechanical shift actuator.

Further advantages are achieved by implementing one or several of the features of the dependent claims.

In one example embodiment, the method comprises controlling said synchronisation torque by a closed loop controller for keeping the real relative displacement between the sleeve teeth and gear teeth within the boundaries of the first and second phase plane trajectories. Thereby inaccuracies in detection of the real relative displacement between sleeve teeth and gear teeth can be taken care of.

In one example embodiment, the closed loop controller is an on-off controller. This enables a cost-efficient implementation without need for new types of synchronisation actuators.

In a further example embodiment, the step of determining the first phase plane trajectory is based on application of a first angular acceleration, and the step of determining the second phase plane trajectory is based on application of a second reduced angular acceleration that is lower than the first angular acceleration, or based on deriving the second phase plane trajectory from the first phase plane trajectory and an offset. Thereby two converging phase plane trajectories are provided, whereby when the detected real relative displacement between sleeve teeth and gear teeth is accurate the real relative displacement between sleeve teeth and gear teeth will follow the first phase plane trajectory with no or very few synchronisation torque interruptions.

In some example embodiments, the step of determining the first angular acceleration involves taking into account a rotational speed dependent drag torque. The drag torque acting on a gear wheel assembly in a transmission, caused for example by lubrication losses, sealing friction, churning, etc. is generally rotational speed dependent, and by taking the rotational speed dependent drag torque into account when determining the first angular acceleration, a more accurate calculation of the first phase plane trajectory is accomplished, thereby enabling improved gear engagement at the end of a synchronisation sequence.

In still a further example embodiment, the relative displacement according to the second phase plane trajectory is smaller or equal to the relative displacement of the first phase plane trajectory minus a maximal relative displacement at the rotational speed difference when the closed loop controller is configured to start. Thereby it is ensured that the real relative displacement between sleeve teeth and gear teeth located within the scope of the first and second phase plane trajectories at start of the closed loop control, irrespective of accuracy of the detection of said real relative displacement.

In one example embodiment, the method comprises determining said first and second phase plane trajectories by performing one or more backward in time calculations starting from the time point when said rotational speed difference becomes zero at the end of the synchronisation phase and ending at a predetermined rotational speed difference based on a predetermined gear shift map, wherein the phase plane trajectories are stored in lookup tables in a computer memory for enabling prompt access by an electronic transmission controller. Thereby online calculations is drastically reduced and the processing requirements of the transmission controller is kept relatively low.

In one example embodiment, each of the first and second phase plane trajectories extends between a rotational speed difference corresponding to the start of the synchronisation phase to the state when said rotational speed difference becomes zero at the end of the synchronisation phase, and the method comprising operating said closed loop controller from the beginning to the end of the first and second phase plane trajectories. Thereby potential corrections of the real relative displacement with respect to rotational speed difference for better conformity with the first phase plane trajectory can be performed at an early stage when the rotational speed difference is still high, thereby enabling a short time delay and thus a quick gear shift.

In a further example embodiment, the method includes the step of, when the real relative displacement between the sleeve teeth and gear teeth at the rotational speed difference when the closed loop controller is configured to start controlling said synchronisation torque is larger than the relative displacement of the first trajectory at said rotational speed difference, shifting said first and second trajectories with an integer times a maximal relative displacement, such that the real relative displacement becomes located between an offset first trajectory and an offset second trajectory, and/or when the real relative displacement between the sleeve teeth and gear teeth at the rotational speed difference when the closed loop controller is configured to start controlling said synchronisation torque is smaller than the relative displacement of the second trajectory at said rotational speed difference, shifting said first and second trajectories with an integer times the maximal relative displacement, such that real relative displacement becomes located between an offset first trajectory and an offset second trajectory. Thereby it is ensured that the real relative displacement between sleeve teeth and gear teeth located within the scope of the first and second phase plane trajectories at start of the closed loop control, irrespective of accuracy of the detection of said real relative displacement.

In a further example embodiment, the method comprising operating two sequential controllers: an initial open loop controller and subsequently a closed loop controller, wherein operation of the open loop controller involves keeping the synchronisation torque zero or at a compensation torque level for as long as real relative displacement is different from a starting relative displacement, and applying the synchronisation torque as soon as the real relative displacement is equal to the starting relative displacement, and wherein operation of the closed loop controller involves controlling the synchronisation torque for keeping the real relative displacement within the boundaries of the first and second phase plane trajectories. This way a reliable, cost-efficient control method delivering quick gear shifts may be provided.

In still a further example embodiment, the closed loop controller for the purpose of keeping the real relative displacement within the boundaries of the first and second phase plane trajectories comprises:

applying synchronisation torque and monitoring the real relative displacement and the rotational speed difference, if the real relative displacement falls below the second trajectory for any given rotational speed difference, stop applying the synchronisation torque, or start applying only a compensation torque in a direction opposite to drag torque, monitoring the real relative displacement, and start applying the synchronisation torque again when the real relative displacement is equal to the first trajectory for any given rotational speed difference, and reiterating above steps in same order until rotational speed difference becomes zero at the end of the synchronisation phase. Thereby a cost-efficient control method delivering quick gear shifts is provided that can be implemented using existing synchronisation actuators and control units.

In one example embodiment, the method comprises starting to apply said synchronisation torque substantially directly upon receiving the gear shift command and independent of current relative displacement between the sleeve teeth and gear teeth. Thereby the gear shift speed may be further increased.

In one example embodiment, the method comprises initiating the closed loop control first after at least 5%, specifically at least 25%, and more specifically at least 50%, of the total rotational speed difference between the shift sleeve and the gear wheel, from the start to the end of the synchronisation phase, has passed. Thereby also driver controlled gear shifting can be handled.

In a further example embodiment, the method involves determining the target relative displacement, a compensation torque applied on the gear wheel in a direction opposite to drag torque and a shift sleeve axial engagement speed, for any specific sleeve teeth and gear teeth geometry, such that the sleeve teeth is determined to enter in the space between neighboring gear teeth to maximal engagement depth substantially without mutual contact, and preferably with a sleeve teeth side surface near or in side contact with an opposite gear teeth side surface. Thereby, gear shifting with less gear impact may be provided, such that noise and wear is reduced and gear shift speed is increased.

In one example embodiment, the target relative displacement at the time point when said rotational speed difference becomes zero at the end of the synchronisation phase is calculated by:

$$y_{sg}^{*}(t_{synch})=y_{sg}(t_{end})+R_g \times 0.5 \times \{t_{end}^2-t_{synch}^2\} \times (T_{comp}-T_d) \div J_g$$

wherein the compensation torque is selected to fulfil the following criteria:

$$T_{comp}-T_d = \frac{[y_{sg}(t_{sdcnt}) < y_{sg}s d\max] - y_{sg}s d\min}{R_g \times 0.5 \times \{t_{end}^2-t_{sdcnt}^2\} \div J_g}$$

Thereby, gear shifting with less gear impact may be provided, such that noise and wear is reduced and gear shift speed is increased.

In one example embodiment, the method comprises determining a starting relative displacement between the sleeve teeth and gear teeth that causes the shift sleeve and gear wheel to reach said target relative displacement simultaneously with said rotational speed difference becomes zero at the end of the synchronisation phase when applying a synchronisation torque from the start to the end of a synchronisation phase, and starting to apply said synchronisation torque when the real relative displacement reaches said starting relative displacement. Thereby a straight-forwards and easily implemented gear shift control method is provided that enables gear shifting with less gear impact, reduced noise and wear and increased gear shift speed.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

Figure 1A:
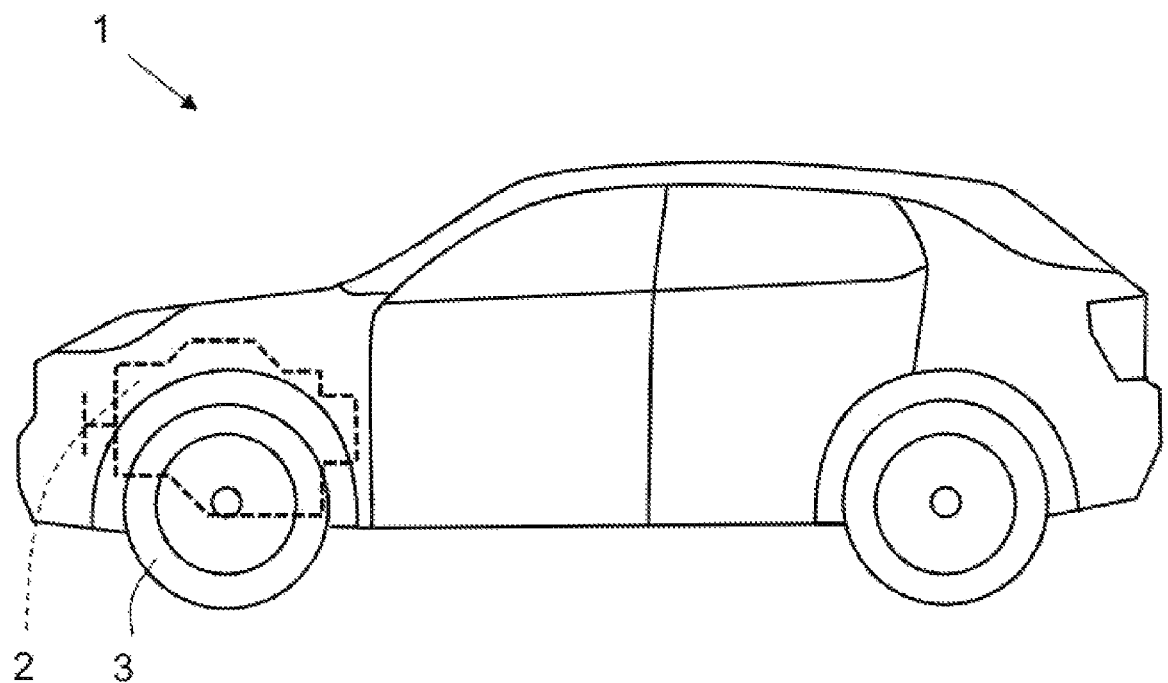
FIG. 1A shows a side view of a vehicle having a control system for a transmission according to the disclosure.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

This disclosure presents a model based control strategy aimed to reduce noise and wear during gearshifts in conventional and hybrid Dual Clutch Transmissions (DCT and DCTH) and Automated Manual Transmissions (AMT). The control strategy is based on a dog teeth position sensors, rotational speed sensors in the transmission and a simulation model for gear engagement. During gear shifting, noise is generated because of impacts between the sleeve teeth and the idler gear dog teeth after speed synchronization. Besides noise, these impacts are also responsible for delaying the completion of shift and contribute to wear in the dog teeth, hence reducing the lifespan of the transmission.

The simulation model for gear engagement can simulate these impacts. Based on the simulation model and optimal control theory, an ideal dog teeth position trajectory is formulated that avoids the impact between sleeve and idler gear dog teeth, before the start of torque ramp up.

Consequently, based on the sensor information, a control strategy comprising one or two sequential controllers may be implemented, wherein the control strategy controls the gear actuator and/or an electric motor during speed synchronization such that the sleeve teeth never impact with idler gear dog teeth before the start of torque ramp up.

Specifically, according to some of the example embodiments of the disclosure, the strategy controls the synchronization torque during speed synchronization in such a way that the dog teeth position during shift is regulated to the ideal dog teeth position trajectory. Since the control strategy is based on optimal control theory, its effect on speed synchronization time is little or even minimal.

The control strategy is designed in such a way that it can easily be applied in the existing transmission control software. By applying the control strategy on the simulation model, it is shown that the impacts during gear engagement are reduced.

Referring now to FIG. 1A, there is depicted an example embodiment of a car 1 having propulsion power source 2, such as internal combustion engine (ICE) and/or an electric motor (EM), driving connected to driving wheels 3 of the car via a stepped gear transmission, i.e. a transmission with a plurality of discrete gears each having a unique gear ratio.

Figure 1B:
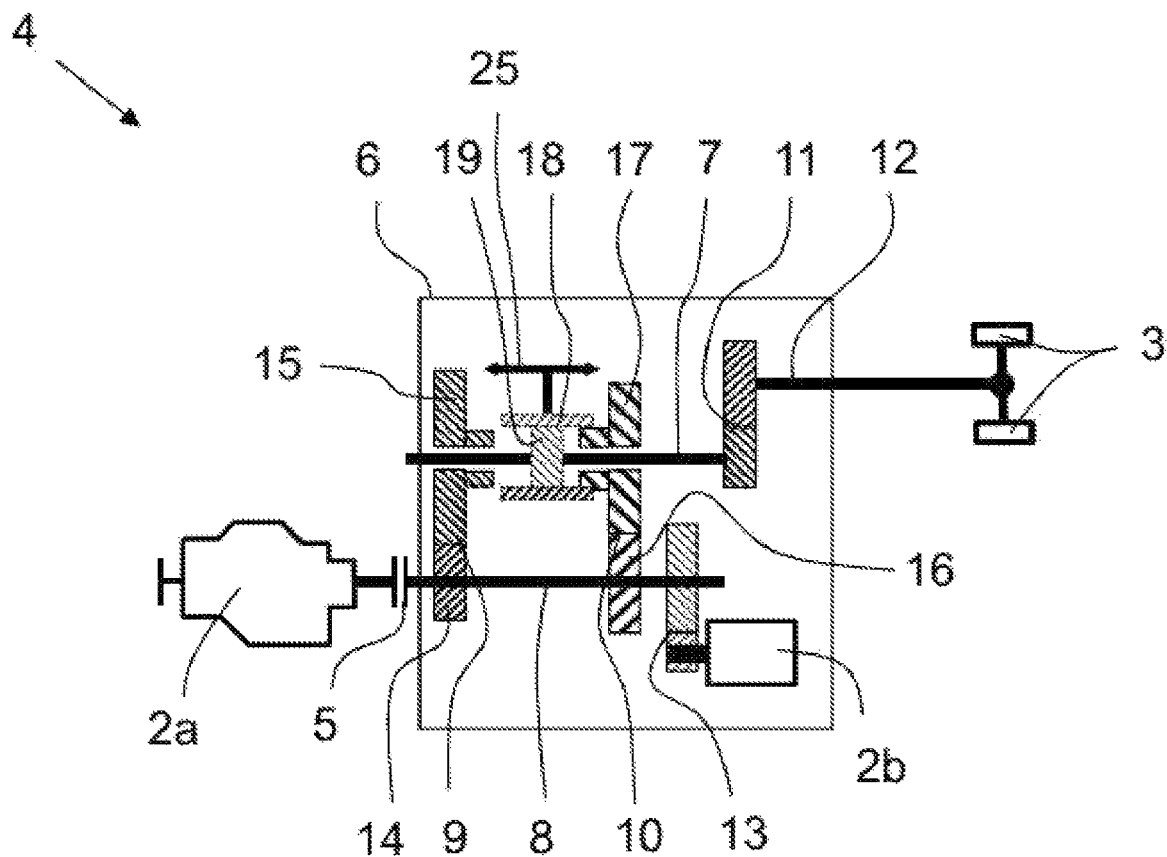
FIG. 1B shows a schematic view of an example drive train on which the control method according to the disclosure may be implemented.

A schematic illustration of a simplified two-gear version of a drive line train 4 of automated manual transmission ATM is shown in FIG. 1B. The drive train comprises an ICE 2a, a clutch 5, a transmission 6 and a set of driving wheel 3. The transmission according to this example simplified embodiment has a main shaft 7, an input shaft 8, first constant mesh gear 9 having an initial gear ratio, a second constant mesh gear 10 having a target gear ratio, a final constant mesh gear 11 having a final drive ratio and a driveshaft 12, and an electrical motor 2b drivingly connected to the input shaft 8 via an electric motor gear ratio 13.

The first constant mesh gear 9 includes a gear 14 rotationally secured to the input shaft 8 and in constant mesh with a gear wheel 15 arranged on and rotatable relative to said main shaft 7, and the second constant mesh gear 10 includes a gear 16 rotationally secured to the input shaft 8 and in constant mesh with a gear wheel 17 arranged on and rotatable relative to said main shaft 7.

An axially displaceable shift sleeve 18 arranged on and rotationally secured to the main shaft 7 via a hub 19 comprises a set of sleeve teeth, also referred to as dog teeth or simply dogs, may be axially shifted by an axial force 25 providable by a shifting actuator (not showed) for engaging corresponding teeth, dog teeth or simply dogs of any of the associated gear wheels 15, 17 of the first and second constant mesh gears 9, 10 for selectively changing the total transmission ratio between the input shaft 8 and driveshaft 12.

The gear shift from initial gear ratio to target gear ratio contains two distinct phases.
1. Speed synchronization
2. Gear engagement During speed synchronization, the speed $\omega_g$ of oncoming idler gear 17, or simply referred to as gear 17 henceforth, is matched with sleeve speed $\omega_s$. As it can be seen from FIG. 1B, the sleeve 18 is rotationally connected to the wheels 3. It is assumed that the vehicle velocity $v_{veh}$ will remain constant during the gear shift since the vehicle 1 does not have much time to decelerate if the shift is fast. The angular velocity of driveshaft 12 will be $$\omega_{drive\ shaft} = v_{veh} \div R_w \quad (1)$$

where $R_w$ is the wheel radius. From $\omega_{drive\ shaft}$ in equation 1, $\omega_s$ can be calculated by $$\omega_s = \omega_{drive\ shaft} \times \text{Final Drive Ratio} \quad (2)$$

The driveshaft 12 is assumed to be infinitely stiff, so there is no torsional degree of freedom between sleeve 18 and wheels 3.

At the start of speed synchronization at time $t_0$ the velocity of gear $\omega_g(t_0)$ is calculated by $$\omega_g(t_0) = \omega_s \times (\text{Initial Gear Ratio} \div \text{Target Gear Ratio}) \quad (3)$$

Figure 2:
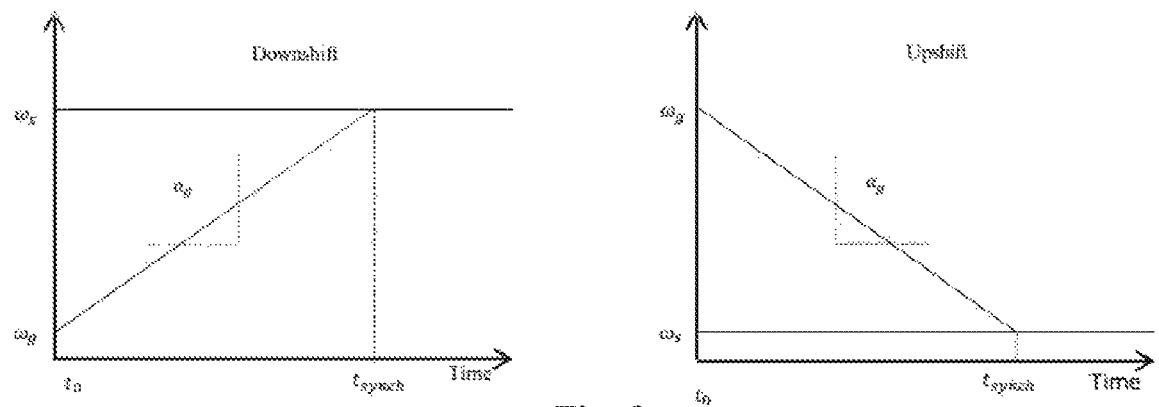
FIG. 2 shows a speed synchronization trajectory

A synchronization torque $T_{synch}$ is then applied on gear 17 such that its velocity at synchronization time $t_{synch}$ is equal to $\omega_s$ from equation 2 as shown in FIG. 2, which shows speed synchronization trajectories.

$T_{synch}$ can be provided either by synchronizer ring and/or by electric motor as explained by [1]. The resulting angular acceleration $\alpha_g$ in oncoming idler gear 17 is calculated by for upshifts by $$\alpha_g = (-T_{synch} - T_d) \div J_g \quad (4)$$

and for downshifts by $$\alpha_g = (T_{synch} - T_d) \div J_g \quad (5)$$

where $J_g$ is the inertia of idler gear 17, input shaft 8 and electric motor, and $T_d$ is the drag torque caused for example on lubrication fluid within the transmission 6. Calculation of $J_g$ depends on whether the synchronization is done with synchronizer rings or electric motor as explained by [1].

The synchronization time $t_{synch}$ can be calculated by $$t_{synch} = |\omega_{sg}(t_0) \div \alpha_g| \quad (6)$$

where $\omega_{sg}(t_0)$ is relative velocity between sleeve and idler gear dog teeth at time $t_0$ and is calculated by $$\omega_{sg}(t_0) = \omega_s - \omega_g(t_0) \quad (7)$$

Figure 3:
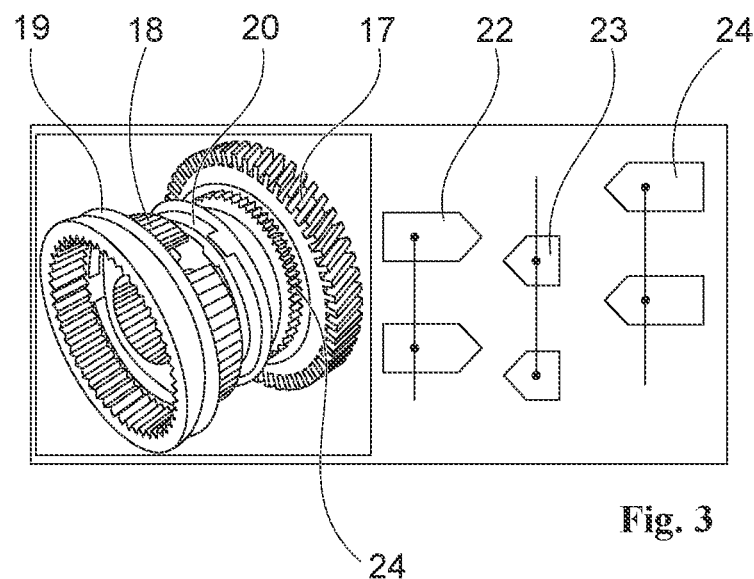
FIG. 3 shows an example embodiment of a mechanical synchronizer and teeth representation

An example embodiment of a mechanical synchronizer and a teeth representation is shown in the left view of FIG. 3. The basic components of the mechanical synchronizer is hub 19 rotationally secured to main shaft 7 via splines, the shift sleeve 18 rotationally secured to and axially displaceable with respect to the hub 19, and the blocker ring 20 having a friction surface intended to cooperate with a friction surface of the gear wheel 17 for rotational speed synchronisation of the sleeve 18 and gear wheel 17. The sleeve 18 has sleeve teeth configured to engage with gear teeth 24 of the gear wheel 17.

Analysis of synchronizers becomes very convenient when each individual component is represented by its teeth as also shown in the right side of FIG. 3, which schematically shows the sleeve teeth 22, blocker ring teeth 23 and idler gear dog teeth 24.

Figure 4:
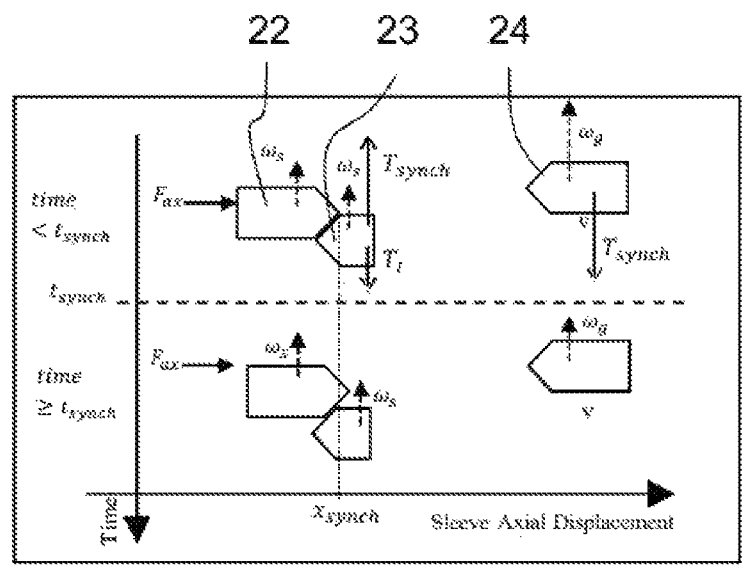
FIG. 4 shows an example illustration of unblocking of sleeve teeth

FIG. 4 shows speeds and torques on individual teeth during transition between speed synchronization phase and gear engagement phase. At the end of speed synchronization phase at time $t_{synch}$ (shown by dashed line in FIG. 4), relative velocity $\omega_{sg}(t_{synch})$ between sleeve 18 and oncoming idler gear 17 is zero. This results in $T_{synch}$ becoming smaller than indexation torque $T_I$.

This reversal of torque relationship or "ring unblocking" is explained in detail in [2] when the speed synchronization is done by synchronizer rings in synchronizer. If speed synchronization is done by electric motor the torque balancing relationships explained in [2] must still be respected to avoid unblocking before speed synchronization. After the torque reversal, sleeve teeth 22 can push the blocker ring teeth 23 aside and move towards idler gear dog teeth 24 for engagement. Blocking position as explained by [3] is denoted by $x_{synch}$ in FIG. 4. Axial force 25 applied on sleeve 18 by actuator mechanism is denoted by $F_{ax}$ and is explained more in detail in [1], which in included here by reference.

The sleeve axial velocity $\dot{x}_s$ in gear engagement phase is assumed to be constant. Axial force 25 from actuator mechanism is responsible for maintaining $\dot{x}_s$. Actuator mechanism is designed to have enough axial force 25 to provide clamping torque for synchronizer rings in synchronizers. Compared to that, the axial force required to maintain a constant $\dot{x}_s$ is very small so it is a valid assumption. Based on this assumption, the axial force 25 of actuator will not be discussed in subsequent sections and only $\dot{x}_s$ will be dealt with.

At the end of speed synchronization $\omega_s(t_{synch})=\omega_g(t_{synch})$, but as sleeve 18 moves forward from $x_{synch}$, synchronization torque $T_{synch}$ on gear 17 disappears as explained in the previous section. Since drag torque is always present on the gear 17, at a time$>t_{synch}$, $\omega_g(\text{time}=t_{synch})>\omega_g(\text{time}>t_{synch})$. It means that with time sleeve 18 and gear 17 will go increasingly out of synchronization. To compensate this behaviour, a compensation torque $T_{comp}$ is applied on idler gear 17 in the direction of $\omega_s$ and opposite to $T_d$. Compensation torque $T_{comp}$ may for example be applied by the electric motor 2b and/or by a main clutch 5. Drag torque although is speed dependent but for such small intervals of time can be estimated to be a constant and its value can be extracted from the methods explained in [4]. The relation between $T_{comp}$, $T_d$ and $\omega_g(t>t_{synch})$ and $\omega_s$ is $$\omega_g(\text{time} > t_{synch}) \text{ is } \begin{cases} > \omega_s & \text{if } T_{comp} > T_d \\ < \omega_s & \text{if } T_{comp} < T_d \\ = \omega_s & \text{if } T_{comp} = T_d \end{cases} \quad (8)$$

Figure 5:
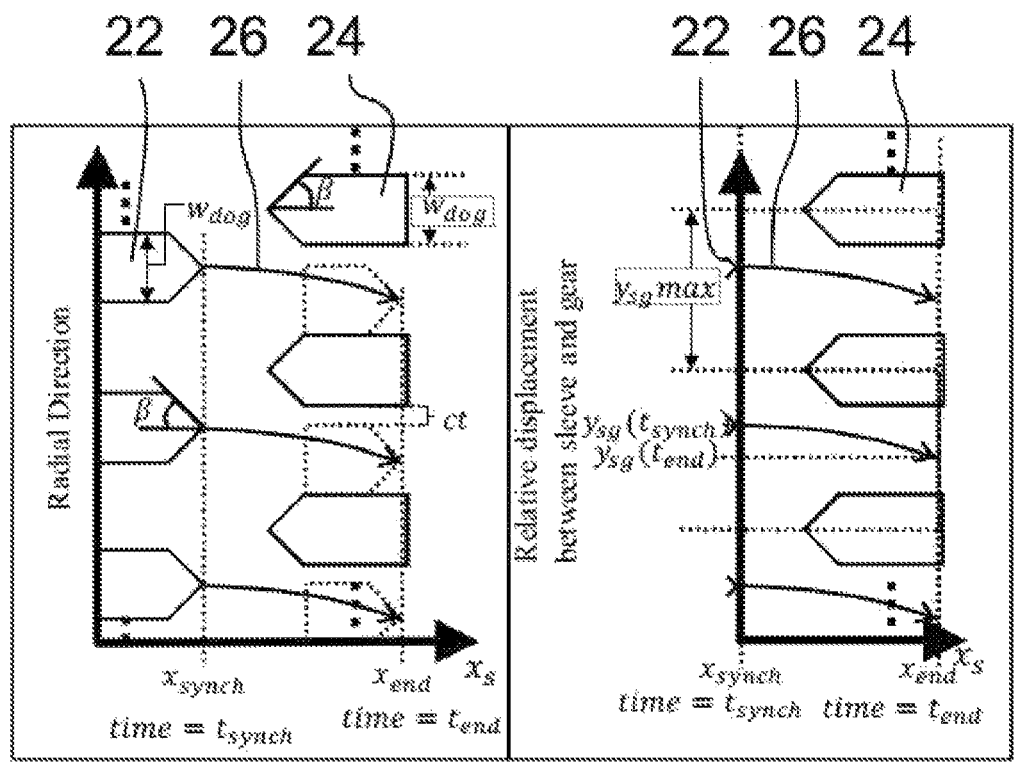
FIG. 5 shows an example embodiment of teeth geometry and frame definition

Teeth geometry of sleeve 18 and gear 17 are shown in left half of FIG. 5. The back angle on teeth is ignored since it affects disengagement and disengagement is not discussed here. It is also assumed that sleeve teeth 22 and gear dog teeth 24 have same teeth width $w_{dog}$ and teeth half angle β as shown in FIG. 5. The tangential clearance between two meshed teeth is ct and it is measured when sleeve teeth 22 are engaged with gear dog teeth 24 as shown by dotted outline of sleeve teeth. The time when engagement is finished is denoted by $t_{end}$ and it is measured when sleeve 18 has travelled a distance $x_{end}$. After sleeve 18 has reached $x_{end}$ torque ramp up can start. The trajectory 26 of tip point of sleeve dog 22 is shown by solid curve in FIG. 5.

The radial direction that is y-axis of left half of FIG. 5 goes from 0 to 360 degrees because sleeve 18 and gear 17 have independent radial movement in the absence of synchronization torque. The term "radial direction" refers herein to a circumferential direction of the sleeve 18 and gear 17. If the radial direction is divided into windows shown by dotted rectangle of width $x_{synch}$ to $x_{end}$ and height $y_{sg}$max such that $$y_{sg}\text{max}=2\times w_{dog}+ct \quad (9)$$

Then the trajectory 26 of tip point of sleeve teeth is same in each window as shown in FIG. 5. By using this convention y-axis can be changed to circumferential relative displacement $y_{sg}$ between sleeve 18 and gear 17, whose limits are between 0 to maximal circumferential relative displacement $y_{sg}$max, as measured for example in millimetres. The term circumferential relative displacement $y_{sg}$ used herein may alternatively be referred to as radial relative displacement.

Since maximal circumferential relative displacement $y_{sg}$max is the distance between two consecutive teeth tips following holds $$y_{sg}\text{max}=2\pi \times R_g \div n_{dog} \quad (10)$$

where $R_g$ is gear radius or sleeve radius and $n_{dog}$ is number of dog teeth 22, 24. The relative displacement at time $t_{synch}$, is denoted by $y_{sg}(t_{synch})$ and at time $t_{end}$ by $y_{sg}(t_{end})$ as shown in FIG. 5, which shows teeth geometry and frame definition.

The relationship between $T_{comp}$ and $T_d$ can be used to define the curve of sleeve tip point trajectory 26 at any time instance $t_i \in [t_{synch}, t_{end}]$ before impact with gear teeth.

$$y_{sg}(t_i)=y_{sg}(t_{synch})-R_g \times 0.5 \times \{t_i^2 - t_{synch}^2\} \ldots \times (T_{comp}-T_d) \div J_g \quad (11)$$

Assuming that resulting $y_{sg}(t_i) \in [0, y_{sg}\text{max}]$ and based on the fact that $\{t_i^2 - t_{synch}^2\}$ term in equation 11 is a positive number since $t_i$ refers to a time later than $t_{synch}$, following relationship between $T_{comp}$, $T_d$, $y_{sg}(t_i)$ and $y_{sg}(t_{synch})$ can be derived from equation 11

$$y_{sg}(t_i) \text{ is } \begin{cases} < y_{sg}(t_{synch}) & \text{if } T_{comp} > T_d \\ > y_{sg}(t_{synch}) & \text{if } T_{comp} < T_d \\ = y_{sg}(t_{synch}) & \text{if } T_{comp} = T_d \end{cases} \quad (12)$$

If $y_{sg}(t_{synch})$ is close to 0 or $y_{sg}$max then $y_{sg}(t_i)$ might leave the window containing $y_{sg}(t_{synch})$ shown in FIG. 5 and will move to an upper or lower window. An example of such a situation where $T_{comp}>T_d$ and $y_{sg}(t_{synch})$ is close to 0 is shown in left half of FIG. 6, which shows relative displacement between sleeve 18 and gear 17 goes outside the limits.

Figure 6:
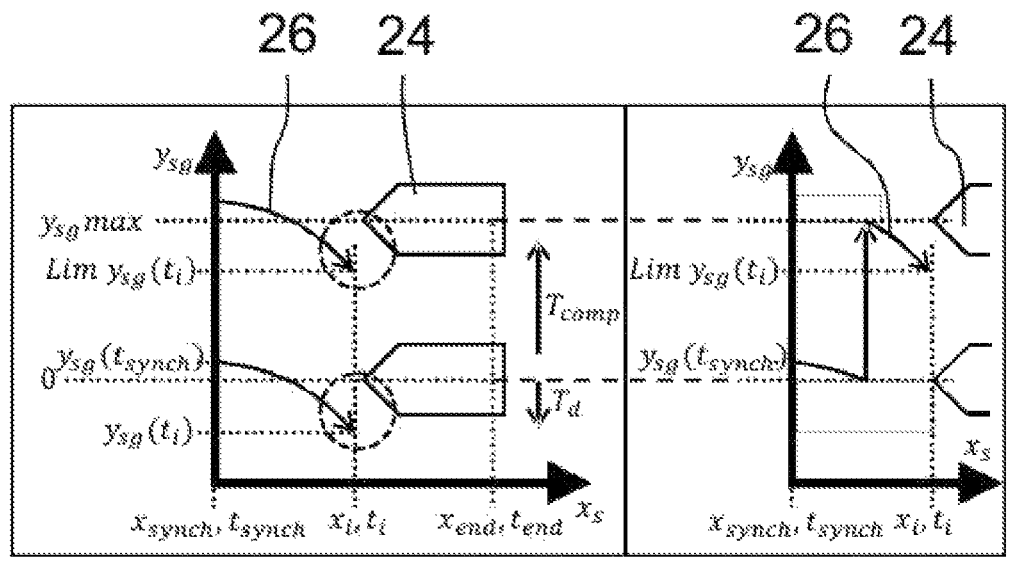
FIG. 6 shows an example embodiment of when relative displacement between sleeve and gear goes outside the limits

As it can be seen in left half of FIG. 6, $y_{sg}(t_i)$ calculated by equation 11 denoted by $y_{sg}(t_i)$ goes to the window lower than the one containing $y_{sg}(t_{synch})$. In this case, a new value of $y_{sg}(t_i)$, Lim $y_{sg}(t_i)$ is calculated such that Lim $y_{sg}(t_i) \in [0, y_{sg}\text{max}]$ by $$\text{Lim } y_{sg}(t_i)=y_{sg}\text{max} \times [(y_{sg}(t_i) \div y_{sg}\text{max})- \ldots \lfloor (y_{sg}(t_i) \div y_{sg}\text{max}) \rfloor] \quad (13)$$

The resulting sleeve tip point trajectory 26 is shown in right half of FIG. 6. As it can be seen from dotted circles in left half of FIG. 6, Lim $y_{sg}(t_i)$ and $y_{sg}(t_i)$ are at same positions with respect to idler gear dog teeth 24.

If $T_{comp}=T_d$, then according to equation 11 $\omega_{sg}(t>t_{synch})=0$ and equation 12 implies $y_{sg}(t_i)=y_{sg}(t_{synch})$, so the sleeve tip point trajectory 26 will be straight with respect to time. Using $T_{comp}=T_d$ the sleeve teeth 22 travel from end of speed synchronization phase to the end of gear engagement phase is shown in FIG. 7 from $t_{synch}$ to $t_{end}$ in downwards direction through subfigures a through e.

Figure 7:
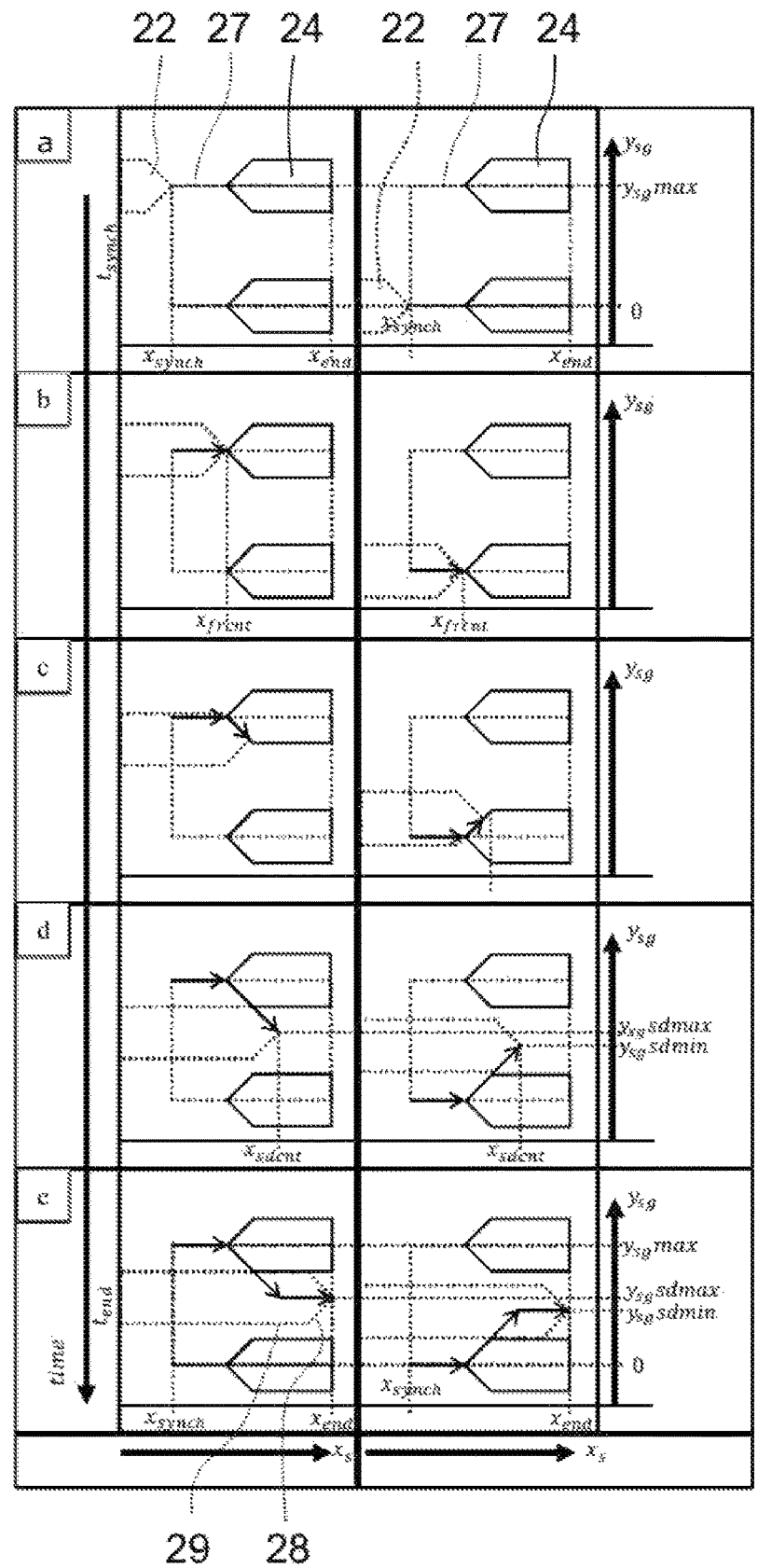
FIG. 7 shows an example embodiment of a sleeve engagement

In FIG. 7, bouncing back of sleeve 18 caused by hitting gear dog teeth 24 is not considered since the purpose here merely is to define the area where the sleeve tip point can exist. If the sleeve 18 bounces back it will still be in this area. Also, the sleeve 18 can leave the area only when a hit with gear teeth results in material penetration which is discussed in simulation results later in the disclosure.

For subfigures to the left in FIG. 7, $y_{sg}(t_{synch})=y_{sg}$max and in the subfigures to the right $y_{sg}(t_{synch})=0$. The window 27 of width $x_{synch}$ to $x_{end}$ and height 0 to $y_{sg}$max is shown by dotted rectangles in FIG. 7, portion a and is repeated in all subfigures.

When sleeve 18 starts to move towards engagement with a constant velocity, the front of sleeve teeth 22 will not hit the gear until $x_s \geq x_{frcnt}$ as shown in FIG. 7, portion b. This movement is referred to in literature as free flight. If sleeve tip point trajectory 26 is seen with respect to gear teeth 24 there is no difference between left and right subfigures in FIG. 7, portion a, and FIG. 7, portion b. There is a difference however when $x_s > x_{frcnt}$ as it can be seen in FIG. 7, portion c, where left and right subfigures show sleeve teeth 22 contact with different flanks of gear teeth 24. The front of sleeve teeth 22 then starts sliding on the gear teeth 24 until $x_s \leq x_{sdcnt}$ as shown in FIG. 7, portion d.

For $x_s > x_{sdcnt}$ the front surface 28 of sleeve teeth 22 will not be in contact with gear teeth 24 but a side surface 29 of the sleeve teeth 22 can be. The distance between $x_{frcnt}$ and $x_{sdcnt}$ is calculated by $$x_{sdcnt} - x_{frcnt} = w_{dog} \div \tan \beta \tag{14}$$

As shown by left and right subfigures of FIG. 7, portion d, $y_{sg}$ when $x_s = x_{sdcnt}$ is defined by $y_{sg}$sdmax and $y_{sg}$sdmin. $y_{sg}$sdmax and $y_{sg}$sdmin are limits on $y_{sg}$ if side surface 29 of sleeve teeth 22 is in contact with the dog teeth 24 and are calculated by $$y_{sg}\text{sdmin} = w_{dog} \tag{15}$$

$$y_{sg}\text{sdmax} = w_{dog} + ct \tag{16}$$

Figure 8:
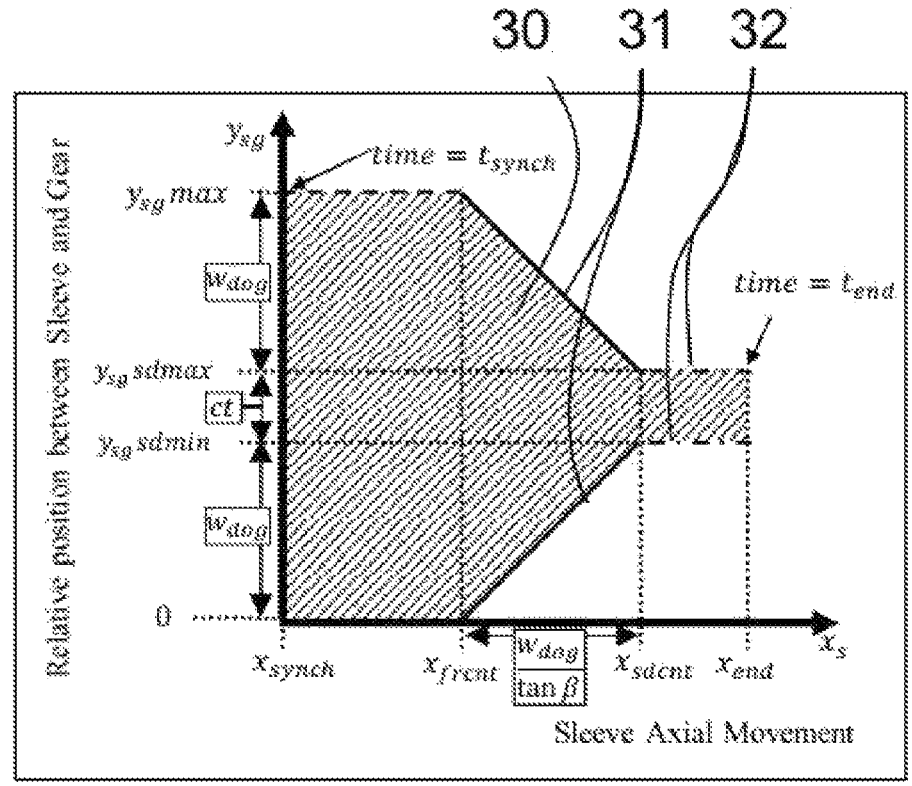
FIG. 8 shows an example embodiment of sleeve tip point trajectory limits

FIG. 7, portion e, shows the sleeve reaching $x_{end}$ from $x_{sdcnt}$. The sleeve tip point trajectories 26 from all subfigures in FIG. 7 when collected together from $x_{synch}$ to $x_{end}$ give the area in which sleeve tip point can exist during gear engagement phase as shown in FIG. 8. $x_{synch}$ and $x_{frcnt}$ are defined by synchronizer geometry and $x_{end}$ is defined in transmission control software. Rest of points required for drawing FIG. 8, can be derived using equations 10, 14, 15 and 16.

Based on location of sleeve tip point inside the hatched area 30 in FIG. 8, the kind of contact between sleeve 18 and gear 17 can be described as frontal contact, side contact or no contact.

If sleeve tip point trajectory $y_{sg}(t_{synch}, t_{end})$ hits the solid line 31 in FIG. 8 when $x_s \in [x_{frcnt}, x_{sdcnt}]$, the contact is a frontal contact. This kind of contact produces a force on sleeve 18 that is in the opposite direction of sleeve movement as shown in FIG. 7, portion c. The resulting contact force produces a clonk kind of noise and wear in transmission.

If sleeve tip point trajectory $y_{sg}(t_{synch}, t_{end})$ hits either $y_{sg}$sdmin or $y_{sg}$sdmax line 32 in FIG. 8 when $x_s \in (x_{sdcnt}, x_{end}]$, the contact is a side contact.

A rattling kind of noise is produced if $y_{sg}$ hits both $y_{sg}$sdmin and $y_{sg}$sdmax 32 when $x_s \in (x_{sdcnt}, x_{end}]$. This kind of contact is referred to as multiple side contact.

If sleeve tip point trajectory $y_{sg}(t_{synch}, t_{end})$ hits the dashed line when $x_s \in [x_{synch}, x_{frcnt})$ or does not hit either solid 31 or dot-dashed line 32, there is no contact between sleeve 18 and gear 17 until the start of torque ramp up. This kind of gear engagement does not produce any noise or wear and is fastest.

Sleeve teeth side surface 29 contact is inevitable when torque ramp up starts so at $x_s = x_{end}$, $y_{sg}(t_{end})$ will be on either $y_{sg}$sdmin or $y_{sg}$sdmax. The transition between end of gear engagement phase and start of torque ramp up is shown in FIG. 9, which shows $y_{sg}$ at torque ramp up.

Figure 9:
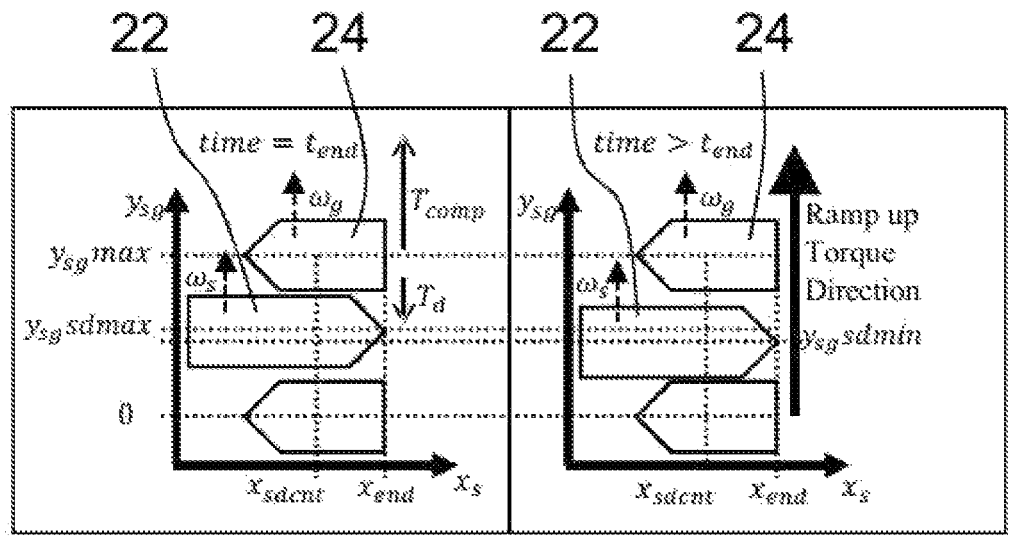
FIG. 9 shows an example embodiment of $y_{sg}$ at torque ramp up

In left half of FIG. 9, at time $t_{end}$ when $x_s = x_{end}$, $y_{sg}(t_{end}) \in [y_{sg}\text{sdmin}, y_{sg}\text{sdmax}]$. At time $> t_{end}$ torque ramp up starts and since the direction of ramp up torque for driving the vehicle is always same as $\omega_s$, ramp up torque will push the oncoming idler gear 17 to sleeve 18 as shown in right half of FIG. 9. So $$y_{sg}(\text{time} > t_{end}) = y_{sg}\text{sdmin} \tag{17}$$

If $y_{sg}(t_{end}) \neq y_{sg}\text{sdmin}$, there will be an impact between sleeve dog teeth 22 and gear dog teeth 24 when torque ramp up starts. To avoid this impact $$y_{sg}(t_{end}) = y_{sg}\text{sdmin} \tag{18}$$

Also, to avoid multiple side contacts $$\text{if } x_s \in (x_{sdcnt}, x_{end}] \text{ then } y_{sg} \neq y_{sg}\text{sdmax} \tag{19}$$

If direction of $\omega_s$ and $\omega_g$ are reversed only then $y_{sg}(t > t_{end})$ would be $= y_{sg}\text{sdmax}$.

$y_{sg}^*(t_{synch})$ refers to a value of $y_{sg}$ at time $t_{synch}$ such that:
The resulting sleeve tip point trajectory must not have either frontal or multiple side contact with idler gear dog teeth.

The resulting $y_{sg}(t_{end})$ must be as close to $y_{sg}\text{sdmin}$ as possible.

Fulfilment of condition 1 guarantees that the gear engagement will be fastest and will be without noise and wear. Fulfilling the condition 2 above guarantees minimum impact when torque ramp up starts according to equation 17 and 18.

The absence of frontal contact implies there will be no force on sleeve 18 during engagement in the direction opposite to $\dot{x}_s$, the minimum engagement time $t_{end} - t_{synch}$ can then be calculated by $$t_{end} - t_{synch} = (x_{end} - x_{synch}) \div \dot{x}_s \tag{20}$$

The velocity difference between sleeve 18 and gear 17 after time $t_{end} - t_{synch}$, will be $$\omega_s - \omega_g(t_{end}) = -[(T_{comp} - T_d) \times (t_{end} - t_{synch}) \div J_g] \tag{21}$$

From equation 21, larger the value of $T_{comp} - T_d$, larger will be the velocity difference. As mentioned in [5], larger velocity difference leads to more severe impacts, so ideally $T_{comp} - T_d$, must be zero. If it is not zero then the allowable value that guarantees absence of multiple side contacts is defined in the subsequent section.

A time instance $t_{sdcnt}$ can also be defined as time when $x_s = x_{sdcnt}$. It is important to note that time instance $t_{sdcnt}$ does not represent the time instance shown in FIG. 7, portion d, because in FIG. 7, there is contact between dog teeth. Time $t_{sdcnt} - t_{synch}$ is the time taken for $x_s$ to go from $x_{synch}$ to $x_{sdcnt}$ without frontal contact so $$t_{sdcnt} - t_{synch} = (x_{sdcnt} - x_{synch}) \div \dot{x}_s \tag{22}$$

The absence of frontal contact also implies that equation 11, can be rewritten for $y_{sg}(t_{end})$ and $y_{sg}(t_{sdcnt})$ as $$y_{sg}(t_{end}) = y_{sg}^*(t_{synch}) - R_g \times 0.5 \times \{t_{end}^2 - t_{synch}^2\} \ldots \times (T_{comp} - T_d) \div J_g \tag{23}$$

$$y_{sg}(t_{sdcnt}) = y_{sg}^*(t_{synch}) - R_g \times 0.5 \times \{t_{sdcnt}^2 - t_{synch}^2\} \ldots \times (T_{comp} - T_d) \div J_g \tag{24}$$

Subtracting equation 24 from equation 23 results in $$y_{sg}(t_{end}) - y_{sg}(t_{sdcnt}) = -R_g \times 0.5 \times \{t_{end}^2 - t_{sdcnt}^2\} \ldots \times (T_{comp} - T_d) \div J_g \tag{25}$$

In equation 25, $\{t_{end}^2 - t_{sdcnt}^2\}$ is always positive, so following relationship between $T_{comp}$, $T_d$, $y_{sg}(t_{end})$ and $y_{sg}(t_{sdcnt})$ can be derived $$y_{sg}(t_{end}) \text{ is } \begin{cases} < y_{sg}(t_{sdcnt}) & \text{if } T_{comp} > T_d \\ > y_{sg}(t_{sdcnt}) & \text{if } T_{comp} < T_d \\ = y_{sg}(t_{sdcnt}) & \text{if } T_{comp} = T_d \end{cases} \quad (26)$$

Equation 26, in combination with equation 18 and constraint 19 can be used to define limits on difference between $T_{comp} - T_d$, if multiple side contacts is to be avoided. So, if for instance $T_{comp} > T_d$ and $y_{sg}(t_{end})$ is according to equation 18, then if $y_{sg}(t_{sdcnt}) < y_{sg}s\text{dmax}$, multiple side contact can be avoided when:

$$T_{comp} - T_d = \frac{[y_{sg}(t_{sdcnt}) < y_{sg}s\text{dmax}] - y_{sg}s\text{dmin}}{R_g \times 0.5 \times \{t_{end}^2 - t_{sdcnt}^2\} \div J_g} \quad (27)$$

Equation 27 shows if for instance $y_{sg}(t_{sd}) \ll y_{sg}s\text{dmax}$ to keep probability of multiple side contacts very small, then $T_{comp} - T_d$ should be very small, or if $y_{sg}(t_{sd}) \rightarrow y_{sg}s\text{dmin}$ then $T_{comp} - T_d \rightarrow 0$ as mention by 3rd relation in equation 26.

Equation 27 also shows the relation between $\dot{x}_s$ and $T_{comp} - T_d$, by $\{t_{end}^2 - t_{sdcnt}^2\}$ term in the denominator. If for instance $\dot{x}_s$ is decreased then according to equation 20 and 22 $t_{end}$ and $t_{sdcnt}$ will increase, making the $\{t_{end}^2 - t_{sdcnt}^2\}$ term increase. In such a scenario if the inequality in 26, is kept unchanged then $T_{comp} - T_d$ must be decreased.

For $T_{comp} < T_d$, $y_{sg}(t_{sd})$ must be $<y_{sg}(t_{end})=y_{sg}s\text{dmin}$ according to 2nd condition in equation 25, but $y_{sg}s\text{dmin}$ is the lowest boundary of $y_{sg}$ when $x_s \in (x_{sdcnt}, x_{end}]$ as shown in FIG. 8. So, if direction of $\omega_s$ is as shown in FIG. 9, $T_{comp}$ must not be $<T_d$ if impact at torque ramp up needs to be avoided.

By calculating the minimum value of $T_{comp} - T_d$ from equation 27 and equation 21, $y_{sg}^*(t_{synch})$ can be calculated directly from equation 23.

In other words, the method involves determining the target relative displacement (y*_sg), the compensation torque (T_comp) applied on the gear wheel in a direction opposite to drag torque (T_d) and the shift sleeve axial engagement speed ($\dot{x}_s$), for any specific sleeve teeth and gear teeth geometry, such that the sleeve teeth is determined to enter in the space between neighbouring gear teeth to maximal engagement depth substantially without mutual contact, and preferably with a sleeve teeth side surface near or in side contact with an opposite gear teeth side surface.

The term "substantially without mutual contact" means that there may be a single side contact between sleeve teeth side surface and the opposite gear teeth side surface upon reaching said maximal engagement depth.

Moreover, the term "sleeve teeth side surface near an opposite gear teeth side surface" means that the sleeve teeth are preferably not located in the centre of the space between neighbouring gear teeth, but in a side region of said space, such that the mechanical impact between the sleeve teeth and gear teeth upon Torque Ramp Up remains low. For example, a gap between the sleeve teeth and a closest opposite gear teeth side surface may be less than 30%, specifically less than 15%, of a maximal gap between the sleeve teeth and the opposite gear teeth side surface.

Specifically, the target relative displacement (y*_sg) at the time point (t_synch) when said rotational speed difference ($\omega$_sg) becomes zero at the end of the synchronisation phase may be calculated by:

$$y_{sg}^*(t_{synch}) = y_{sg}(t_{end}) + R_g \times 0.5 \times \{t_{end}^2 - t_{synch}^2\} \times (T_{comp} - T_d) \div J_g$$

wherein the compensation torque (T_comp) is selected to fulfil the following criteria:

$$T_{comp} - T_d = \frac{[y_{sg}(t_{sdcnt}) < y_{sg}s\text{dmax}] - y_{sg}s\text{dmin}}{R_g \times 0.5 \times \{t_{end}^2 - t_{sdcnt}^2\} \div J_g}$$

Clearly, depending on aspects such as synchronizer sleeve geometry, synchronizer sleeve axial velocity $\dot{x}_s$ in gear engagement phase and drag torque Td, the sleeve teeth may in certain embodiment of the control system and transmission be controlled to enter in the space between neighbouring gear teeth to maximal engagement depth substantially without mutual contact also without applying a compensation torque Tcomp, i.e. having Tcomp=0.

Simulation Model

A simulation has been performed to verify and validate the gear engagement model described above. Teeth parameters implemented in simulation are shown in Table 1.

TABLE 1

| Teeth Geometry Parameters | |
|---|---|
| $W_{dog}$ | 4 mm |
| ct | 0.5 mm |
| β | 45 degrees |
| $y_{sg}$max | 8.5 mm |
| $y_{sg}$sdmin | 4 mm |
| $y_{sg}$sdmin | 4.5 mm |
| $x_{front}$-$x_{synch}$ | 2 mm |
| $x_{sdcnt}$-$x_{front}$ | 4 mm |
| $x_{end}$-$x_{synch}$ | 8 mm |
| $\dot{x}_s$ | 500 mm/sec |
| Teeth contact Parameters | |
| Stiffness of teeth for contact | 1e10 N/m |
| Damping of teeth for contact | 1e4 N/m/s |
| Limit penetration for contact | 1e-3 mm |
| Viscous friction for contact | 5 N/m/s |
| Friction coefficient for contact | 0.3 |

The teeth contact parameters in Table 1 are chosen to be nominal values based on experience and are explained in [5]. Accurate values of these parameters can be calculated by the experimental method shown in [6]. The consequence of not using accurate values will be that the contact forces will not be accurate but the relative magnitude of contact forces resulting from different $y_{sg}(t_{synch})$ will still be the same. Hence, the level of noise generated by different frontal contacts can be evaluated. Using this approach multiple side contacts and consequent rattling noise cannot be evaluated. But the potential of multiple side contacts resulting from different $y_{sg}(t_{synch})$ can still be evaluated.

Figure 10:
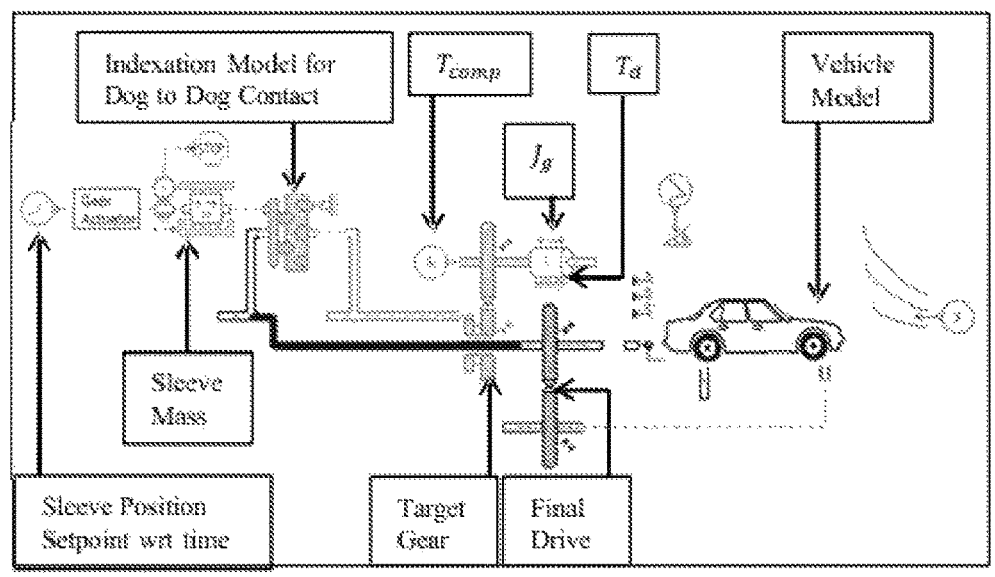
FIG. 10 shows an example embodiment of a gear engagement model

Gear engagement model made in a simulation software (LMS Imagine AMESim) is shown in FIG. 10. The model is initialized at the end of synchronization at time $t_{synch}$. The model can be initialized at any $y_{sg}(t_{synch}) \in [0, y_{sg}\text{max}]$ and then the resulting sleeve tip point trajectory 26 is plotted inside the hatched area 30 shown by FIG. 8.

Simulation Results

Figure 11:
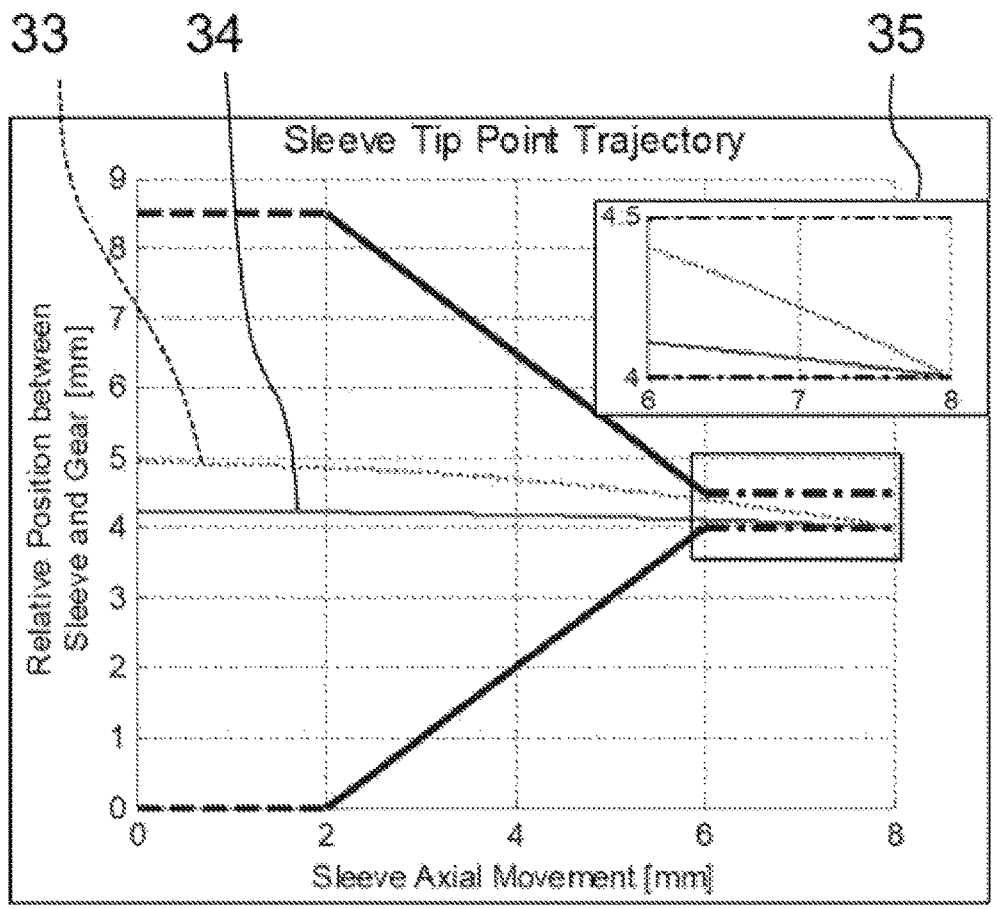
FIG. 11 shows an example embodiment of a sleeve tip point trajectory with $y_{sg}*(t_{synch})$

Using teeth parameters given in Table 1, $T_{comp} - T_d = 19$ Nm satisfies equation 27 with $y_{sg}(t_{sdcnt}) + 1 \text{ mm} = y_{sg}s\text{dmax}$ as shown by the dotted curve 33 in FIG. 11, which shows sleeve tip point trajectory with $y_{sg}^*(t_{synch})$.

In FIG. 11, x axis is from 0 to 8 mm, where for sake of simplicity $x_{synch}$ is assumed to be 0 and then $x_{end} = 8$ mm according to FIG. 11. Using equation 21, $T_{comp} - T_d = 19$ Nm leads to $\omega_s - \omega_g(t_{end}) = -2$ rad/sec. Any value of $T_{comp} - T_d \in [0,$ 19 Nm) will satisfy equation 27 and lead to $\omega_s-\omega_g(t_{end})\in(-2$ rad/sec, 0]. Using $T_{comp}-T_d=5$ Nm leads to $\omega_s-\omega_g(t_{end})=-0.5$ rad/sec and leads to $y_{sg}*(t_{synch})$ to be 4.245 mm as shown by solid curve 34 in FIG. 11.

A magnification view 35 of the sleeve tip point trajectories in the range 6 mm≤x≤8 mm is also shown in FIG. 11.

A batch simulation is run on the model shown in FIG. 10 such that $y_{sg}(t_{synch})$ for all simulations is changing from 1.245 mm till 7.245 mm with a step of 0.2 mm. Since the batch simulation is run with a constant $T_{comp}-T_d=5$ Nm, $y_{sg}*(t_{synch})$ will be =4.245 mm. The resulting sleeve tip point trajectories are shown in FIG. 12.

Figure 12:
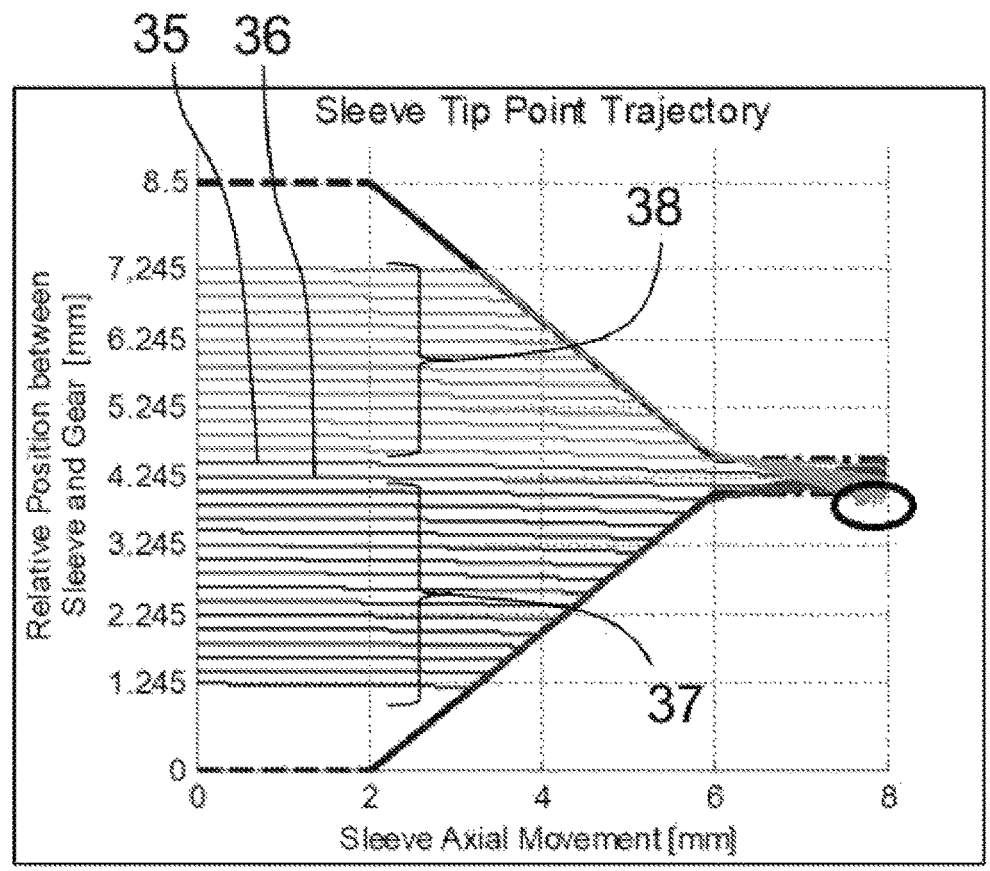
FIG. 12 shows an example embodiment of a sleeve tip point trajectories from batch simulation

In FIG. 12 only sleeve tip point trajectory for $y_{sg}*(t_{synch})$ and $y_{sg}*(t_{synch})+0.2$ mm, denoted 36 and 36, do not make a frontal contact. All other shown trajectories exhibit a frontal contact with sleeve.

Figure 13:
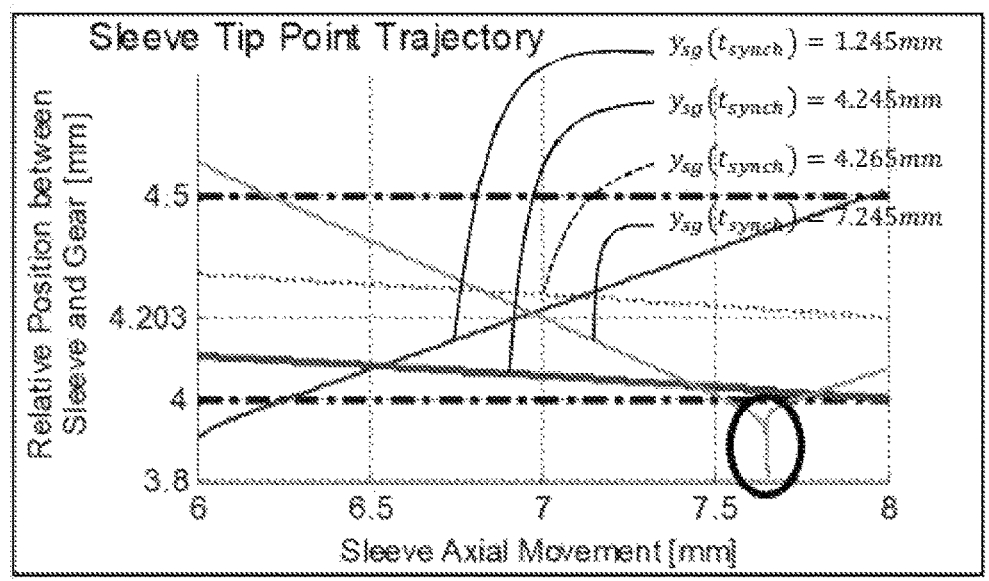
FIG. 13 shows example embodiments a selected catch simulation results

A zoomed in view of the sleeve tip point trajectories in the range 6 mm≤x≤8 mm of FIG. 12 but including only some selected batch runs is shown in FIG. 13. It can be seen that $y_{sg}(t_{end})$ for the trajectory generated by $y_{sg}(t_{synch})=4.265$ mm is not according to equation 18. The trajectories generated by $y_{sg}(t_{synch})=1.245$ mm and 7.245 mm will have more potential of multiple side contacts and rattling noise according to the criteria described before.

Since $T_{comp}>T_d$ so according to equation 8 $\omega_g$ is $>\omega_s$. With directions of $\omega_g$ and $\omega_s$ shown by FIG. 9, it can be concluded that frontal contacts made by the lower trajectories 37 in FIG. 12 will be more severe because in that case the sleeve hits the idler gear 17 that is approaching it. The frontal contacts made by the upper 38 trajectories is such that the idler gear 17 is moving away from the sleeve 18. Since the magnitude of frontal force defines the friction between sleeve 18 and gear 17, so in general lower frontal contact trajectories 37 have more gear engagement time as compared to upper frontal contact trajectories 38. The resulting gear engagement times are shown in FIG. 14 on y-axis for each $y_{sg}(t_{synch})$ on x-axis.

Figure 14:
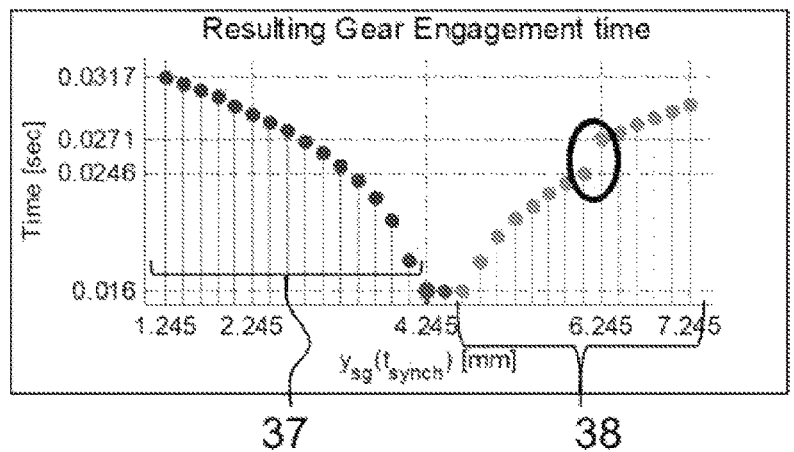
FIG. 14 shows example embodiments of gear engagement times from batch simulations

From FIG. 14, it can be seen that gear engagement times for the lower trajectories 37 in FIG. 12 are generally higher than the upper trajectories 38. Furthermore, it can be concluded that $y_{sg}*(t_{synch})=4.245$ mm leads to the fastest gear engagement.

Figure 15:
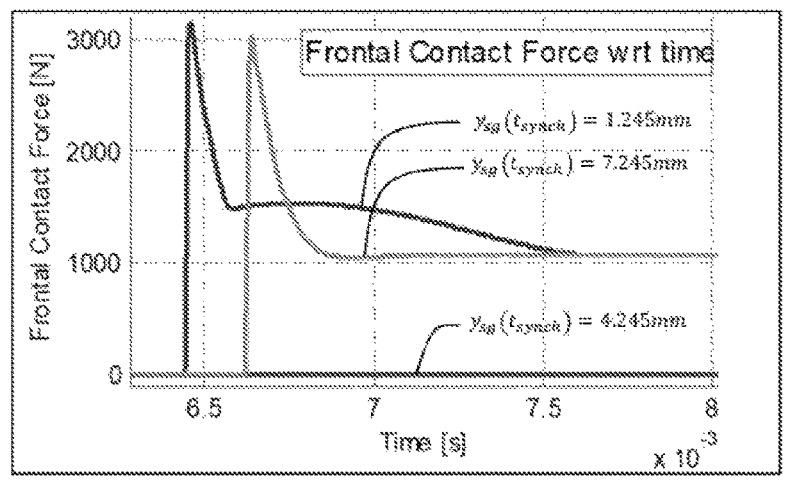
FIG. 15 shows example embodiments of frontal contact force for selected batch simulations

Maximum frontal contact force for the selected batch runs in FIG. 12 is shown in FIG. 15. It can be seen from FIG. 15 that the contact force is higher for $y_{sg}(t_{synch})=1.245$ mm than it is for $y_{sg}(t_{synch})=7.245$ mm as discussed earlier. Also, the small-time scale and large value of contact force in FIG. 15 indicates that the contact force will generate a clonk kind of noise. Maximum value of frontal contact force for all batch simulations shown in FIG. 12 are shown on y-axis in FIG. 16 with corresponding values of $y_{sg}(t_{synch})$ shown on x-axis.

Figure 16:
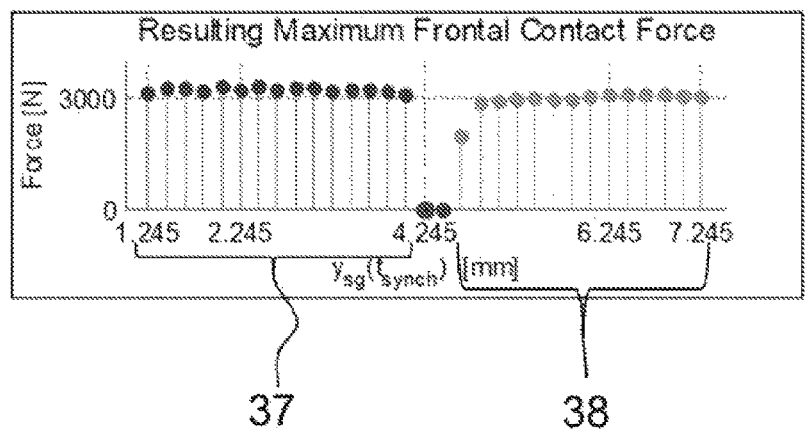
FIG. 16 shows example embodiments of maximum frontal contact force for batch simulations

From FIG. 14 and FIG. 16 it can be seen that trajectories from $y_{sg}(t_{synch})$ values less than $y_{sg}*(t_{synch})$ start giving frontal contacts and hence clonk noise as well as delayed gear engagement within $y_{sg}*(t_{synch})-0.2$ mm but for $y_{sg}(t_{synch})$ values larger $y_{sg}*(t_{synch})$ than the clonk noise and delayed gear engagement shows up after $y_{sg}*(t_{synch})+0.4$ mm. This kind of analysis can thus be used to define the tolerance level with which $y_{sg}*(t_{synch})$ must be controlled in either direction.

Figure 17:
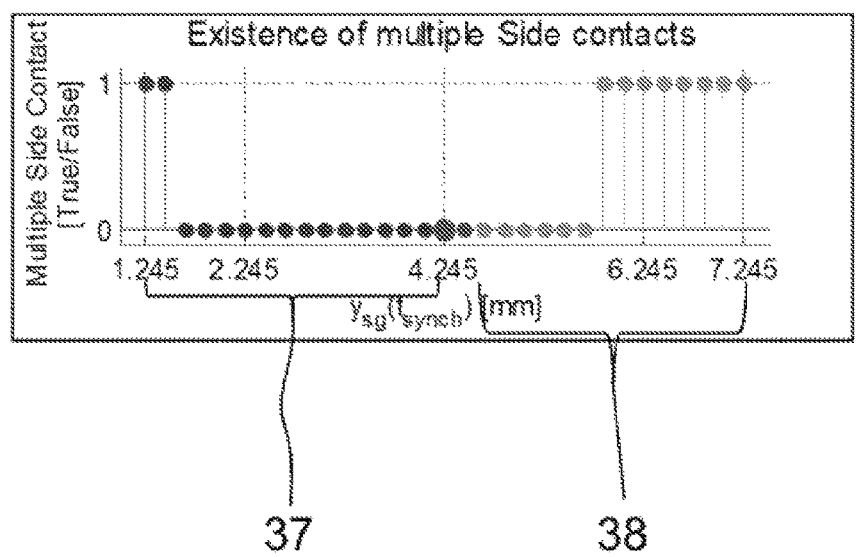
FIG. 17 shows an example embodiment of existence of multiple side contacts for batch simulations

The existence of multiple side contacts is shown in FIG. 17 for all batch simulations in FIG. 12. On y-axis in FIG. 17 is the true/false of whether more than one side contact occur for the corresponding $y_{sg}(t_{synch})$ on x-axis.

From FIG. 17 it can be seen multiple side contact and hence more probability of rattling exists when $y_{sg}(t_{synch})$ is far from $y_{sg}*(t_{synch})$.

From the trajectory for $y_{sg}(t_{synch})=7.245$ mm in FIG. 13 it can be seen that at $x_s\cong7.65$ mm marked by the circle, the sleeve teeth are pushing so hard against the gear teeth, that the simulation result shows a material penetration of about 0.2 mm. Same behaviour can be seen for trajectories resulting from other values of $y_{sg}(t_{synch})$ as shown by circle in FIG. 12. High side contact force increases the friction between sleeve and gear hence delaying the gear engagement as shown by the sudden increase in gear engagement time marked by circle in FIG. 14. But since the delay it generates is small (of the order of few ms) as compared to delays generated because of frontal contacts (of the order of 10 ms) it can be ignored.

Based on the simulation results it can be concluded that, for the specific circumstances of this simulation example, $y_{sg}*(t_{synch})=4.245$ mm results in minimum engagement times, zero frontal contact forces, less probability of multiple side contacts and $y_{sg}(t_{end})=y_{sg}$sdmin, subsequently leading to best shift quality with least noise and wear.

Corresponding simulations may be performed to identify optimal $y_{sg}*(t_{synch})$ for each gear shift situation planned to occur according to a predetermined transmission shift map, possibly also taking into account variation in drag torque Td caused be variation of transmission fluid temperature.

In order to identify rotational position of the sleeve and gear dog teeth 22, 24, teeth position sensors must be positioned in a way that sleeve and idler gear dog teeth 22, 24 can be detected.

Figure 18:
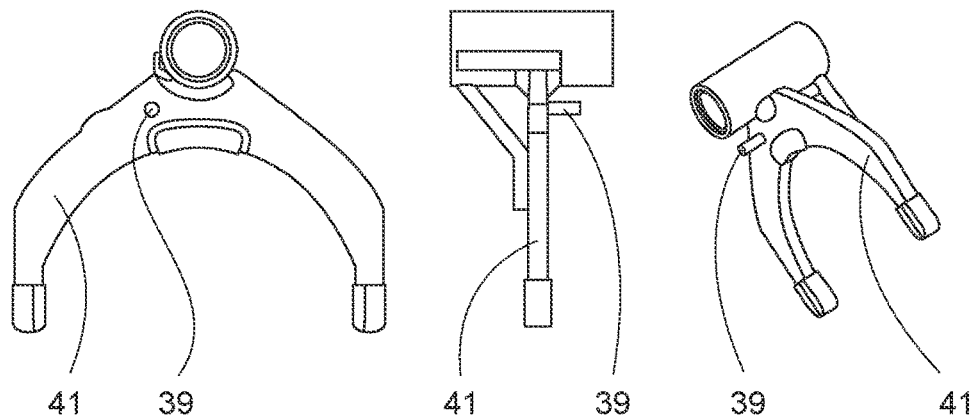
FIG. 18 shows an example embodiment of a sleeve teeth position sensor added to shift fork

In the case of an axially shiftable sleeve 18, the sensor must follow it in axial direction as long as the movement is part of shifting process. On the shift forks 41 shown in FIG. 18, the sleeve teeth position sensor 39 is added.

Figure 19:
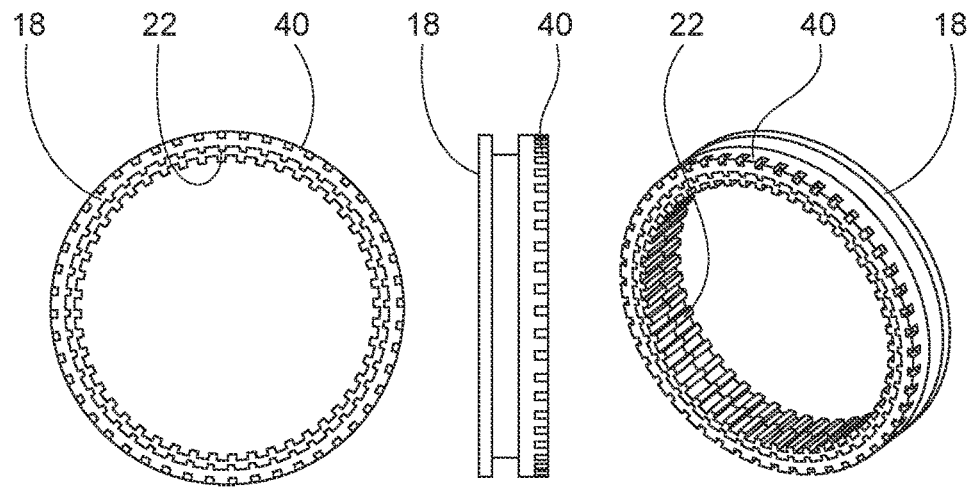
FIG. 19 shows an example embodiment of reading marks on sleeve

Since the sleeve teeth 22 are internal, reading marks 40 may for example be made on the outer surface of sleeve 18, wherein the reading marks 40 may be aligned with the positions of the inner dog teeth 22 as shown in FIG. 19.

Figure 20:
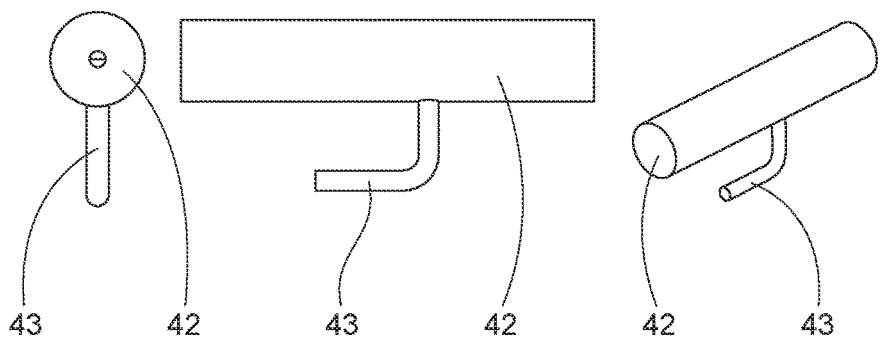
FIG. 20 shows an example embodiment of an idler gear dog teeth position sensor added to shift fork
Figure 21:
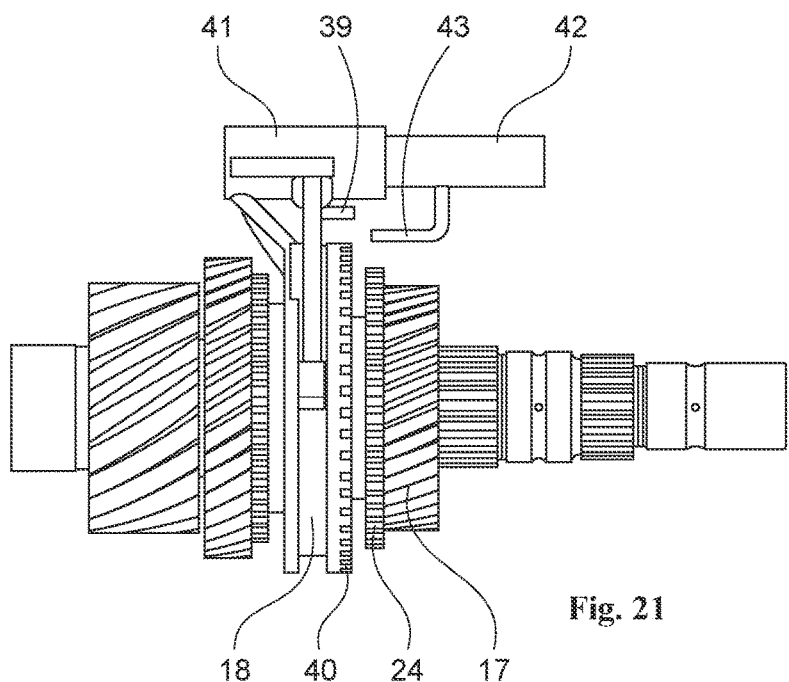
FIG. 21 shows an example embodiment of a synchronizer with added teeth position sensors

The sensor 43 for idler gear dog teeth 24 may for example be added to a fork rod 42 as shown in FIG. 20, but its position may differ for different transmission concepts. The idler gear dog teeth sensor 43 is preferably at a fixed position in space. An example embodiment of the complete assembly of sensors, synchronizer, shift fork and rod is shown in FIG. 21.

Figure 22:
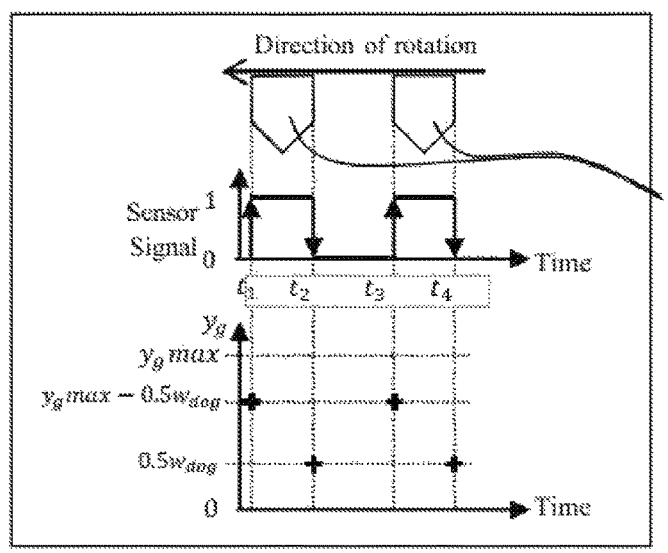
FIG. 22 shows example embodiments of sensor output and teeth position

According to one example embodiment, the sensor produces a binary signal i.e. 0 for no teeth and 1 for teeth as shown in FIG. 22. Since this example embodiment includes two similar sensors, one for sleeve teeth 22 and one for idler gear dog teeth 24, signal processing for idler gear dog teeth sensor 43 will be shown here, the signal processing for sleeve teeth sensor 39 will be exactly same.

If idler gear dog teeth 24 are moving in the direction of rotation as shown in FIG. 22, the sensor gives rising edges at times $t_1$ and $t_3$ and falling edges at times $t_2$ and $t_4$. The teeth position $y_g$ at time $t_1$ as shown in FIG. 22 would be $$y_g(t_1)=y_g\text{max}-w_{dog}/2 \qquad (28)$$

where $y_g$max is same as $y_{sg}$max and is defined by equations 9 and 10. Similarly, teeth position at time $t_2$ would be $$y_g(t_2)=w_{dog}/2 \qquad (29)$$

Values of $y_g$ between time $t_1$ and time $t_2$ can be calculated by $$y_g(t\in[t_1,t_2])=R\times(\int\omega_g dt+y_g(t_1)/R) \qquad (30)$$

If $y_g$ resulting from equation 30 is not between 0 and $y_{sg}$max equation 13 is applied to make it so. Similarly values of $y_g$ between time $t_2$ and $t_3$ can be calculated by $$y_g(t\in[t_2,t_3])=R\times(\int\omega_g dt+y_g(t_2)/R) \qquad (31)$$

For values of $y_g$ between times $t_3$ and $t_4$ equation 30 can be used again. In essence $y_g$ at any time can be calculated by integrals in equations 30 and 31, which are triggered by either a rising or a falling edge and reset by the other.

If direction of rotation or equivalently sign of $\omega_g$ is changed in FIG. 22, then falling edges will be at times $t_1$ and $t_3$ and rising edges at times $t_2$ and $t_4$. In that case the triggers for integral equations 30 and 31 must be interchanged. An example of the logic implemented in Simulink is shown in FIG. 23.

Figure 23:
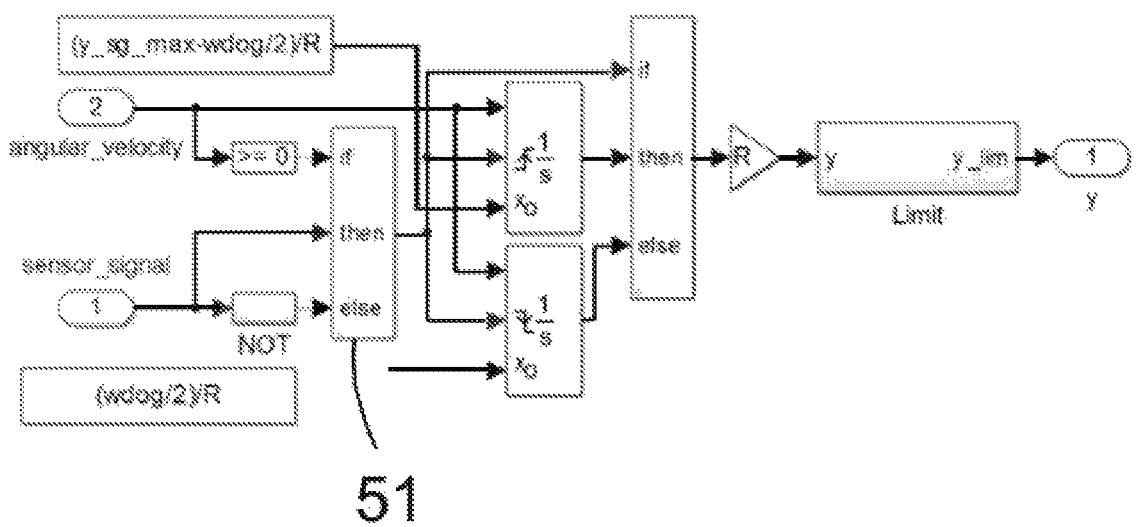
FIG. 23 shows an example embodiment of an algorithm for dog teeth position from velocity and sensor signal

In FIG. 23, the first If Then Else block denoted 51 changes the trigger conditions between the integrators based on sign of angular velocity. Second If Then Else block activates the integrator blocks based on rising or falling edges in sensor signal and integrates the velocity signal with respective initial conditions. The resulting $y_g$ from a decreasing $\omega_g$ and corresponding sensor signal is shown in FIG. 24, which shows resulting $y_g$ from $\omega_g$=40→0 rad/sec.

Figure 24:
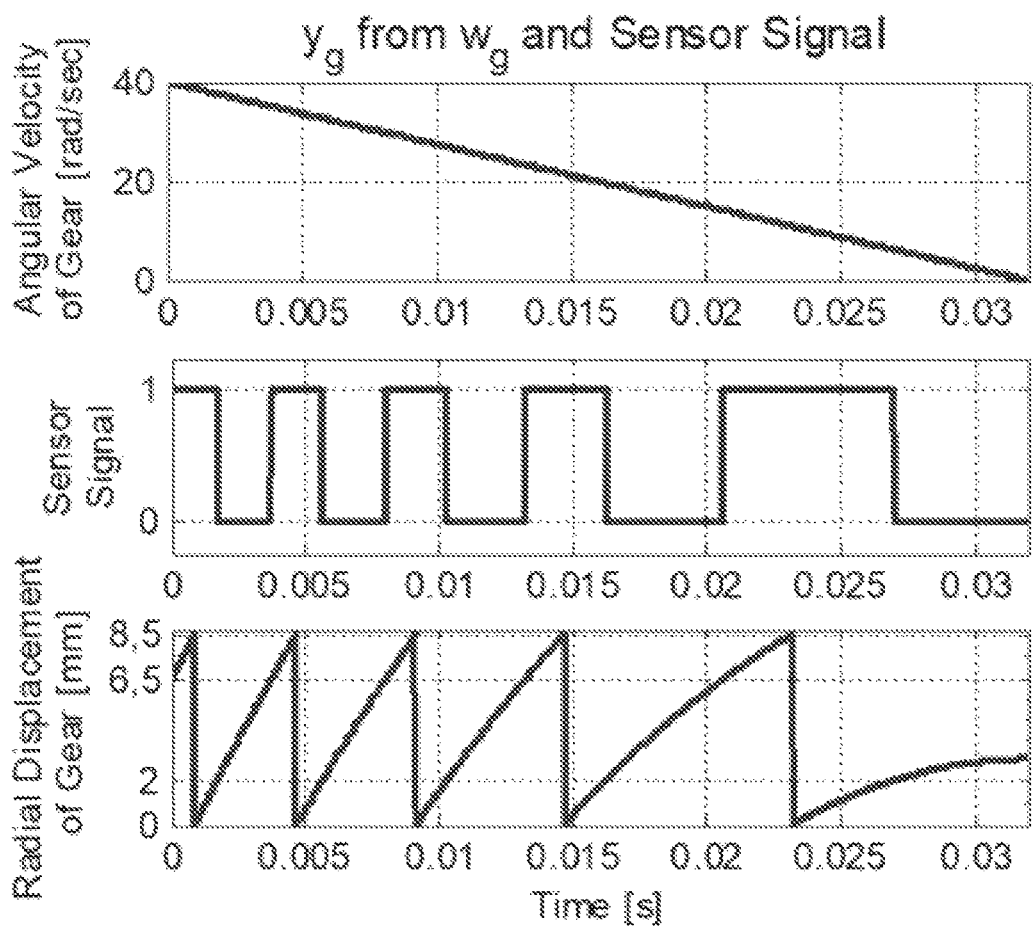
FIG. 24 shows an example embodiment of a resulting $y_g$ from $\omega_g$=40→0 rad/sec

It can be seen in FIG. 24, that the sensor signal rising and falling edges are in accordance with FIG. 22 and dog teeth parameters from Table 1.

Similar logic can be used to get sleeve teeth position $y_s$ at any time based on the sensor signal for sleeve teeth 22 and sleeve velocity $\omega_s$. Based on $y_s$ and $y_g$, the real relative displacement $y_{sgr}$ between sleeve teeth 22 and idler gear dog teeth 24 at any time instance $t_i$ can be calculated by $$y_{sgr}(t_i) = \begin{cases} y_g(t_i) - y_s(t_i) & \text{if } y_g(t_i) > y_s(t_i) \\ y_{sg}\max - y_s(t_i) + y_g(t_i) & \text{if } y_s(t_i) > y_g(t_i) \end{cases} \quad (32)$$

Figure 25:
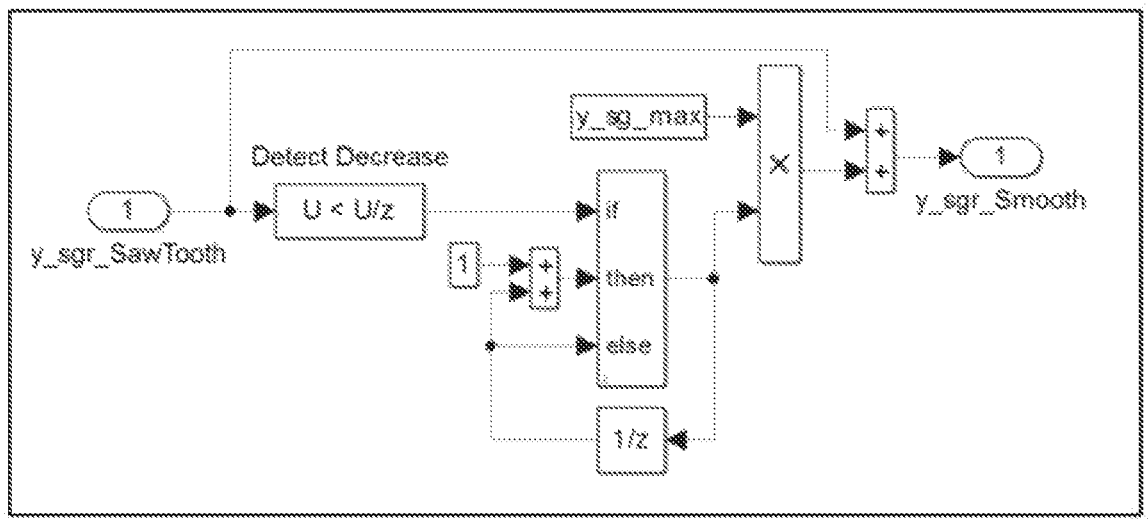
FIG. 25 shows an example embodiment of a sensor signal smoother for an upshift
Figure 26:
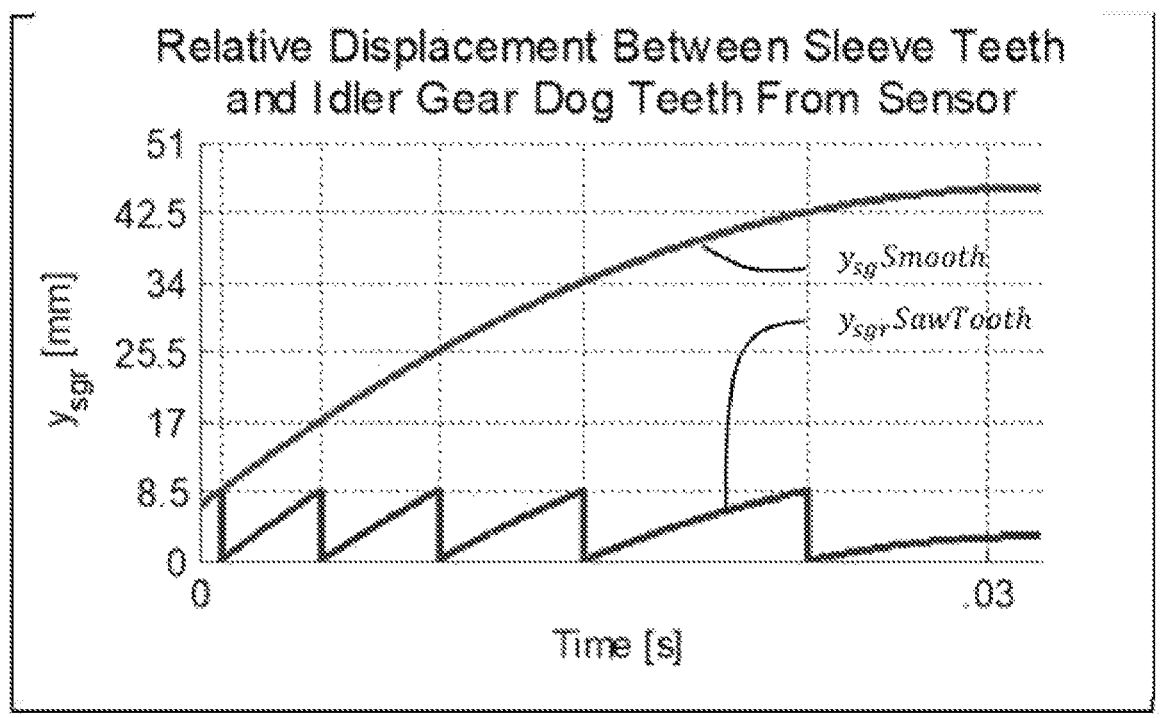
FIG. 26 shows example embodiments of Sawtooth and Smoothened sensor signals

The resulting $y_{sgr}$ will be a sawtooth wave like radial displacement plot in FIG. 24. Since $y_{sgr}$ signal is used in feed back control strategy, it may be better to transform the signal from a sawtooth wave to smooth signal. The logic to smoothen the signal implemented in Simulink for an upshift is shown in FIG. 25. Both the sawtooth and the resulting smoothened sensor signal from a sawtooth wave is shown in FIG. 26.

The aim of the control algorithm is to have $y_{sgr}(t_{synch})=y_{sg}*(t_{synch})$. The control algorithm may have various design, depending on desired performance, sensor output quality, etc. For example, according to first example embodiment, the control algorithm may contain two sequential controllers:

1. Initial open loop controller for ensuring desired relative displacement between sleeve teeth 22 and gear teeth 24 at start of synchronisation phase, such that $y_{sgr}(t_{synch})=y_{sg}*(t_{synch})$ at end of synchronisation phase.

2. Closed loop controller as extra safety measure for ensuring that $y_{sgr}(t_{synch})=y_{sg}*(t_{synch})$ at end of synchronisation phase despite potential errors in sensor rotational position detection and/or inaccuracy of timing of start of synchronisation phase.

Alternatively, according to second example embodiment, the control algorithm may contain merely a single initial open loop controller for ensuring desired relative displacement between sleeve teeth 22 and gear teeth 24 at start of synchronisation phase, such that $y_{sgr}(t_{synch})=y_{sg}*(t_{synch})$ at end of synchronisation phase. The accuracy and reliability of the sensor relative displacement detection is deemed sufficient for allowing omission of the closed loop controller.

Still more alternatively, according to third example embodiment, the control algorithm may be designed for omitting the initial open loop controller, and instead being configured for starting the synchronisation phase immediately upon receiving a gear shift command, and subsequently, at a certain relative position $\omega_{sg}$ between the sleeve 18 and gear 17, initiating closed loop control of the synchronisation torque such that $y_{sgr}(t_{synch})=y_{sg}*(t_{synch})$ at end of synchronisation phase.

A control algorithm according to the first example embodiment is described as hereinafter. The purpose of the open loop controller is to calculate a $y_{sg}(t_0)$ such that when an angular acceleration $\alpha_g$ corresponding to equation 4 or 5 is applied at time $t_0$, $y_{sgr}$ at time $t_{synch}$ is equal to $y_{sg}*(t_{synch})$.

If values of $y_g$ and $y_s$ at time $t_{synch}$ are such that $$y_g(t_{synch})=y_{sg}*(t_{synch}) \quad (33)$$

$$y_s(t_{synch})=0 \quad (34)$$

then according to first condition in equation 32 $y_{sgr}(t_{synch})=y_{sg}*(t_{synch})$.

From equation 33 angular displacement of gear $\theta_g$ at time $t_{synch}$ can be calculated to be $$\theta_g(t_{synch})=y_{sg}*(t_{synch})/R_g \quad (35)$$

Similarly, from equation 34 angular displacement of sleeve $\theta_s$ at time $t_{synch}$ can be calculated to be $$\theta_s(t_{synch})=0 \quad (36)$$

Figure 27:
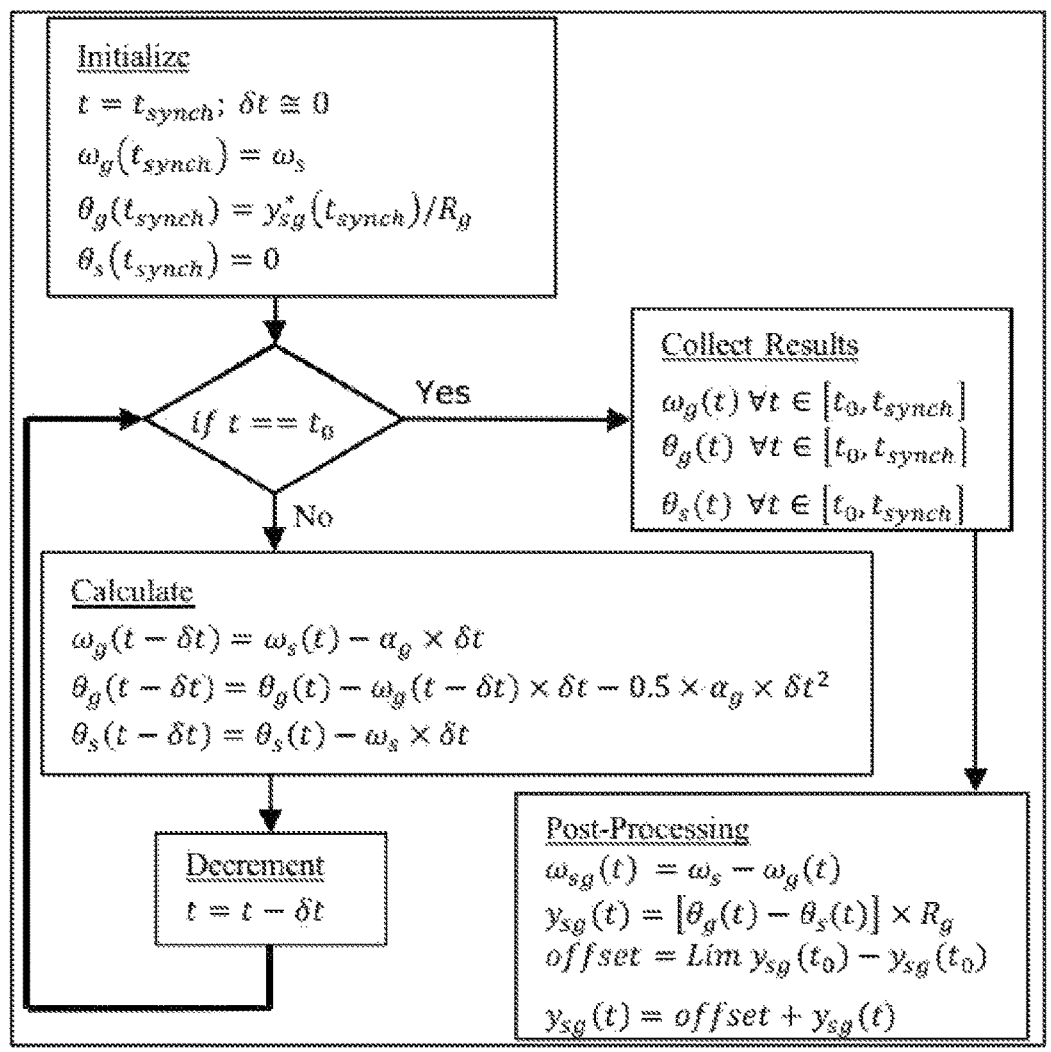
FIG. 27 shows an example embodiment of backwards in time simulation

A simulation running backwards in time from time $t_{synch}$ to time $t_0$ with a small decremental step of $\delta t$ is shown in FIG. 27. The initial conditions for the angular displacements $\theta_g$ and $\theta_s$ for the simulation are equations 35 and 36 respectively. Initial condition for $\omega_g$ is $\omega_g(t_{synch})=\omega_s$. The simulation is run with $\alpha_g$=Max($\alpha_g$).

When the simulation stops after $(t_{synch}-t_0)\div\delta t$ iterations as shown in FIG. 27 the results are collected and post processed to get $\omega_{sg}(t),\forall t\in[t_0, t_{synch}]$ and $y_{sg1}(t),\forall t\in[t_0, t_{synch}]$. The curve $y_{sg1}(t)$ is post processed in such a way that $y_{sg1}(t_0) \in [0,y_{sg}\max]$ and Lim $y_{sg1}(t_{synch})$ calculated by equation 13 is $=y_{sg}*(t_{synch})$.

Figure 28:
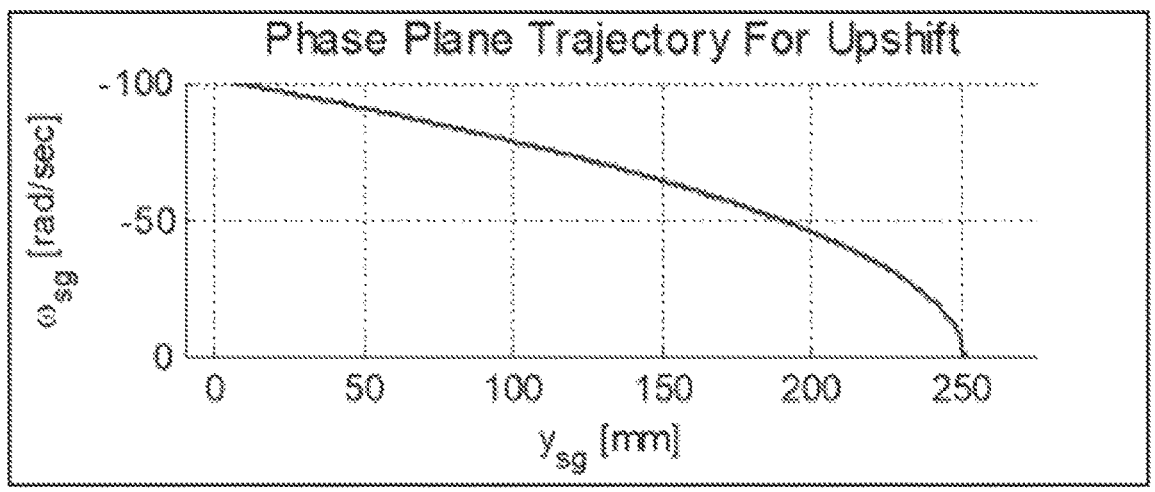
FIG. 28 shows an example embodiment of a phase plane trajectory with Maximum $\alpha_g$ for $\omega_{sg}(t_0)$=−100 rad/sec and $y_{sg}*(t_{synch})$=4.245 mm

A first phase plane trajectory generated for an upshift with $\omega_{sg}(t_0)$=−100 rad/sec and $y_{sg}*(t_{synch})$=4.245 mm is shown in FIG. 28.

An open loop controller can then be designed such that $$\alpha_g \text{ is } \begin{cases} =0 & \text{if } y_{sgr} \text{ from Sensor} \neq y_{sg1}(t_0) \\ =\text{Max}(\alpha_g) & \text{if } y_{sgr} \text{ from Sensor} = y_{sg1}(t_0) \end{cases} \quad (37)$$

Figure 29:
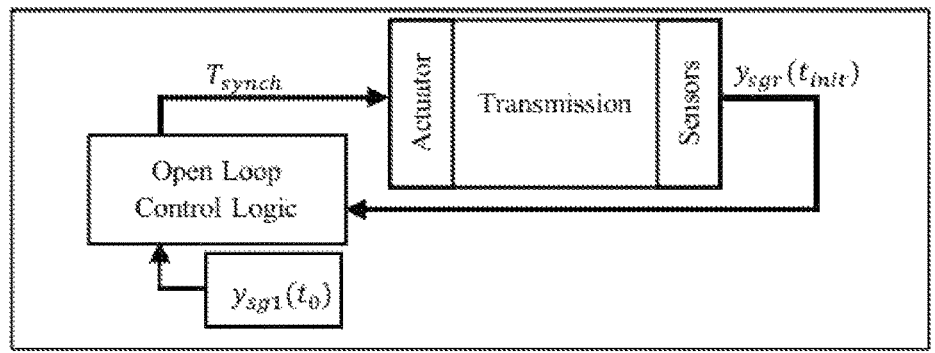
FIG. 29 shows Open loop control block diagram

The block diagram for open loop control is shown in FIG. 29.

When the shift command is generated from high level software at time instance $t_{init}<t_0$ the angle sensors start working and $\alpha_g$ must be kept to zero, for a time duration $t_0-t_{init}$ until $y_{sgr}$ generated by sensors is equal to $y_{sg1}(t_0)$ resulting from FIG. 28. Once they are equal, maximum $\alpha_g$ is applied. The angular acceleration $\alpha_g$ in equation 37 is controlled by synchronization torque $T_{synch}$ based on equation 5 for upshift or equation 5 for downshift. So, the interface of control logic with the hardware is in terms of synchronization torque $T_{synch}$. The implementation of open loop control for an upshift in FIG. 29 is shown in FIG. 30.

Figure 30:
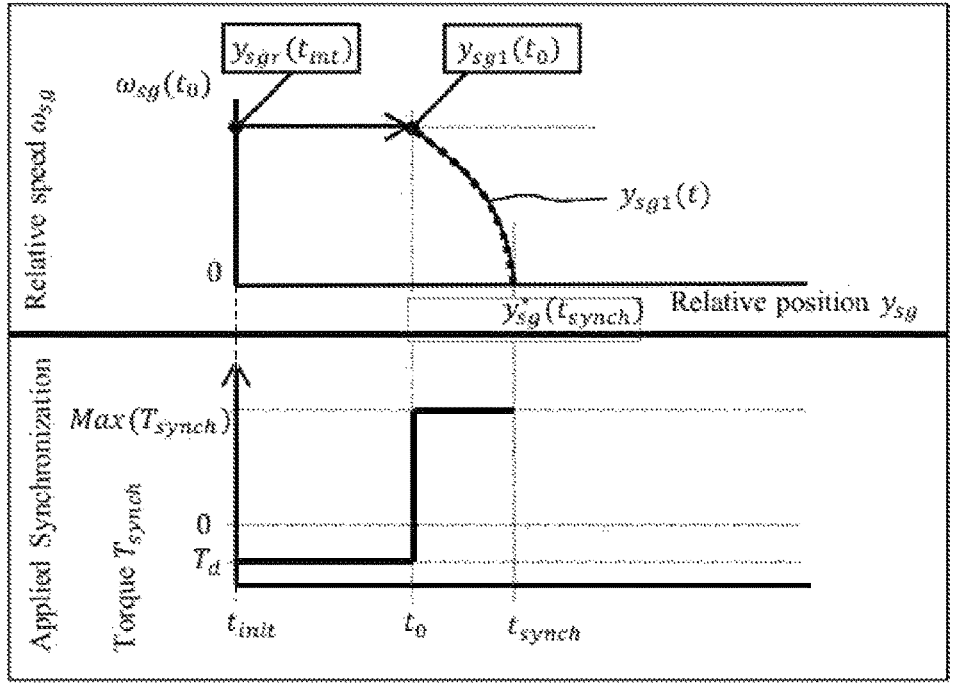
FIG. 30 shows an example embodiment of an open loop control logic for upshifts

It can be seen from FIG. 30 that for time duration $t_{init}$ to $t_0$, $T_{synch}$ is kept at $T_d$, which gives $\alpha_g$=0 according to equation 4. At time instance $t_0$, when maximum torque is applied $y_{sgr}$ will start following the first trajectory $y_{sg1}$. After time $t_{synch}$, $\omega_{sg}(t_{synch})$ will be 0 and Lim $y_{sgr}(t_{synch})$ will be $=y_{sg}*(t_{synch})$=Lim $y_{sg1}(t_{synch})$.

Since $y_{sgr}(t_0)$ and $y_{sg1}(t_0)$ both $\in[0, y_{sg}\text{max}]$, it is not necessary that $y_{sgr}(t_0) < y_{sg1}(t_0)$ as shown in FIG. 30. In that case the first trajectory $y_{sg1}$ need to be offset by $y_{sg}\text{max}$. So if $y_{sgr}(t_0) > y_{sg1}(t_0)$ then offset $y_{sg}(t) = y_{sg1}(t) + y_{sg}\text{max}$ (38)

Figure 31:
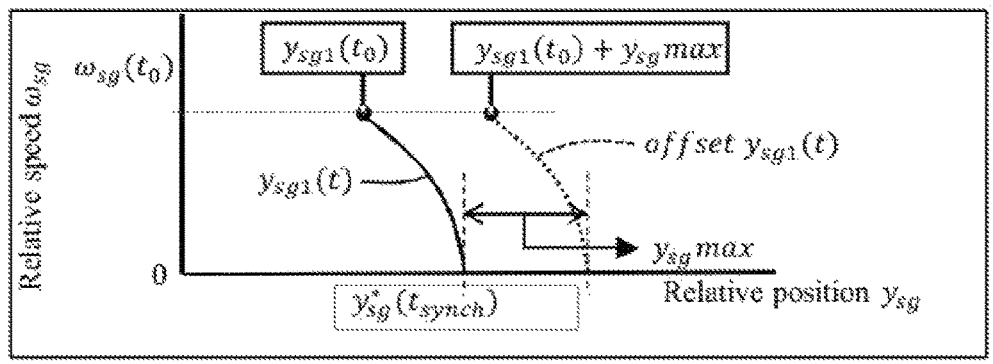
FIG. 31 shows an example embodiment of an offset phase plane trajectory

Using equation 13 on offset $y_{sg}(t)$ at time=$t_{synch}$ from equation 38, it can be calculated such that Lim offset $y_{sg1}(t) = y_{sg}^*(t_{synch})$. The offset phase plane is shown by dotted line and original phase plane is shown by solid lines in FIG. 31.

So, if $y_{sgr}(t_{init}) > y_{sg1}(t_0)$, then offset $y_{sg1}$ trajectory will be followed at time$\geq t_0$ instead of $y_{sg1}$ as explained earlier.

Figure 32:
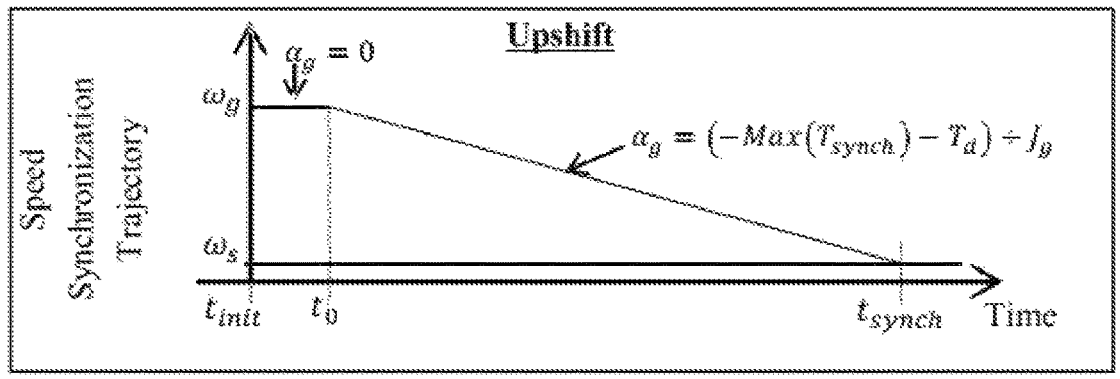
FIG. 32 shows an example embodiment of an upshift speed synchronization trajectory after application of open loop control

Since during time duration $t_0\_t_{init}$, $\alpha_g = 0$, the speed synchronization is delayed by this duration. So, speed synchronization trajectory shown for upshift in FIG. 2 will be updated as shown in FIG. 32, which shows upshift speed synchronization trajectory after application of open loop control.

Time duration $t_0\_t_{init}$ can be calculated by $$t_{0-t_{init}} = \Delta y_{sg} \div [R_g \times \omega_{sg}(t_0)] \quad (39)$$

where $\Delta y_{sg} = \ldots$ $$\begin{cases} y_{sg1}(t_0) - y_{sgr}(t_{init}) & \text{if } y_{sg}^*(t_0) > y_{sg}R(t_{init}) \\ y_{sg}\text{max} + y_{sg}(t_0) - y_{sgr}(t_{init}) & \text{if } y_{sg}^*(t_0) < y_{sg}R(t_{init}) \end{cases}$$

It can be seen from equation 39, that time duration $t_0\_t_{init}$ is quite small since the numerator term $\Delta y_{sg}$ can be maximum equal to $y_{sg}\text{max}$ and denominator contains terms $R_g$ and $\omega_{sg}(t_0)$ which are far larger than $\Delta y_{sg}$.

Figure 33A:
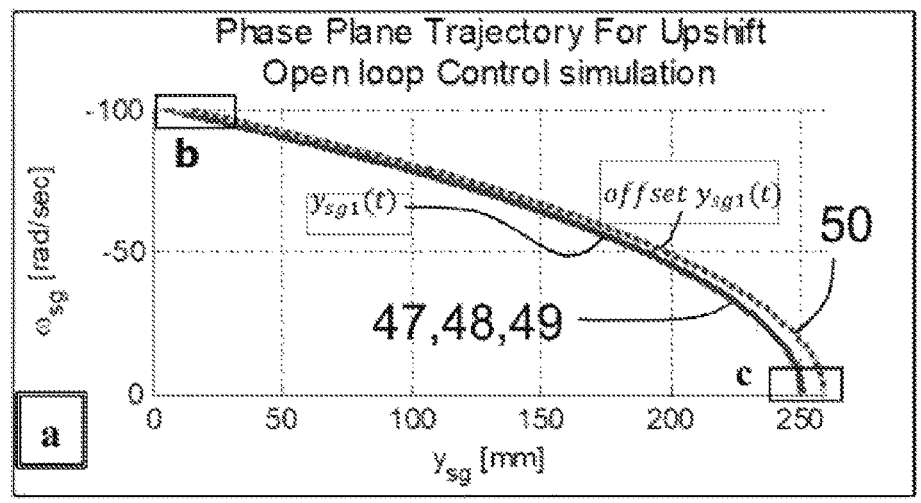
FIGS. 33A-C show an example embodiment of an open loop control simulation
Figure 33B:
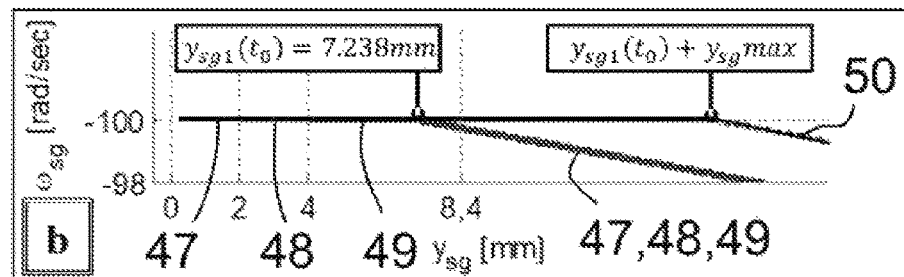

The simulation results for $y_{sgr}(t_{init})=0; 2; 4; 8.4$ mm are shown in FIG. 33A. FIG. 33B shows the zoom in view of FIG. 33A at time $t_0$ and FIG. 33C shows the zoomed in view at time $t_{synch}$.

In FIG. 33, phase plane trajectory 47 denotes for $y_{sgr}(t_{init})=0$ mm, phase plane trajectory 48 denotes for $y_{sgr}(t_{init})=2$ mm, phase plane trajectory 49 denotes for $y_{sgr}(t_{init})=4$ mm, and phase plane trajectory 50 denotes for $y_{sgr}(t_{init})=8.4$ mm.

Figure 33C:
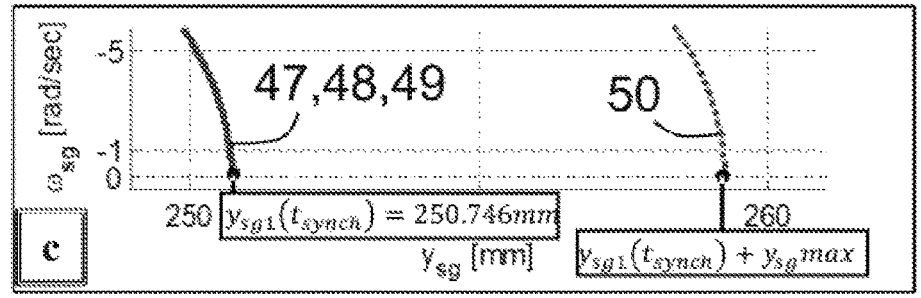

From FIG. 28, $y_{sg1}(t_0)=7.238$ mm and $y_{sg1}(t_{synch})=250.746$ mm as shown in FIG. 33B and FIG. 33C respectively. Since $y_{sgr}(t_{init})=8.4$ mm is larger than $y_{sg1}(t_0)=7.238$ mm so the phase plane trajectory for $y_{sgr}(t_{init})=8.4$ mm denoted 50 follows the offset trajectory shown by dotted line in FIG. 33. Using equation 13 it can be calculated that Lim $y_{sg1}(t_{synch})=4.245$ mm$=y_{sg}^*(t_{synch})$. From FIG. 33B it can be seen that for different values of $y_{sgr}(t_{init})$, the open loop control algorithm makes sure that $y_{sgr}$ at time $t_{synch}$ for all $y_{sgr}(t_{init})$, is $=y_{sg}^*(t_{synch})$, as shown in FIG. 33C.

The open loop controller guarantees $y_{sgr}$ at time $t_{synch}$ is equal to $y_{sg}^*(t_{synch})$ by changing $y_{sgr}$ at time $t_0$ to a fixed $y_{sg}(t_0)$. But during the time interval $t_0$ to $t_{synch}$, $y_{sgr}$ may need to be controlled, for example if the starting relative position of the sleeve and gear $y_{sg}$ at the start of the synchronisation phase did not match the desired starting relative position $y_{sg}$ for any reason. This is achieved by the closed loop controller.

In the subsequent section closed loop controller is designed, such that the open loop controller is turned off and closed loop controller controls $y_{sgr}$ from time $t_0$ to $t_{synch}$. In such a case the control effort from the closed loop controller will be greatest. But a similar closed loop controller can be designed that controls $y_{sgr}$ during time interval $t_i > t_0$ to $t_{synch}$.

The only effect will be the increase in synchronization time due to application of closed loop controller, which will be discussed in later sections.

From the simulation running backwards in time in FIG. 27, a second phase plane trajectory of $\omega_{sg2}(t), \forall t \in [t_0, t_{synch}]$ and $y_{sg2}(t), \forall t \in [t_0, t_{synch}]$, can be drawn for a value of $\alpha_g < \text{Max}(\alpha_g)$. The requirement on reduced $\alpha_g$ for upshifts is such that $$y_{sg2}(t_0) \leq y_{sg1}(t_0) - y_{sg}\text{max} \quad (40)$$

Consequently, the second phase plane trajectory y_sg2 thus differs from the first phase plane trajectory y_sg1, even if both the first and second phase plane trajectories y_sg1, y_sg2 have the same end point, i.e. the same circumferential relative displacement y_sg equal the target circumferential relative displacement y*_sg when said rotational speed difference ω_sg becomes zero at the end of the synchronisation phase.

Figure 34:
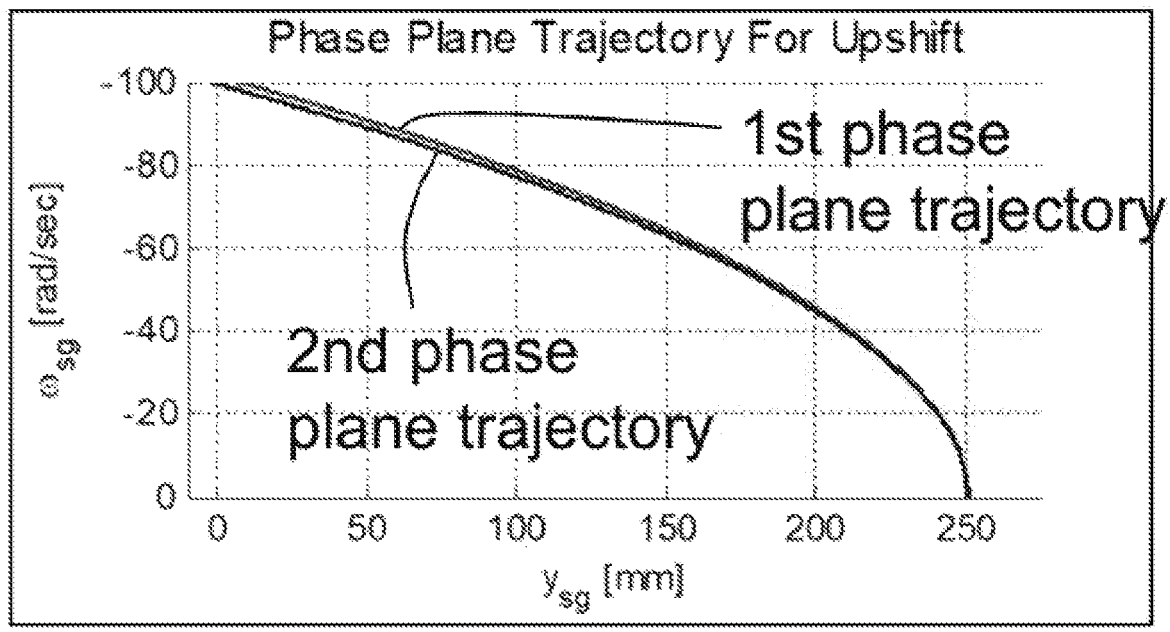
FIG. 34 shows an example embodiment of a phase plan trajectory for two accelerations

Both the first and the second phase plane trajectories for an upshift with $\omega_{sg}(t_0)=-100$ rad/sec and $y_{sg}^*(t_{synch})=4.245$ mm are shown by solid curves in FIG. 34.

Consequently, in more general terms, the disclosure relates to method for motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft, the method comprising:

receiving a gear shift command, determining a target relative displacement (y*_sg) between the sleeve teeth and gear teeth for a state when a gear wheel rotational speed (ω_g) reaches a shift sleeve rotational speed (ω_s) at an end of the synchronisation phase, which target relative displacement (y*_sg) is determined for avoiding impact between sleeve teeth and gear teeth during a following gear engagement phase, determining a first phase plane trajectory (y_sg1) defining a relationship between a rotational speed difference (ω_sg) between the shift sleeve and the gear wheel and a relative displacement (y_sg) between the sleeve teeth and gear teeth, wherein the relative displacement (y_sg) according to the first phase plane trajectory (y_sg1) equals the target relative displacement (y*_sg) when said rotational speed difference (ω_sg) becomes zero at the end of the synchronisation phase, determining a second phase plane trajectory (y_sg2) defining the relationship between the rotational speed difference (ω_sg) between the shift sleeve and the gear wheel and the relative displacement (y_sg) between the sleeve teeth and gear teeth, wherein the relative displacement (y_sg) according to the second phase plane trajectory (y_sg2) equals the target relative displacement (y*_sg) when said rotational speed difference (ω_sg) becomes zero at the end of the synchronisation phase, applying a synchronisation torque (T_synch), controlling said synchronisation torque (T_synch) for keeping the real relative displacement (y_sgr) between the sleeve teeth and gear teeth within the boundaries of the first and second phase plane trajectories (y_sg1, y_sg2) for any rotational speed difference (ω_sg), such that the real relative displacement (y_sgr) between the sleeve teeth and gear teeth reaches said target relative displacement (y*_sg) simultaneously with said rotational speed difference (ω_sg) becomes zero at the end of the synchronisation phase.

The rotational speed difference (ω_sg) between the shift sleeve and the gear wheel is for example determined based on sensor input from a first rotational speed sensor detecting the speed of the shift sleeve 18 and a second rotational speed sensor detecting the speed of the gear wheel 17.

The relative displacement (y_sg) between the sleeve teeth 22 and gear teeth 24 may be determined based on sensor input from a first teeth sensor detecting the presence of a sleeve tooth passing by the sensor, and input from a second teeth sensor detecting the presence of a gear tooth passing by the sensor, combined with information about the rotational speed difference (ω_sg) between the shift sleeve and the gear wheel.

Moreover, in more general terms, the step of determining the first phase plane trajectory (y_sg1) may be based on application of a first angular acceleration (α_g), and the step of determining the second phase plane trajectory (y_sg2) may be based on application of a second reduced angular acceleration (α_g) that is lower than the first angular acceleration (α_g).

In addition, in more general terms, the relative displacement (y_sg) according to the second phase plane trajectory (y_sg2) is smaller or equal to the relative displacement of the first phase plane trajectory (y_sg1) minus a maximal relative displacement (y_sg_max) at the rotational speed difference (ω_sg, ω_sgtip) when the closed loop controller is configured to start.

Furthermore, in general terms, the control method involves determining said first and second phase plane trajectories (y_sg1, y_sg2) by performing backward in time calculations starting from the time point (t_synch) when said rotational speed difference (ω_sg) becomes zero at the end of the synchronisation phase and ending at a predetermined rotational speed difference (ω_sg) based on a predetermined gear shift map, wherein the phase plane trajectories (y_sg1, y_sg2) are stored in pre-calculated lookup tables in a computer memory for enabling prompt access by an electronic transmission controller.

Each of the first and second phase plane trajectories (y_sg1, y_sg2) may extend between a rotational speed difference (ω_sg) corresponding to the start of the synchronisation phase to the state when said rotational speed difference becomes zero at the end of the synchronisation phase (ω_sg(t_synch)), and the control strategy may comprise operating said closed loop controller from the beginning to the end of the first and second phase plane trajectories.

The control method of the disclosure thus in general terms involve operation of two sequential controllers: an initial open loop controller and subsequently a closed loop controller, wherein operation of the open loop controller involves keeping the synchronisation torque (T_synch) zero or at a compensation torque level (T_comp) for as long as real relative displacement (y_sgr) is different from a starting relative displacement (y_sg1(t_0)), and applying the synchronisation torque (T_synch) as soon as the real relative displacement (y_sgr) is equal to the starting relative displacement (y_sg1(t_0)), and wherein operation of the closed loop controller involves controlling the synchronisation torque (T_synch) for keeping real relative displacement (y_sgr) within the boundaries of the first and second phase plane trajectories.

As it can be seen in FIG. 34, both trajectories have Lim $y_{sg1}(t_{synch})$=Lim $y_{sg2}(t_{synch})$=at $y_{sg}*(t_{synch})$ so if $y_{sgr}(t)$ is kept between trajectories for all $\omega_{sg}(t)$, then at time $t_{synch}$, $y_{sgr}(t_{synch})$ will be $=y_{sg}*(t_{synch})$. The arrangement of the closed loop controller is shown in FIG. 35.

Figure 35:
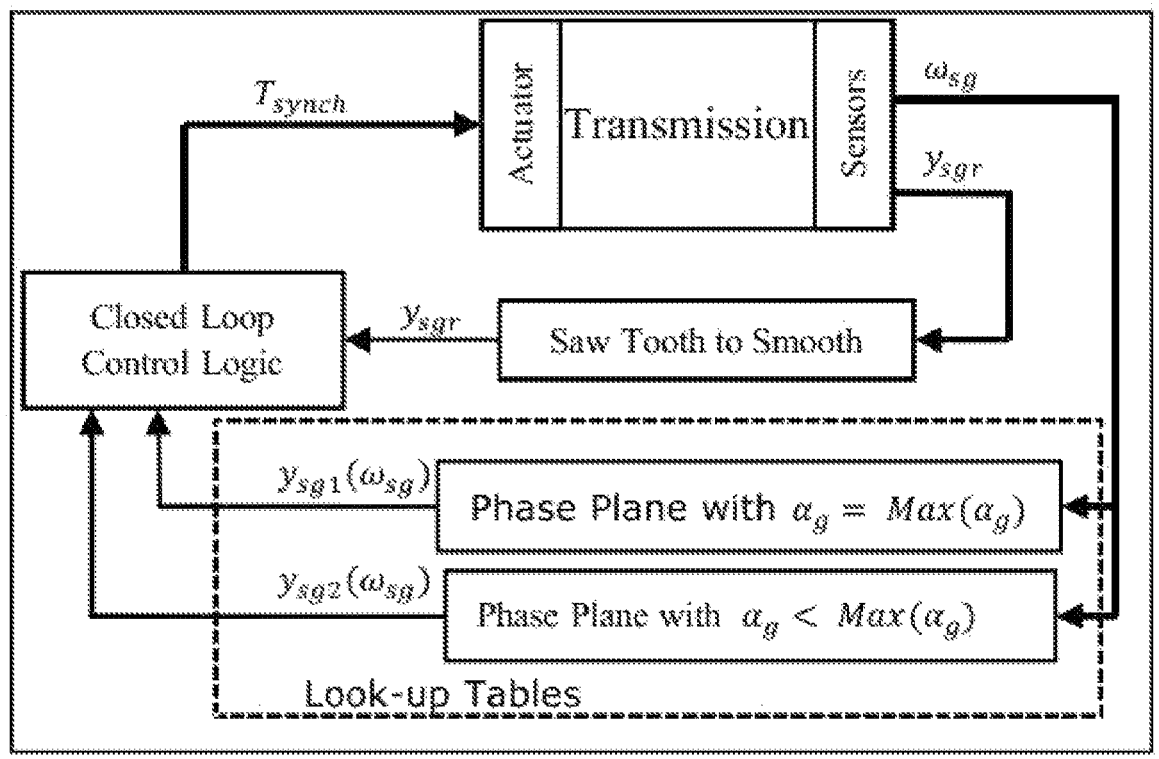
FIG. 35 shows an example embodiment of a closed loop controller arrangement

In FIG. 35, it can be seen that the input to control logic is the values of $y_{sg1}$ and $y_{sg2}$ calculated for example offline and subsequently providable by look-up tables using phase planes shown in FIG. 34 based on $\omega_{sg}$ signal from the transmission. Also in FIG. 35, it can be seen that input to the control logic is the smooth $y_{sgr}$ signal from the logic implemented in FIG. 25.

Figure 36:
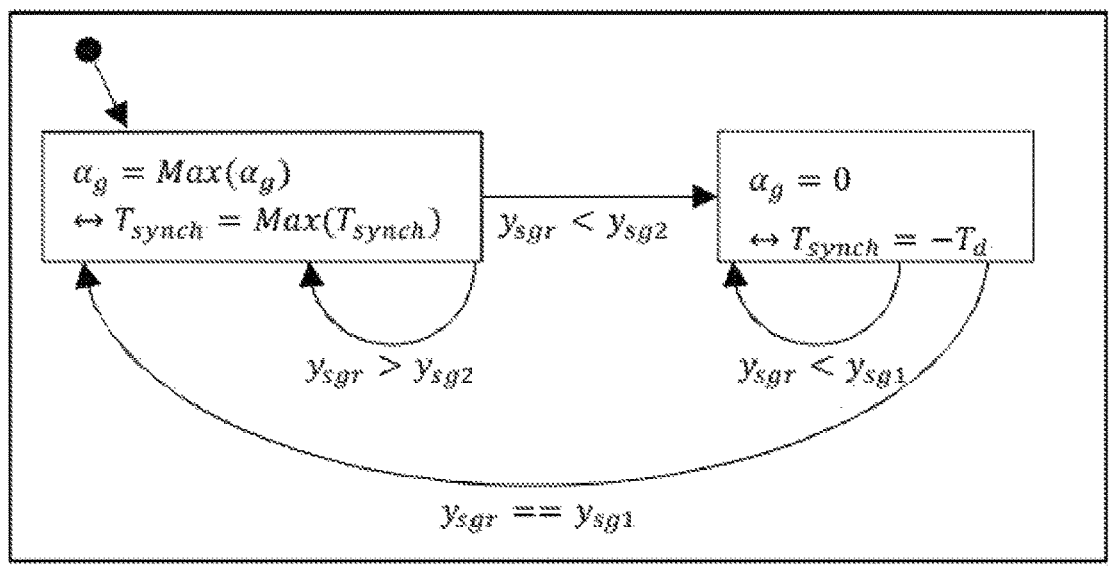
FIG. 36 shows an example embodiment of a closed loop control logic
Figure 37:
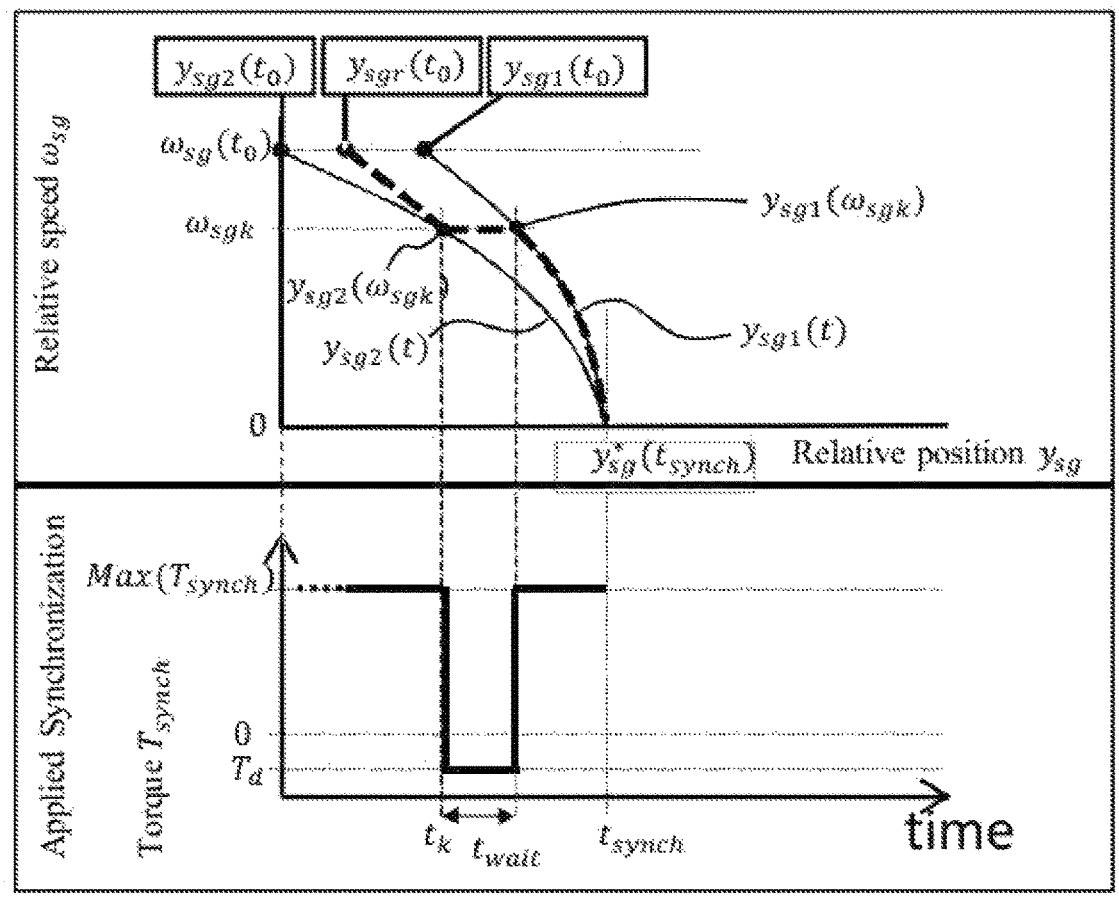
FIG. 37 shows an example embodiment of a working principle of closed loop control logic

The closed loop control logic implemented in FIG. 35 is shown in FIG. 36, and its working principle is shown in FIG. 37.

In the upper half of FIG. 37 the first phase plane trajectory $y_{sg1}(t)$ with maximum angular acceleration $\alpha_g$ and the second phase plane trajectory $y_{sg2}(t)$ with reduced angular acceleration $\alpha_g$ are shown as they were in FIG. 34. At time $t_0$, the signal from teeth position sensor $y_{sgr}(t_0)$, is between $y_{sg1}(t_0)$ and $y_{sg2}(t_0)$. Since $y_{sgr}(t_0) \in [0, y_{sg}\max]$, $y_{sg}\max$ term in equation 40 can be justified. If $y_{sgr}$ at any time is between $y_{sg1}$ and $y_{sg2}$, maximum synchronization torque $T_{synch}$ is applied. Then the angular acceleration $\alpha_g$ will correspond to maximum acceleration and $y_{sgr}$ will start evolving parallel to $y_{sg1}$ until time $t_k$.

At time $t_k$ when the angular velocity is $\omega_{sgk}$, $y_{sgr}$ becomes equal to $y_{sg}(\omega_{sgk})$, the control logic asks for a zero acceleration, shown by putting $T_{synch}=T_d$ in lower plot of FIG. 37. Since angular acceleration is zero, velocity difference $\omega_{sg}$ will stop changing but $y_{sgr}$ will be changing since the transmission is still rotating. After a certain time $t_{wait}$, when $y_{sgr}$ becomes equal to $y_{sg1}(\omega_{sgk})$, maximum torque $T_{synch}$ is applied again. Then $y_{sgr}$ will follow the trajectory of $y_{sg1}$ and $y_{sgr}(t_{synch})$ will be $=y_{sg}*(t_{synch})$.

The control method of the disclosure thus in general terms involves controlling said synchronisation torque (T_synch) by a closed loop controller for keeping the real relative displacement (y_sgr) between the sleeve teeth and gear teeth within the boundaries of the first and second phase plane trajectories.

In particular, the closed loop controller is an on-off controller, e.g. a controller that merely controls said synchronisation torque (T_synch) to either apply full synchronisation torque (T_synch) and substantially zero synchronisation torque (T_synch). Said substantially zero synchronisation torque (T_synch) may be exactly zero or equal to the compensation torque (T_comp).

More in detail, the closed loop controller for the purpose of keeping real relative displacement (y_sgr) within the boundaries of the first and second phase plane trajectories comprises:

applying synchronisation torque (T_synch) and monitoring the real relative displacement (y_sgr) and the rotational speed difference (ω_sg), if the real relative displacement (y_sgr) falls below the second trajectory (y_sg2) for any given rotational speed difference (ω_sg), stop applying the synchronisation torque (T_synch), or start applying only a compensation torque (T_comp) in a direction opposite to drag torque (T_d), monitoring the real relative displacement (y_sgr), and start applying the synchronisation torque (T_synch) again when the real relative displacement (y_sgr) is equal to the first trajectory (y_sg1) for any given rotational speed difference (ω_sg), and reiterating above steps in same order until rotational speed difference (ω_sg) becomes zero at the end of the synchronisation phase.

Figure 38:
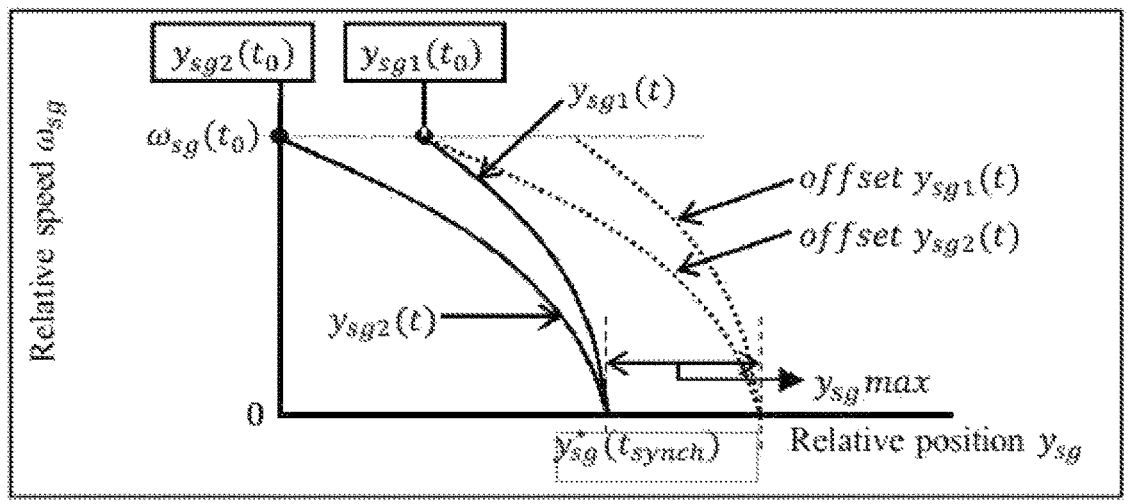
FIG. 38 shows example embodiments of offset phase plane trajectories

Since $y_{sgr}(t_0)$ and $y_{sg1}(t_0)$ both $\in [0, y_{sg}max]$, it is not necessary that $y_{sgr}(t_0) < y_{sg1}(t_0)$ as shown in FIG. 37. In that case both the trajectories $y_{sg1}$ and $y_{sg2}$ need to be offset by $y_{sg}max$ for upshifts as done for $y_{sg1}$ in equation 38 as shown in FIG. 38.

Consequently, in general terms, when the real relative displacement (y_sgr) between the sleeve teeth (22) and gear teeth (24) at the rotational speed difference ($\omega\_sg$, $\omega\_sgtip$) when the closed loop controller is configured to start controlling said synchronisation torque (T_synch) is larger than the relative displacement (y_sg) of the first trajectory (y_sg1) at said rotational speed difference ($\omega\_sg$, $\omega\_sgtip$), shifting said first and second trajectories (y_sg1, y_sg2) with an integer times a maximal relative displacement (y_sg_max), such that the real relative displacement (y_sgr) becomes located between an offset first trajectory (offset y_sg1) and an offset second trajectory (offset y_sg2), and/or when the real relative displacement (y_sgr) between the sleeve teeth (22) and gear teeth (24) at the rotational speed difference ($\omega\_sg$, $\omega\_sgtip$) when the closed loop controller is configured to start controlling said synchronisation torque (T_synch) is smaller than the relative displacement (y_sg) of the second trajectory (y_sg2) at said rotational speed difference ($\omega\_sg$, $\omega\_sgtip$), shifting said first and second trajectories (y_sg1, y_sg2) with an integer times the maximal relative displacement (y_sg_max), such that real relative displacement (y_sgr) becomes located between an offset first trajectory (offset y_sg1) and an offset second trajectory (offset y_sg2).

Since during time duration $t_{wait}$, $\alpha_g = 0$, the speed synchronization is delayed by this duration. So, speed synchronization trajectory shown for upshift in FIG. 32 will be updated for closed loop control as shown in FIG. 39.

Figure 39:
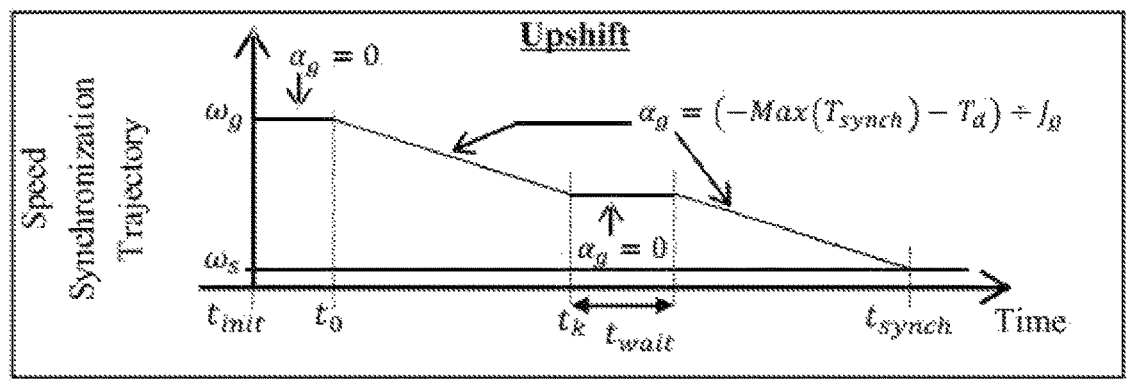
FIG. 39 shows an example embodiment of an upshift speed synchronization trajectory after application of open and close loop control

By applying the closed loop control logic, the synchronization time is increased by time $t_{wait}$ as shown in FIG. 39. Time $t_{wait}$ can be calculated by $$t_{wait} = [y_{sg1}(\omega_{sgk}) - y_{sg2}(\omega_{sgk})] \div [R_g \times \omega_{sgk}] \quad (41)$$

Maximum value of $t_{wait}$, will be if $t_{wait}$ starts at time $t_0$. Then maximum value of numerator in equation 41 will be $= y_{sg}max$ according to equation 40 and denominator contains terms $R_g$ and $\omega_{sg}(t_0)$ which are far larger than $y_{sg}max$.

Figure 40:
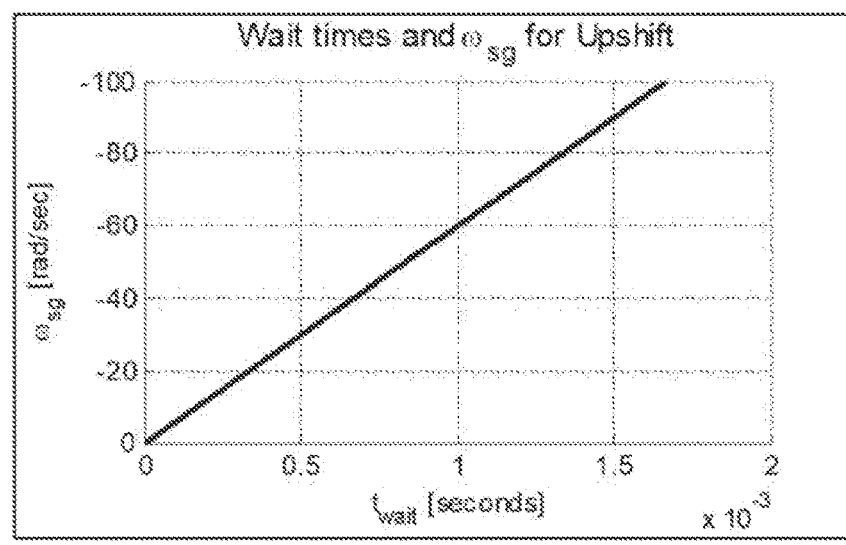
FIG. 40 shows example embodiments of Wait times for $\omega_{sg}$

In real system if $y_{sgr}$ deviates from $y_{sg1}$ at a time later than $t_x + t_{wait}$, if the same logic is applied then $y_{sgr}$ will start following $y_{sg1}$. But another wait time will be generated. The subsequent wait times will be smaller than $t_{wait}$. Using the $y_{sg1}(t)$, $y_{sg2}(t)$ and $\omega_{sg}(t)$, an $\omega_{sgx}$ vs wait time plot can be created as shown in FIG. 40. From FIG. 40, if the zero-acceleration request is made at a particular value of $\omega_{sg}$ on y-axis, the resulting waiting time will be corresponding value of time on x-axis.

If the closed loop controller, controls $y_{sgr}$ during time interval $t_i > t_0$ to $t_{synch}$ then maximum value of $t_{wait}$ will be if $t_{wait}$ starts at time $t_i$. Since in such a case equation 40 needs to hold for time $t_i$ instead of $t_0$, the maximum numerator for new $t_{wait}$ will still be $= y_{sg}max$. But the denominator term will contain $\omega_{sg}(t_i)$. As time $\to t_{synch}$, $\omega_{sg} \to 0$ so if $t_i \to t_{synch}$, $t_{wait} \to \infty$.

Figures 41A, 41B, 41C, 41D:
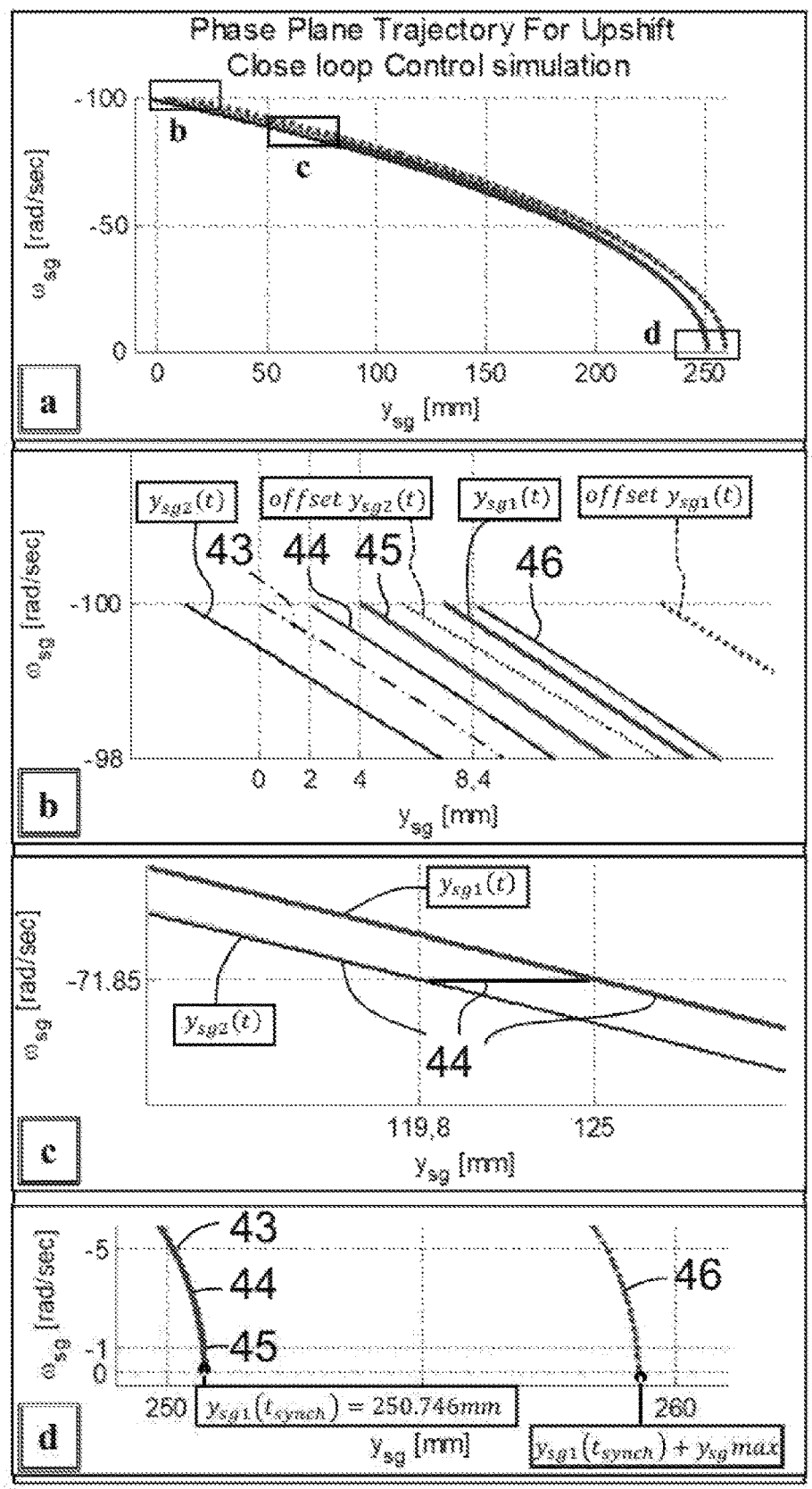
FIGS. 41A-D show an example embodiment of a closed loop control simulation.

For verifying the closed loop controller simulations were conducted with open loop controller turned off, wherein the results of the closed loop simulation are shown in FIG. 41A-D. The simulation was performed with a first value of $y_{sgr}(t_0) = 0$ mm resulting in a first trajectory 44, a second value of $y_{sgr}(t_0) = 2$ mm resulting in a second trajectory 45, a third value of $y_{sgr}(t_0) = 4$ mm resulting in a third trajectory 45 and a fourth value of $y_{sgr}(t_0) = 8.4$ mm resulting in a fourth trajectory 46, as shown in FIG. 41A.

During the closed loop simulation, the open loop controller is turned off as can be seen in FIG. 41B where all trajectories 43, 44, 45, 46 from different $y_{sgr}(t_0)$ values are moving parallel to $y_{sg1}(t)$ as maximum acceleration is applied.

With respect to the second trajectory 44 generated by $y_{sgr}(t_0) = 2$ mm in FIG. 41B, when $\omega_{sg}$ is $-71.85$ rad/sec, $y_{sgr}$ becomes smaller than $y_{sg2}(-71.85$ rad/sec$) = 119.8$ mm as shown in FIG. 41C, then as mentioned in the closed loop control strategy a zero acceleration is requested, $\omega_{sg}$ stays at $-71.85$ rad/sec until $y_{sgr}$ is equal to $y_{sg1}(-71.85$ rad/sec$) = 125$ mm. After that, maximum acceleration is requested again. The wait time can then be calculated using equation 41 to be 1.2 ms.

FIG. 41D shows the zoomed in view at time $t_{synch}$ where it can be seen that all trajectories 43-45 located between $y_{sg2}$ and $y_{sg1}$ end up at the same $y_{sg}*(t_{synch})$ although starting with different $y_{sgr}(t_0)$, and that trajectory 46 also end up at the same $y_{sg}*(t_{synch})$, but with a delay due to being controlled by Offset $y_{sg2}$ and Offset $y_{sg1}$.

The control algorithm according to the first example embodiment described above included two sequential controllers: 1. An initial open loop controller for ensuring start of application of the synchronisation torque $T_{synch}$ at the correct relative position $y_{sgr}(t_0)$ of the synchronisation phase, and subsequently 2. A closed loop controller for controlling the synchronisation torque, such that $y_{sgr}(t_{synch}) = y_{sg}*(t_{synch})$ at end of synchronisation phase.

However, as stated above, the present disclosure also includes alternative control algorithms. For example, the control algorithm may according to second example embodiment contain merely the initial open loop controller for ensuring desired relative displacement between sleeve teeth 22 and gear teeth 24 at start of synchronisation phase, such that $y_{sgr}(t_{synch}) = y_{sg}*(t_{synch})$ at end of synchronisation phase. This control algorithm is particularly advantageous when accuracy and reliability of sensor relative displacement detection is relatively high, and the applied level of synchronisation torque is can be estimated with a high degree of accuracy, because thereby the task of the closed loop controller to correct the trajectory is superfluous, and the closed loop controller can consequently be omitted without any significant reduction in engagement quality.

In short, the open loop controller calculates a $y_{sg}(t_0)$ such that the angular acceleration $\alpha_g$ corresponding to equation 4 or 5 starts to be applied at time $t_0$, and wherein the same angular acceleration $\alpha_g$ continues to be applied with without interruption until $\omega_{sg}(t_{synch}) = 0$, when $y_{sgr}(t_{synch}) = y_{sg}*(t_{synch})$.

The value of $y_{sg}(t_0)$ may for example be determined using the backwards running simulation described above, with $\alpha_g = Max(\alpha_g)$, such that a first phase plane trajectory is provided.

The open loop controller can then be designed based on equation 37, and after $Max(\alpha_g)$ has started to be applied the open loop controller keeps applying $Max(\alpha_g)$ until time $t_{synch}$, when $\omega_{sg}(t_{synch}) = 0$.

Consequently, as described above, when the shift command is generated from high level software at time instance $t_{init} < t_0$ the angle sensors start working and $\alpha_g$ must be kept to zero, for a time duration $t_0 - t_{init}$ until $y_{sgr}$ generated by sensors is equal to $y_{sg1}(t_0)$ resulting from FIG. 28. Once they are equal, maximum $\alpha_g$ is applied. The angular acceleration $\alpha_g$ in equation 37 is controlled by synchronization torque $T_{synch}$ based on equation 4 for upshift or equation 5 for downshift.

In general terms, the control method according to this second example embodiment relates to motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft, the method comprising:

receiving a gear shift command, determining a target relative displacement (y*_sg) between the sleeve teeth and gear teeth for a state when a gear wheel rotational speed (ω_g) reaches a shift sleeve rotational speed (ω_s) at the end of a synchronisation phase, which target relative displacement (y*_sg) is determined for avoiding impact between sleeve teeth (22) and gear teeth (24) during a following gear engagement phase, determining a starting relative displacement (y_sg1) between the sleeve teeth and gear teeth that causes the shift sleeve and gear wheel to reach said target relative displacement (y*_sg) simultaneously with said rotational speed difference (ω_sg) becomes zero at the end of the synchronisation phase when applying a synchronisation torque from the start to the end of a synchronisation phase, starting to apply said synchronisation torque when the real relative displacement (y_sgr) reaches said starting relative displacement (y_sg1).

The control method according to this second example embodiment of the disclosure thus involves determining a starting relative displacement (y_sg1(t_0)) between the sleeve teeth and gear teeth that causes the shift sleeve and gear wheel to reach said target relative displacement (y*_sg (t_synch)) simultaneously with said rotational speed difference (ω_sg(t_synch)) becomes zero at the end of the synchronisation phase when applying a synchronisation torque (T_synch) from the start to the end of a synchronisation phase, and starting to apply said synchronisation torque (T_synch) when the real relative displacement (y_sgr(t_0)) reaches said starting relative displacement (y_sg1(t_0)). The also applies to the control algorithm according to the first example embodiment described above.

The first trajectory, including its starting time point $y_{sg1}(t_0)$, may have to be offset by $y_{sg}$max, as described above with reference to equation 38, thereby giving new start time point offset $y_{sg1}(t_0)$.

According to the third example embodiment, the control algorithm may be designed for omitting the initial open loop controller, and instead being configured for starting the synchronisation phase immediately upon receiving a gear shift command, and subsequently, at a certain time instance $t_i$, wherein $t_i > t_0$, initiating closed loop control of the synchronisation torque until time $t_{synch}$, such that $y_{sgr}(t_{synch}) = y_{sg}*(t_{synch})$ at end of synchronisation phase.

In other words, the control method thus involves starting to apply said synchronisation torque (T_synch) substantially directly upon receiving the gear shift command (t_init) and independent of current relative displacement (y_sg) between the sleeve teeth and gear teeth.

As described above, the closed loop controller requires first and second phase plane trajectories $y_{sg1}, y_{sg2}$ with maximum $\alpha_g$ and reduced $\alpha_g$, respectively, converging towards $y_{sg}*(t_{synch})$ as shown in FIG. 34.

This control strategy is particularly suitable when the exact timing of the gear shifts is not known, i.e. when $\omega_{sg}(t_0)$ is not known. This may for example occur when transmission provides a tiptronic functionality, such that the driver can freely select the gear shift timing by manually actuating an gearshift actuator. In other words, the driver may decide to hold on to a specific gear longer and thus to a higher engine speed (rpm) than planned according to a predetermined gear shift map, or the driver may decide shift gear earlier and thus at a lower engine speed (rpm) than planned according to the predetermined gear shift map.

Such freedom of gear shift may require modified phase plane trajectories, because it is not certain that the predetermined trajectories that extend from t_0 to t_synch, based on the predetermined gear shift map, are suitable for controlling the relative position between sleeve and gear during the synchronisation phase.

Figure 42A:
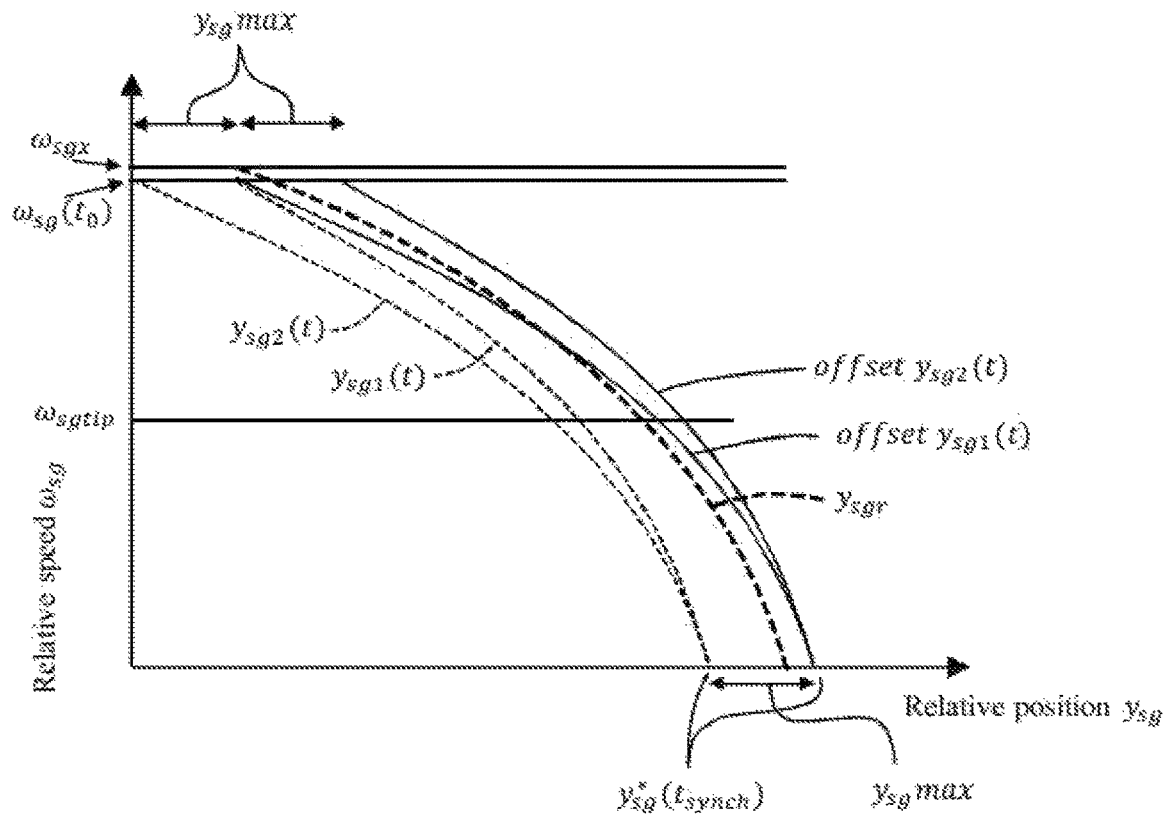
FIGS. 42A-E show various phase plane trajectories according to a further alternative embodiment.

In particular, there is a risk that real relative position $y_{sgr}$ at start of the closed loop control is located outside the first and second trajectories, despite that such trajectories may be offset by an integer times $y_{sg}$max in any direction, because the predetermined converging phase plane trajectories too narrow at $\omega_{sgtip}$, which represents the relative rotational speed at time of start of the closed loop control. Such as example is schematically illustrated in FIG. 42A, where $y_{sgr}$ is located outside both $y_{sg1}, y_{sg2}$ and offset $y_{sg1}$, offset $y_{sg2}$ at start of the closed loop control $\omega_{sgtip}$.

Figure 42B:
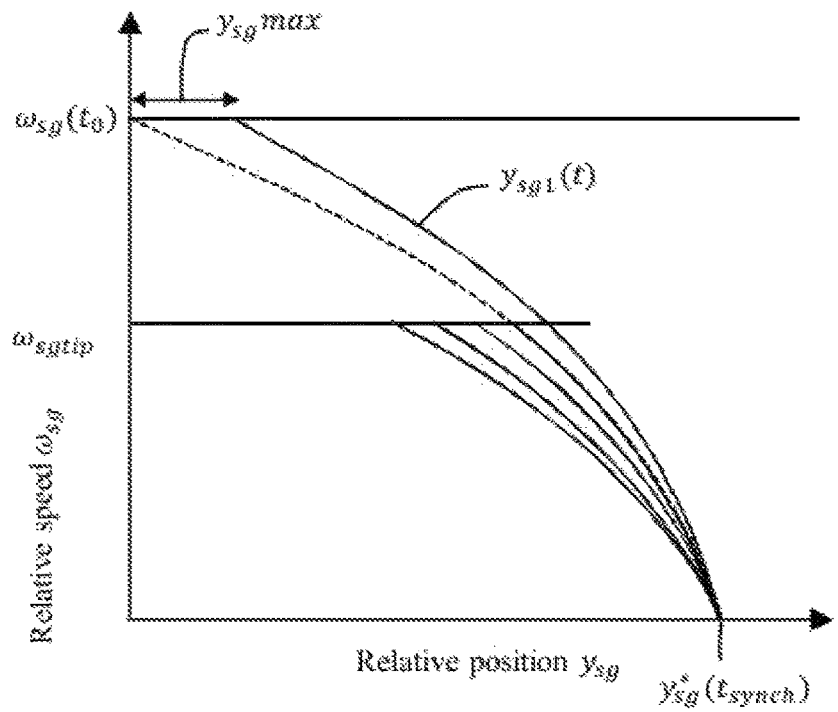

Consequently, a new approach for selecting suitable phase plane trajectories is necessary. FIG. 42B shows an example embodiment for selecting suitable phase plane trajectories for a closed loop control of a tiptronic transmission.

A first step involves generating the first phase plane trajectory $y_{sg1}$ in the same manner as before, i.e. based on the specific gear shift and the associated gear shift map. In other words, if for example the gear shift relates to gear shift of gear from first gear to second gear, the transmission control unit 1 knows the planned $\omega_{sg}(t_0)$ for that gear, taking into account current accelerator actuating level, based on predetermined gear shift map. The first phase plane trajectory may extend up to $\omega_{sg}(t_0)$ or stop at $\omega_{sgtip}$, which represents the relative rotational speed at time of start of the closed loop control.

Thereafter, the second phase plane trajectory $y_{sg2}$, is generated as described above in the disclosure, i.e. by selecting a lower angular acceleration, but this the simulation may be restricted for stretching only from $\omega_{sg}(t_{synch})$ to $\omega_{sg}(t_{sgtip})$, which may be for example 50% of planned $\omega_{sg}(t_0)$.

In addition, for ensuring sufficient entry width at the entry of the converging phase plane trajectories to be sure that to actually catch the specific relative position $y_{sg}(t_{sgtip})$ at the rotational speed at $\omega_{sg}(t_{sgtip})$, a plurality of simulations may be performed, each with a lower angular acceleration $\alpha_g$ of the gear 17, and subsequently selecting a second phase plane trajectory $y_{sg2}$ that fulfils the following criteria: $y_{sg}$(time when $\omega_{sg}=\omega_{sgtip}) \leq y_{sg1}$ (time when $\omega_{sg}=\omega_{sgtip})+y_{sg}$max. This is all done beforehand during development stage for all possible planned gear shifts and are subsequently made available to the transmission controller, for example via a gear shift map stored in a computer memory accessible by a transmission controller.

The plurality of simulated phase plane trajectories $y_{sg2}$ with gradually lower angular acceleration $\alpha_g$ are illustrated in FIG. 42B, and the selected second phase plane trajectory $y_{sg1}, y_{sg2}$ that fulfils said criteria: $y_{sg}$(time when $\omega_{sg}=\omega_{sgtip}) \leq y_{sg1}$ (time when $\omega_{sg}=\omega_{sgtip})+y_{sg}$max. Is illustrated in FIG. 42C.

Later, when a gear shift is initiated for example by the driver, the synchronisation torque T_synch based on the maximal angular acceleration $\alpha_g$ is first applied directly, irrespective of current relative position $y_{sgx}$ at the time point of receiving the gear shift command.

Figure 42C:
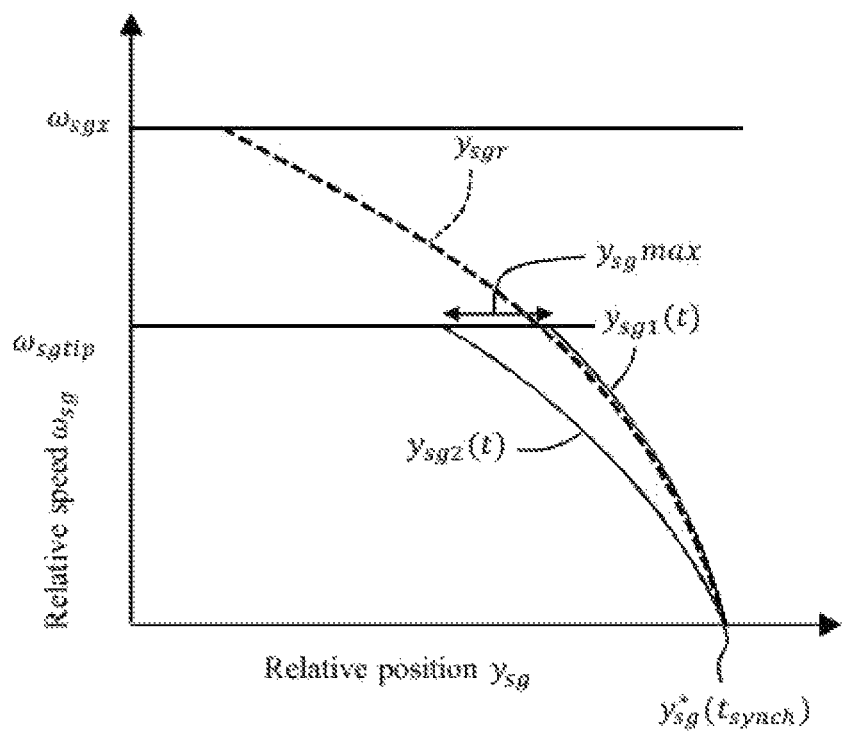

Subsequently, when the rotational speed difference $\omega_{sg}$ has decreased and equals the starting time for the closed loop controller at $\omega_{sg}(t_{sgtip})$, which may be determined beforehand, the closed loop controller starts controlling the synchronisation torque T_synch, such that $y_{sgr}(t_{synch})=y_{sg}^*$ ($t_{synch}$) at end of synchronisation phase, as illustrated in FIG. 42C.

The control method according to this example embodiment thus in general terms involves initiating the closed loop control first after at least 5%, specifically at least 25%, and more specifically at least 50%, of the total rotational speed difference ($\omega$_sg) between the shift sleeve and the gear wheel, from the start to the end of the synchronisation phase, has passed.

Figure 42D:
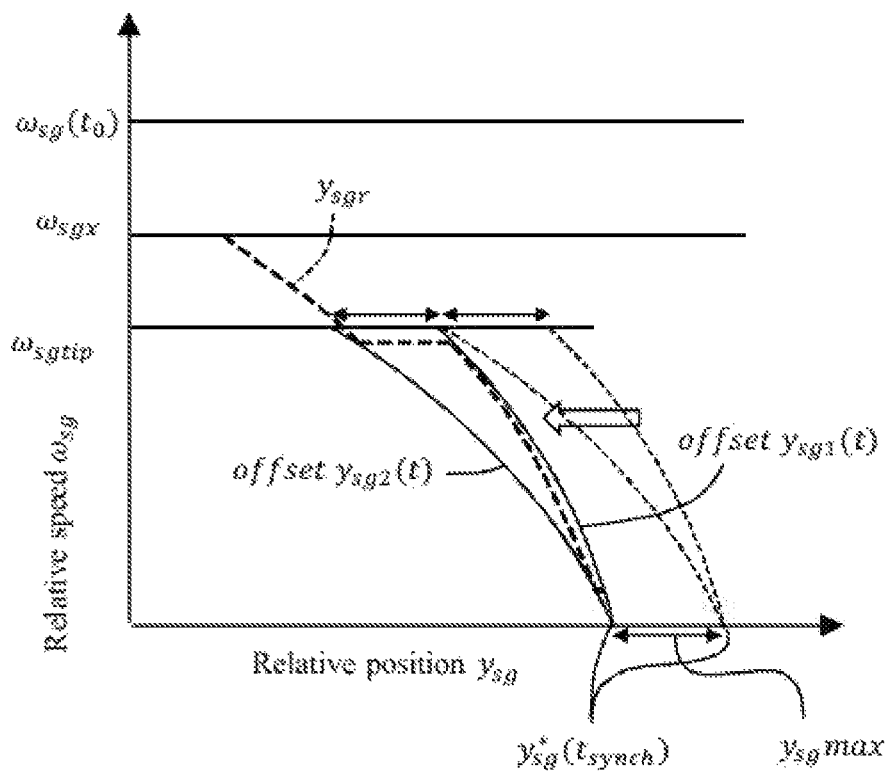
Figure 42E:
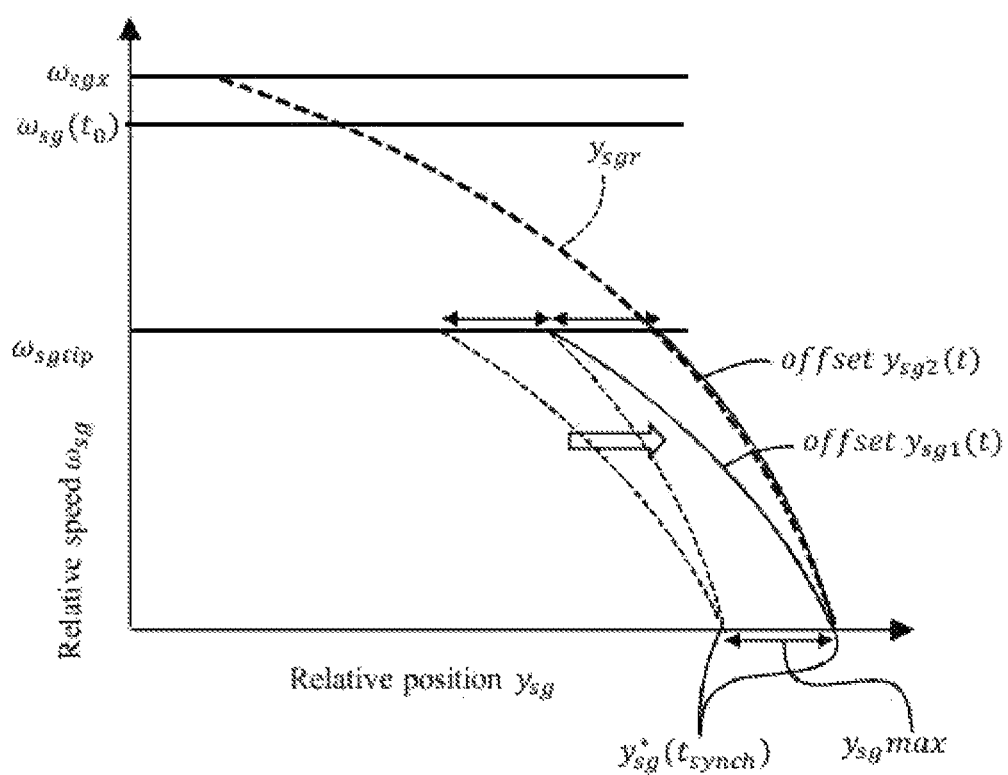

Furthermore, as illustrated in FIG. 42D, if it is detected that at $y_{sgr}(t_{sgtip})<y_{sg2}$, the phase plane trajectories have to be offset by $y_{sg}$max, as described above with reference to equation 38, thereby giving new phase plane trajectories offset $y_{sg1}$, offset $y_{sg2}$. The same applies if it is detected that at $y_{sgr}(t_{sgtip})>y_{sg1}$, as shown in FIG. 42E, thereby also triggering application of new offset phase plane trajectories, but in the opposite direction.

In other words, all simulations and preparations of the phase plane trajectories are made offline and stored in a memory accessible by the transmission control unit, for each possible gear shift scenario. Upon driving the vehicle and receiving a gear shift command at $\omega_{sgx}$, maximum $\alpha_g$ synchronisation torque T_synch is applied directly and the rotational velocity is decreased until $\omega_{sgtip}$. When rotational speed difference is equal to $\omega_{sgtip}$, then measure $y_{sgrtip}$.

The offset is performed according to the following logic:

if $y_{sg2tip}(\omega_{sgtip})<y_{sgr}(\omega_{sgtip})<y_{sg1}(\omega_{sgtip})$ then control $y_{sgr}$ between available phase plane trajectories if $y_{sg1}(\omega_{sgtip})<y_{sgr}(\omega_{sgtip})$ then offset $y_{sg2tip}$ and $y_{sg1}$ by $n^*y_{sg}$max and control between offset phase plane trajectories if $y_{sg2}(\omega_{sgtip})>y_{sgr}(\omega_{sgtip})$ then offset $y_{sg2tip}$ and $y_{sg1}$ by $n^*y_{sg}$max and control between offset phase plane trajectories.

The present disclosure also relates to a control system for motion control of a shift sleeve in a stepped gear transmission during a synchronization and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft. The control system being configured for performing the following steps:

receiving a gear shift command,
determining a target relative displacement (y*_sg) between the sleeve teeth and gear teeth for a state when a gear wheel rotational speed ($\omega$_g) reaches a shift sleeve rotational speed ($\omega$_s) at an end of the synchronisation phase, which target relative displacement (y*_sg) is determined for avoiding impact between sleeve teeth and gear teeth during a following gear engagement phase,
determining a first phase plane trajectory (y_sg1) defining a relationship between a rotational speed difference ($\omega$_sg) between the shift sleeve and the gear wheel and a relative displacement (y_sg) between the sleeve teeth and gear teeth, wherein the relative displacement (y_sg) according to the first phase plane trajectory (y_sg1) equals the target relative displacement (y*_sg) when said rotational speed difference ($\omega$_sg) becomes zero at the end of the synchronisation phase,
determining a second phase plane trajectory (y_sg2) defining the relationship between the rotational speed difference ($\omega$_sg) between the shift sleeve and the gear wheel and the relative displacement (y_sg) between the sleeve teeth and gear teeth, wherein the relative displacement (y_sg) according to the second phase plane trajectory (y_sg2) equals the target relative displacement (y*_sg) when said rotational speed difference ($\omega$_sg) becomes zero at the end of the synchronisation phase,
applying a synchronisation torque (T_synch),
controlling said synchronisation torque (T_synch) for keeping the real relative displacement (y_sgr) between the sleeve teeth and gear teeth within the boundaries of the first and second phase plane trajectories (y_sg1, y_sg2) for any rotational speed difference ($\omega$_sg), such that the real relative displacement (y_sgr) between the sleeve teeth and gear teeth reaches said target relative displacement (y*_sg) simultaneously with said rotational speed difference ($\omega$_sg) becomes zero at the end of the synchronisation phase.

Throughout the present detailed description, the drag torque $T_d$ acting on the oncoming idler gear 17 is deemed to be constant, except possibly taking into account variation in drag torque Td caused be variation of transmission fluid temperature. However, in certain implementations, even better accuracy of the calculated first and second phase plane trajectories y_sg1, y_sg2 may be desirable for enabling even better reduction of noise and wear during gearshifts caused by impact between sleeve teeth and the idler gear dog teeth.

One approach for providing such improved accuracy of the calculated first and second phase plane trajectories y_sg1, y_sg2 may be to take also rotational speed into account for determining the drag torque $T_d$. Specifically, the drag torque may be calculated by $$T_d = b \times \omega \tag{42}$$

where b=constant friction coefficient, and $\omega$=rotational speed of the oncoming gear 17.

Equations (4) and (5) for calculating resulting angular acceleration $\alpha_g$ on oncoming idler gear 17 may then be updated as $$\alpha_g = (-T_{synch} - (b \times \omega)) \div J_g \tag{43}$$

for upshifts, and $$\alpha_g = (T_{synch} - (b \times \omega)) \div J_g \tag{44}$$

for downshifts.

Similarly, equation (6) for calculating the synchronization time $t_{synch}$ can then be updated as $$t_{synch} = \left| \ln \left[ \frac{\omega_s - \frac{T_{synch}}{b}}{\omega_g(t_0) - \frac{T_{synch}}{b}} \right] \times \frac{-J_g}{b} \right| \tag{45}$$

Figure 43:
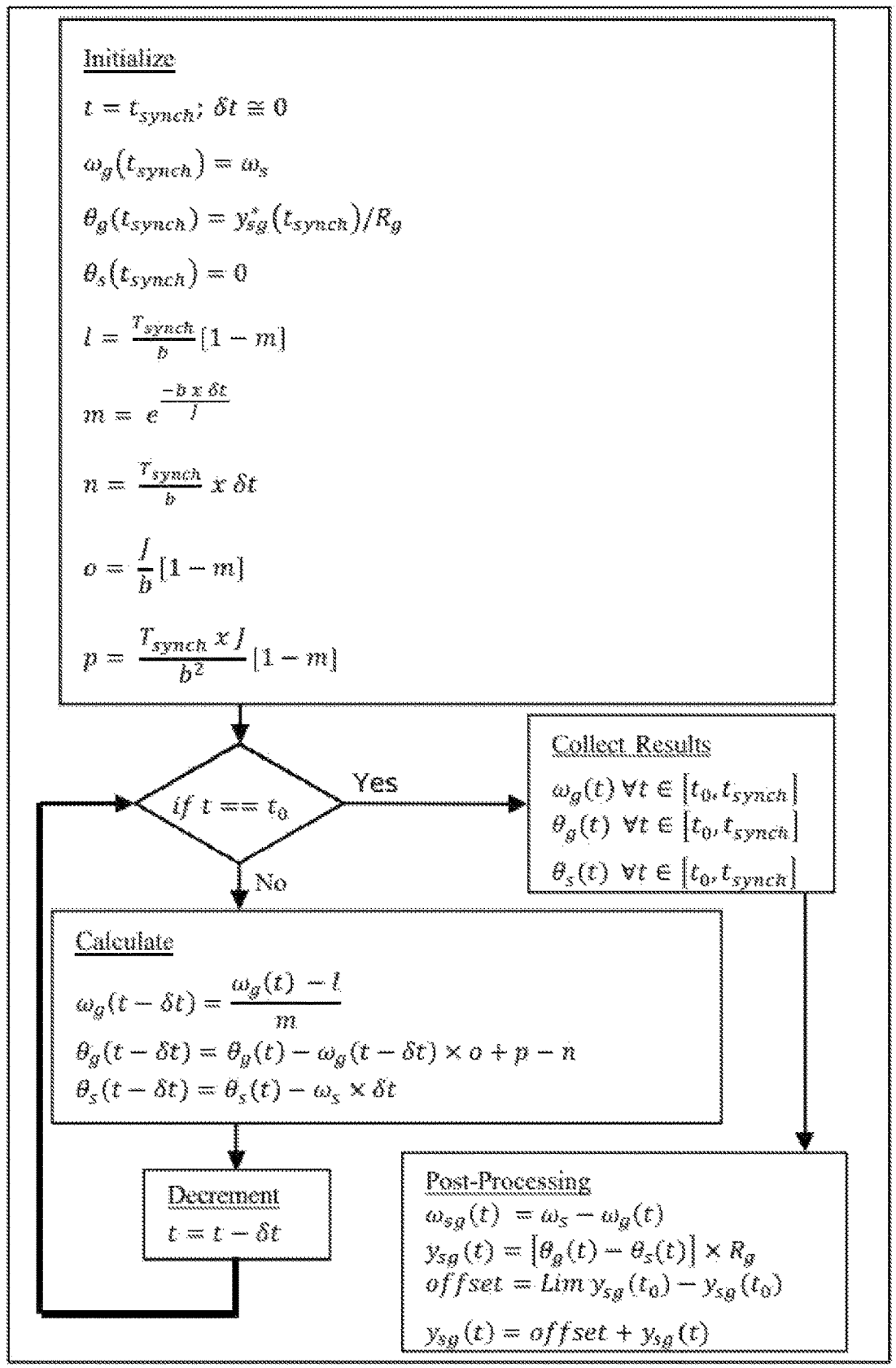
FIGS. 43 and 44 show two further example embodiments of the backwards in time calculation.

A correspondingly updated version of the simulation running backwards in time from time $t_{synch}$ to time $t_0$ with a small decremental step of $\delta t$ is shown in FIG. 43, replacing the previous calculation process of FIG. 27, wherein new constants l, m, n, o and p are introduced and calculated in the initialisation step. Moreover, also the iterating calculations of $\omega_g(t-\delta t)$ and $\theta_g(t-\delta t)$ are modified for taking the speed-varying drag torque $T_d$ into account.

The other parts of the backward in time calculation illustrated in FIG. 43 may remain unchanged, and when the calculation stops after $(t_{synch}-t_0) \div \delta t$ iterations, as shown in FIG. 43, the results are collected and post processed to get $\omega_{sg}(t), \forall t \in [t_0, t_{synch}]$ and $y_{sg1}(t), \forall t \in [t_0, t_{synch}]$, while taking account drag torque $T_d$ as a function of rotational speed, such that first and second phase plane trajectories y_sg1, y_sg2 may be calculated with a better accuracy. As before, the second phase plane trajectory of $\omega_{sg}(t), \forall t \in [t_0, t_{synch}]$ and $y_{sg2}(t), \forall t \in [t_0, t_{synch}]$ can also be determined using the backward in time calculation according to FIG. 43, but based on a value of $\alpha_g < Max(\alpha_g)$.

A further alternative solution for performing for motion control of a shift sleeve in a stepped gear transmission during a synchronization and gear engagement sequence for avoiding gear teeth interference involves adopting a modified approach for calculating the second phase plane trajectory y_sg2. This alternative approach may be implemented with or without taking into account drag torque $T_d$ as a function of rotational speed, i.e. according to equations 4-6 and the simulation of FIG. 27, or according to equations 43-45 and the backward in time calculation of FIG. 43.

Specifically, when applying the modified approach for calculating the second phase plane trajectory y_sg2, the generally time consuming pre-calculation of all relevant second phase plane trajectories y_sg2 using the backward in time calculation method described with reference to FIG. 27 or FIG. 43 may be omitted, and the second phase plane trajectories y_sg2 may instead simply be derived from the first phase plane trajectories y_sg1 using a suitable second offset, referred to as "offset2". Thereby, amount of pre-calculation may nearly be halved.

Figure 44:
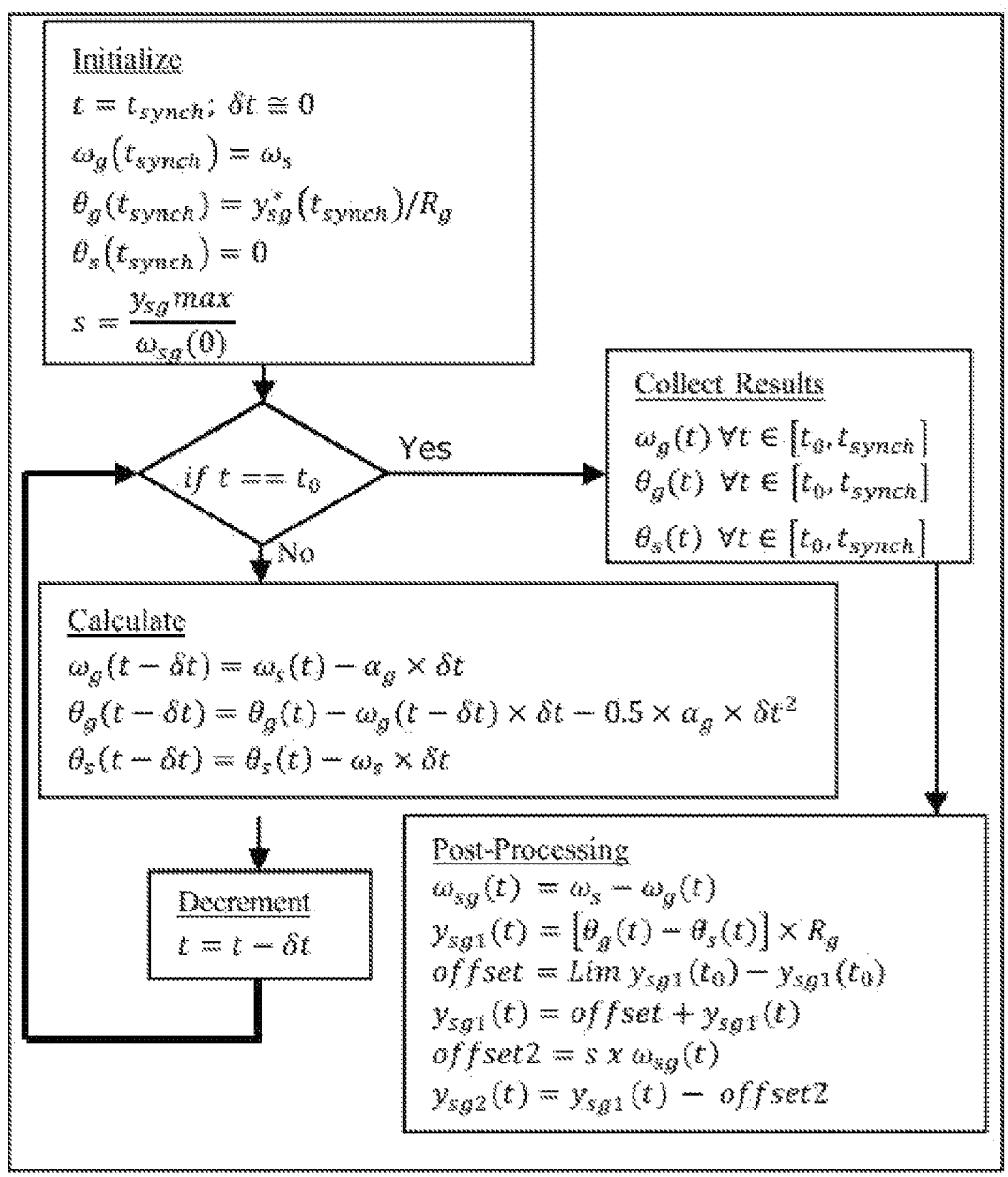

FIG. 44 describes a modified embodiment of the backward in time calculation for determining the first and second phase plane trajectories y_sg1, y_sg2, based on equations 4-6 and the calculation flow chart of FIG. 27, i.e. based on the simplification that the drag torque $T_d$ is constant and independent of rotational speed.

More in detail, the backward in time calculation of FIG. 44 includes defining a new constant $$s = \frac{y_{sg}\max}{\omega_{sg}(0)}$$

in the initialisation step. Thereafter, the backward in time calculation including $(t_{synch}-t_0) \div \delta t$ iterations is completed and the results are collected. The post processed step is however slightly amended because it involves, after calculation of the first phase plane trajectories y_sg1, also calculating of a second offset according to: ffset2=s×$\omega_{sg}(t)$, i.e. constant "s" multiplied with $\omega_{sg}(t)$. Thereby, a suitable offset is provided that may be used for deriving the second phase plane trajectory y_sg2 from the first phase plane trajectories y_sg1. In particular, this is performed according to the following equation: $y_{sg2}(t)-y_{sg1}(t)-$offset. Thereby, one may obtain $\omega_{sg}(t), \forall t \in [t_0, t_{synch}]$, and $y_{sg1}(t), \forall t \in [t_0, t_{synch}]$, and $y_{sg2}(t), \forall t \in [t_0, t_{synch}]$, using a single backward in time calculation as illustrated in FIG. 44.

The above example of "offset 2", i.e. equal to s*ω_sg(t), which corresponds to a linear function in a y_sg; ω_sg(t)—graph, enables a relatively simple calculation of offset 2, thereby enabling use of low processing capacity. However, other, more complex mathematical models of the "offset 2" function may alternatively be used, such as an exponential function, or the like.

Although the disclosure has been described in relation to specific combinations of components, it should be readily appreciated that the components may be combined in other configurations as well which is clear for the skilled person when studying the present application. For example, although the method for motion control of a shift sleeve in a stepped gear transmission has been described in terms of rotational speed synchronisation of the idler gear 17 with the constant rotational speed of the shift sleeve 18, the method may of course equally be applied for rotational speed synchronisation of a shift sleeve with the constant rotational speed of an idler gear wheel. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The term "coupled" is defined as connected, although not necessarily directly, and not necessarily mechanically.

The term "relative displacement between the sleeve teeth and gear teeth", or simply "relative displacement between sleeve and gear", used herein refers to the circumferential relative displacement between sleeve and gear.

The term "real relative displacement" corresponds to a detected value of the circumferential relative displacement, i.e. a real value corresponding to the actual real circumferential relative displacement between the shift sleeve and gear wheel, as for example measured by means of sensor. Relative displacement corresponds to a value, such as a limit value in form of circumferential relative displacement of the first and second trajectories.

The term "target relative displacement" refers to the relative circumferential displacement between the dog teeth of the shift sleeve and the dog teeth of the gear wheel, that upon axial motion of the shift sleeve when the rotational speed difference becomes zero at the end of the synchronisation phase, results in sleeve dog teeth entering in the space between neighbouring gear wheel dog teeth to maximal engagement depth substantially or entirely without mutual contact, and preferably ending with a sleeve teeth side surface near or in side contact with an opposite gear teeth side surface.

The term "synchronisation torque" refers to a constant predetermined torque value that may be applied to the gear wheel for synchronising the rotational speed thereof, for example by means of a friction clutch, an electric motor or synchronizer rings.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

The following publications are included herein by reference.

REFERENCES

[1] M. Z. Piracha, A. Grauers and J. Hellsing, "Improving gear shift quality in a PHEV DCT with integrated PMSM," in *CTI Symposium Automotive Transmissions, HEV and EV Drives*, Berlin, 2017.

[2] P. D. Walker and N. Zhang, "Engagement and control of synchronizer mechanisms in dual clutch transmissions," *Journal of Mechanical Systems and Signal Processing*, vol. 26, p. 320-332, 2012.

[3] C.-Y. Tseng and C.-H. Yu, "Advanced shifting control of synchronizer mechanisms for clutchless automatic manual transmission in an electric vehicle," *Mechanism and Machine Theory*, vol. 84, pp. 37-56, 2015.

[4] K. M. H. Math and M. Lund, "Drag Torque and Synchronization Modelling in a Dual Clutch Transmission," CHALMERS UNIVERSITY OF TECHNOLOGY, Gothenburg, Sweden, 2018.

[5] C. Duan, "Analytical study of a dog clutch in automatic transmission application," *Internation Journal of Passengar Cars, Mechanical Systems*, vol. 7, no. 3, pp. 1155-1162, 2014.

[6] Z. Lu, H. Chen, L. Wang and G. Tian, "The Engaging Process Model of Sleeve and Teeth Ring with a Precise, Continuous and Nonlinear Damping Impact Model in Mechanical Transmissions," in *SAE Technical Paper*, 2017.

[7] A. Penta, R. Gaidhani, S. K. Sathiaseelan and P. Warule, "Improvement in Shift Quality in a Multi Speed Gearbox of an Electric Vehicle through Synchronizer Location Optimization," in *SAE Technical Paper*, 2017.

[8] H. Hoshino, "Analysis on Synchronization Mechanism of Transmission," in 1999 *Transmission and Driveline Systems Symposium*, 1999.

[9] H. Chen and G. Tian, "Modeling and analysis of engaging process of automated mechanical transmissions," *Multibody System Dynamics*, vol. 37, pp. 345-369, 2016.

What is claimed is:

1. A method for motion control of a shift sleeve in a stepped gear transmission during a synchronisation and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft, the method comprising:
receiving a gear shift command,
determining a target relative displacement between sleeve teeth and gear teeth for a state when a gear wheel rotational speed reaches a shift sleeve rotational speed at an end of a synchronisation phase, the target relative displacement is determined for avoiding impact between the sleeve teeth and the gear teeth during a following gear engagement phase,
determining a first phase plane trajectory defining a relationship between a rotational speed difference between the shift sleeve and the gear wheel and a relative displacement between the sleeve teeth and the gear teeth, wherein the relative displacement according to the first phase plane trajectory equals the target relative displacement when said rotational speed difference becomes zero at the end of the synchronisation phase,
determining a second phase plane trajectory defining the relationship between the rotational speed difference between the shift sleeve and the gear wheel and the relative displacement between the shift teeth and the gear teeth, wherein the relative displacement according to the second phase plane trajectory equals the target relative displacement when said rotational speed difference becomes zero at the end of the synchronisation phase,
applying a synchronisation torque,
controlling said synchronisation torque for keeping a detected real relative displacement between the sleeve teeth and the gear teeth within boundaries of the first and second phase plane trajectories for any rotational speed difference, such that the real relative displacement between the sleeve teeth and the gear teeth reaches said target relative displacement simultaneously with said rotational speed difference becomes zero at the end of the synchronisation phase.

2. The method according to claim 1, comprising controlling said synchronisation torque by a closed loop controller for keeping the real relative displacement between the sleeve teeth and the gear teeth within the boundaries of the first and second phase plane trajectories.

3. The method according to claim 2, wherein the relative displacement according to the second phase plane trajectory is smaller or equal to the relative displacement of the first phase plane trajectory minus a maximal relative displacement at the rotational speed difference when the closed loop controller is configured to start.

4. The method according to claim 2, comprising
determining a starting relative displacement between the sleeve teeth and gear teeth that causes the shift sleeve and gear wheel to reach said target relative displacement simultaneously with said rotational speed difference becomes zero at the end of the synchronisation phase when applying a synchronisation torque from the start to the end of the synchronisation phase, and
starting to apply said synchronisation torque when the real relative displacement reaches said starting relative displacement.

5. The method according to claim 1,
wherein the step of determining the first phase plane trajectory is based on application of a first angular acceleration, and
wherein the step of determining the second phase plane trajectory is based on application of a second reduced angular acceleration that is lower than the first angular acceleration, or based on deriving the second phase plane trajectory from the first phase plane trajectory and an offset.

6. The method according to claim 5, wherein the step of determining the first angular acceleration involves taking into account a rotational speed dependent drag torque.

7. The method according to claim 1, comprising determining said first and second phase plane trajectories by performing one or more backward in time calculations starting from the time point when said rotational speed difference becomes zero at the end of the synchronisation phase and ending at a predetermined rotational speed difference, in particular based on a predetermined gear shift map, wherein the phase plane trajectories are stored in lookup tables in a computer memory for enabling prompt access by an electronic transmission controller.

8. The method according to claim 1, wherein each of the first and second phase plane trajectories extends between a rotational speed difference corresponding to the start of the synchronisation phase to the state when said rotational speed difference becomes zero at the end of the synchronisation phase, and the method comprising operating said closed loop controller from the beginning to the end of the first and second phase plane trajectories.

9. The method according to claim 1, wherein when the real relative displacement between the sleeve teeth and gear teeth at the rotational speed difference when the closed loop controller is configured to start controlling said synchronisation torque is larger than the relative displacement of the first trajectory at said rotational speed difference, shifting said first and second trajectories with an integer times a maximal relative displacement, such that the real relative displacement becomes located between an offset first trajectory and an offset second trajectory.

10. The method according to claim 1, comprising operation of two sequential controllers: an initial open loop controller and subsequently a closed loop controller,
wherein operation of the open loop controller involves keeping the synchronisation torque zero or at a compensation torque level for as long as real relative displacement is different from a starting relative displacement, and applying the synchronisation torque as soon as the real relative displacement is equal to the starting relative displacement, and
wherein operation of the closed loop controller involves controlling the synchronisation torque for keeping the real keeping real relative displacement within the boundaries of the first and second phase plane trajectories.

11. The method according to claim 1, wherein the closed loop controller for the purpose of keeping the real relative displacement within the boundaries of the first and second phase plane trajectories comprises:
applying synchronisation torque and monitoring the real relative displacement and the rotational speed difference,
if the real relative displacement falls below the second trajectory for any given rotational speed difference, stop applying the synchronisation torque, or start applying only a compensation torque in a direction opposite to drag torque,
monitoring the real relative displacement, and start applying the synchronisation torque again when the real relative displacement is equal to the first trajectory for any given rotational speed difference, and
reiterating above steps in same order until rotational speed difference becomes zero at the end of the synchronisation phase.

12. The method according to claim 1, comprising starting to apply said synchronisation torque substantially directly upon receiving the gear shift command and independent of current relative displacement between the sleeve teeth and gear teeth.

13. The method according to claim 1, comprising initiating the closed loop control first after one of at least 5%, at least 25%, or at least 50%, of the total rotational speed difference between the shift sleeve and the gear wheel, from the start to the end of the synchronisation phase, has passed.

14. The method according to claim 1, comprising determining the target relative displacement, a compensation torque applied on the gear wheel in a direction opposite to a drag torque and a shift sleeve axial engagement speed, for any specific sleeve teeth and gear teeth geometry, such that the sleeve teeth is determined to enter in the space between neighbouring gear teeth to a maximal engagement depth substantially without mutual contact, and preferably with a sleeve teeth side surface near or in side contact with an opposite gear teeth side surface.

15. The method according to claim 1, wherein when the real relative displacement between the sleeve teeth and gear teeth at the rotational speed difference when the closed loop controller is configured to start controlling said synchronisation torque is smaller than the relative displacement of the second trajectory at said rotational speed difference, shifting said first and second trajectories with an integer times the maximal relative displacement, such that real relative displacement becomes located between an offset first trajectory and an offset second trajectory.

16. A method for motion control of a shift sleeve in a stepped gear transmission during a synchronisation and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft, the method comprising:
receiving a gear shift command,
determining a target relative displacement between the sleeve teeth and gear teeth for a state when a gear wheel rotational speed reaches a shift sleeve rotational speed at the end of a synchronisation phase, which target relative displacement is determined for avoiding impact between sleeve teeth and gear teeth during a following gear engagement phase,
determining a starting relative displacement between the sleeve teeth and gear teeth that causes the shift sleeve and gear wheel to reach said target relative displacement simultaneously with said rotational speed difference becomes zero at the end of the synchronisation phase when applying a synchronisation torque from the start to the end of the synchronisation phase,
starting to apply said synchronisation torque when the real relative displacement reaches said starting relative displacement.

17. A control system for motion control of a shift sleeve in a stepped gear transmission during a synchronisation and gear engagement sequence for avoiding gear teeth interference, wherein the stepped gear transmission comprises an axially displaceable shift sleeve arranged on and rotationally secured to a shaft, and a constant mesh gear wheel arranged on and rotatable relative to said shaft, the control system being configured for performing the following steps:
receiving a gear shift command,
determining a target relative displacement between the sleeve teeth and gear teeth for a state when a gear wheel rotational speed reaches a shift sleeve rotational speed at an end of a synchronisation phase, which target relative displacement is determined for avoiding impact between sleeve teeth and gear teeth during a following gear engagement phase,
determining a first phase plane trajectory defining a relationship between a rotational speed difference between the shift sleeve and the gear wheel and a relative displacement between the sleeve teeth and gear teeth, wherein the relative displacement according to the first phase plane trajectory equals the target relative displacement when said rotational speed difference becomes zero at the end of the synchronisation phase,
determining a second phase plane trajectory defining the relationship between the rotational speed difference between the shift sleeve and the gear wheel and the relative displacement between the sleeve teeth and gear teeth, wherein the relative displacement according to the second phase plane trajectory equals the target relative displacement when said rotational speed difference becomes zero at the end of the synchronisation phase, applying a synchronisation torque, controlling said synchronisation torque for keeping a real relative displacement between the sleeve teeth and gear teeth within boundaries of the first and second phase plane trajectories for any rotational speed difference, such that the real relative displacement between the sleeve teeth and gear teeth reaches said target relative displacement simultaneously with said rotational speed difference becomes zero at the end of the synchronisation phase.

* * * * *